US012533921B2

United States Patent
Haeusler et al.

(10) Patent No.: US 12,533,921 B2
(45) Date of Patent: Jan. 27, 2026

(54) SUSPENSION SYSTEM

(71) Applicant: Canoo Technologies Inc., Torrance, CA (US)

(72) Inventors: Felix Haeusler, Torrance, CA (US); Nathaniel Risler Rosso, Torrance, CA (US); Chung Shen Ang, Torrance, CA (US); Jeffrey Walsh, Torrance, CA (US); Alexi Charbonneau, Redondo Beach, CA (US); Brian W. Austin, Torrance, CA (US); Charles Garmel, Torrance, CA (US); John Mason; Daniel George McCarron, Torrance, CA (US); Naesung Lyu, Torrance, CA (US)

(73) Assignee: CANOO TECHNOLOGIES INC., Torrance, CA (US)

( * ) Notice: Subject to any disclaimer, the term of this patent is extended or adjusted under 35 U.S.C. 154(b) by 452 days.

(21) Appl. No.: 18/161,364

(22) Filed: Jan. 30, 2023

(65) Prior Publication Data
US 2023/0173866 A1    Jun. 8, 2023

Related U.S. Application Data

(63) Continuation of application No. 17/016,299, filed on Sep. 9, 2020, now Pat. No. 11,618,292.
(Continued)

(51) Int. Cl.
*B60G 15/06*    (2006.01)
*B60G 7/00*    (2006.01)
*B60G 7/02*    (2006.01)

(52) U.S. Cl.
CPC .......... *B60G 15/067* (2013.01); *B60G 7/001* (2013.01); *B60G 7/008* (2013.01); *B60G 7/02* (2013.01);
(Continued)

(58) Field of Classification Search
CPC ...... B60G 15/067; B60G 7/001; B60G 7/008; B60G 7/02; B60G 2202/114;
(Continued)

(56) References Cited

U.S. PATENT DOCUMENTS

| 1,526,481 A | 2/1925 | Krieger |
| 2,673,512 A | 3/1954 | Henney |

(Continued)

FOREIGN PATENT DOCUMENTS

| AU | 2002323246 A1 | 3/2003 |
| AU | 2002332561 A1 | 3/2003 |

(Continued)

OTHER PUBLICATIONS

Decision of Refusal dated May 9, 2023, in connection with Japanese Application No. 2021-577866, 9 pages.
(Continued)

*Primary Examiner* — Paul N Dickson
*Assistant Examiner* — Shams Dhanani
(74) *Attorney, Agent, or Firm* — ALLEN, DYER, DOPPELT, + GILCHRIST, P.A. Attorneys at Law

(57) ABSTRACT

A vehicle suspension system includes left and right control arm assemblies each having a wheel mount structure, an upper control arm, and a lower control arm. Each control arm includes a first end configured to be pivotably connected to a frame structure of a vehicle and a second end rotatably connected to the wheel mount structure. The vehicle suspension system also includes a transverse leaf spring having an elongated body extending between the control arm assemblies, outer mounting brackets respectively connecting left and right ends of the elongated body to the left and right control arm assemblies, and one or more inner mounting brackets located between the outer mounting brackets. The transverse leaf spring is contoured such that a contoured
(Continued)

portion of the elongated body deviates in a downward direction in order to extend below an electric drive system disposed within an internal space between rails of the frame structure.

20 Claims, 69 Drawing Sheets

Related U.S. Application Data

(60) Provisional application No. 62/897,970, filed on Sep. 9, 2019.

(52) U.S. Cl.
CPC .. *B60G 2202/114* (2013.01); *B60G 2204/121* (2013.01); *B60G 2204/143* (2013.01); *B60G 2204/148* (2013.01); *B60G 2204/43* (2013.01); *B60G 2206/428* (2013.01); *B60G 2300/50* (2013.01)

(58) Field of Classification Search
CPC ........ B60G 2204/121; B60G 2204/143; B60G 2204/148; B60G 2204/43; B60G 2206/428; B60G 2300/50; B60G 3/20; B60G 2200/142; B60G 2200/144
See application file for complete search history.

(56) References Cited

U.S. PATENT DOCUMENTS

| | | | |
|---|---|---|---|
| 2,873,994 | A | 2/1959 | Omps |
| 3,170,682 | A * | 2/1965 | Eggers ................. B60G 11/08 280/124.135 |
| 3,429,566 | A | 2/1969 | Rosendale |
| 4,148,505 | A | 4/1979 | Jensen et al. |
| 4,307,865 | A | 12/1981 | MacCready |
| 4,458,918 | A * | 7/1984 | Rumpel ................. B60G 3/28 280/124.171 |
| 4,460,215 | A | 7/1984 | Chamberlain et al. |
| 4,527,828 | A | 7/1985 | Groce et al. |
| 4,557,500 | A * | 12/1985 | Collard ................. B60G 11/08 280/124.171 |
| 4,619,466 | A * | 10/1986 | Schaible ............... F16F 1/3686 280/124.171 |
| 4,779,917 | A | 10/1988 | Campbell et al. |
| 4,887,841 | A * | 12/1989 | Cowburn ............... B60G 11/08 280/124.171 |
| 5,015,545 | A | 5/1991 | Brooks |
| 5,039,124 | A | 8/1991 | Widmer |
| 5,069,306 | A * | 12/1991 | Inoue .................... B60G 11/08 280/124.171 |
| 5,141,209 | A * | 8/1992 | Sano .................... F16F 1/3686 267/260 |
| 5,501,289 | A | 3/1996 | Nishikawa et al. |
| 5,807,205 | A | 9/1998 | Odaka et al. |
| 5,827,149 | A | 10/1998 | Sponable |
| 5,833,026 | A * | 11/1998 | Zetterstrom ........... B60G 3/202 280/124.135 |
| 6,029,987 | A * | 2/2000 | Hoffman ............... B60G 11/10 267/260 |
| 6,457,729 | B2 * | 10/2002 | Stenvall ................ B60G 11/08 280/124.171 |
| 6,512,347 | B1 | 1/2003 | Hellmann et al. |
| 6,688,586 | B1 * | 2/2004 | Moore ................... B60G 11/08 267/230 |
| 6,705,668 | B1 | 3/2004 | Makita et al. |
| 6,710,916 | B1 | 3/2004 | Bolshtyansky |
| 6,712,164 | B2 | 3/2004 | Chernoff et al. |
| 6,726,438 | B2 | 4/2004 | Chernoff et al. |
| 6,766,873 | B2 | 7/2004 | Chernoff et al. |
| 6,768,932 | B2 | 7/2004 | Claypole et al. |
| 6,811,169 | B2 * | 11/2004 | Schroeder ............. F16F 1/185 280/124.171 |
| 6,830,117 | B2 | 12/2004 | Chernoff et al. |
| 6,836,943 | B2 | 1/2005 | Chernoff et al. |
| 6,843,336 | B2 | 1/2005 | Chernoff et al. |
| 6,845,839 | B2 | 1/2005 | Chernoff et al. |
| 6,857,498 | B2 | 2/2005 | Vitale et al. |
| 6,863,290 | B2 * | 3/2005 | Yokoyama ............. B60G 11/08 280/124.171 |
| 6,880,856 | B2 | 4/2005 | Chernoff et al. |
| 6,889,785 | B2 | 5/2005 | Chernoff et al. |
| 6,899,194 | B2 | 5/2005 | Chernoff et al. |
| 6,905,138 | B2 | 6/2005 | Borroni-Bird et al. |
| 6,923,281 | B2 | 8/2005 | Chernoff et al. |
| 6,923,282 | B2 | 8/2005 | Chernoff et al. |
| 6,935,449 | B2 | 8/2005 | Chernoff et al. |
| 6,935,658 | B2 | 8/2005 | Chernoff et al. |
| 6,938,712 | B2 | 9/2005 | Chernoff et al. |
| 6,948,226 | B2 | 9/2005 | Chernoff et al. |
| 6,959,475 | B2 | 11/2005 | Chernoff et al. |
| 6,968,918 | B2 | 11/2005 | Chernoff et al. |
| 6,976,307 | B2 | 12/2005 | Chernoff et al. |
| 6,986,401 | B2 | 1/2006 | Chernoff et al. |
| 6,991,060 | B2 | 1/2006 | Chernoff et al. |
| 7,000,318 | B2 | 2/2006 | Chernoff et al. |
| 7,004,502 | B2 | 2/2006 | Borroni-Bird et al. |
| 7,028,791 | B2 | 4/2006 | Chernoff et al. |
| 7,029,017 | B2 * | 4/2006 | Zandbergen .......... B60G 11/44 280/124.171 |
| 7,036,848 | B2 | 5/2006 | Chernoff et al. |
| 7,083,016 | B2 | 8/2006 | Chernoff et al. |
| 7,096,986 | B2 | 8/2006 | Borroni-Bird et al. |
| 7,104,581 | B2 | 9/2006 | Chernoff et al. |
| 7,111,900 | B2 | 9/2006 | Chernoff et al. |
| 7,213,673 | B2 | 5/2007 | Shabana et al. |
| 7,237,829 | B2 | 7/2007 | Latimer, III et al. |
| 7,275,609 | B2 | 10/2007 | Chernoff et al. |
| 7,281,600 | B2 | 10/2007 | Chernoff et al. |
| 7,292,992 | B2 | 11/2007 | Chernoff et al. |
| 7,303,033 | B2 | 12/2007 | Chernoff et al. |
| 7,303,211 | B2 | 12/2007 | Borroni-Bird et al. |
| 7,360,816 | B2 | 4/2008 | Chernoff et al. |
| 7,370,886 | B2 | 5/2008 | Luttinen et al. |
| 7,373,315 | B2 | 5/2008 | Chernoff et al. |
| 7,398,846 | B2 | 7/2008 | Young et al. |
| 7,441,615 | B2 | 10/2008 | Borroni-Bird et al. |
| 7,469,956 | B2 | 12/2008 | Yasuhara et al. |
| 7,520,355 | B2 | 4/2009 | Chaney |
| 7,597,169 | B2 | 10/2009 | Borroni-Bird et al. |
| 7,681,943 | B2 | 3/2010 | Murata et al. |
| 7,753,428 | B2 | 7/2010 | Kato et al. |
| 7,936,113 | B2 | 5/2011 | Namuduri et al. |
| 8,143,766 | B2 | 3/2012 | Namuduri et al. |
| 8,253,281 | B2 | 8/2012 | Namuduri et al. |
| 8,308,148 | B2 | 11/2012 | Shand |
| 8,448,696 | B2 | 5/2013 | Johnston et al. |
| 8,485,543 | B2 * | 7/2013 | Richardson ........... B62D 7/08 280/124.167 |
| 8,556,282 | B2 * | 10/2013 | Pollmeyer .............. B60G 3/28 280/124.171 |
| 8,640,806 | B2 * | 2/2014 | Worup ................. B62D 63/025 180/209 |
| 8,708,392 | B2 | 4/2014 | Otsuka et al. |
| 8,757,719 | B2 | 6/2014 | Hayakawa |
| 8,881,883 | B2 * | 11/2014 | Barton ................. F16H 63/3425 192/219.5 |
| 8,936,265 | B2 | 1/2015 | Ehrlich et al. |
| 8,940,425 | B2 | 1/2015 | Toepfer |
| 9,162,546 | B2 | 10/2015 | Girelli Consolaro et al. |
| 9,457,746 | B1 | 10/2016 | Baccouche et al. |
| 9,566,840 | B2 | 2/2017 | Seethaler et al. |
| 9,627,721 | B2 | 4/2017 | Kosaki et al. |
| 9,676,418 | B1 * | 6/2017 | Mohammed .......... B62D 25/08 |
| 9,682,727 | B2 | 6/2017 | Tanaka et al. |
| 9,751,565 | B2 | 9/2017 | Tatsuwaki et al. |
| 9,988,100 | B2 | 6/2018 | Kim et al. |
| 10,131,381 | B2 | 11/2018 | Ashraf et al. |
| 10,293,860 | B1 | 5/2019 | Cooper et al. |
| 10,336,369 | B2 | 7/2019 | Viaux et al. |

(56) References Cited

U.S. PATENT DOCUMENTS

| | | |
|---|---|---|
| 10,421,424 B2 | 9/2019 | Sabu et al. |
| 10,486,513 B2 * | 11/2019 | Battaglia ................ B60G 11/08 |
| 10,632,857 B2 | 4/2020 | Matecki et al. |
| 10,741,809 B2 | 8/2020 | Kim et al. |
| 11,225,117 B2 * | 1/2022 | Senoo ................. B60G 13/005 |
| 11,292,326 B2 | 4/2022 | McCarron et al. |
| 11,833,895 B2 | 12/2023 | McCarron et al. |
| 2002/0005268 A1 | 1/2002 | Noda et al. |
| 2002/0149490 A1 | 10/2002 | Butler et al. |
| 2003/0037427 A1 | 2/2003 | Chernoff et al. |
| 2003/0037967 A1 | 2/2003 | Chernoff et al. |
| 2003/0037968 A1 | 2/2003 | Chernoff et al. |
| 2003/0037970 A1 | 2/2003 | Chernoff et al. |
| 2003/0037971 A1 | 2/2003 | Chernoff et al. |
| 2003/0037972 A1 | 2/2003 | Chernoff et al. |
| 2003/0037973 A1 | 2/2003 | Chernoff et al. |
| 2003/0037974 A1 | 2/2003 | Chernoff et al. |
| 2003/0037975 A1 | 2/2003 | Chernoff et al. |
| 2003/0037982 A1 | 2/2003 | Chernoff et al. |
| 2003/0037987 A1 | 2/2003 | Chernoff et al. |
| 2003/0038442 A1 | 2/2003 | Chernoff et al. |
| 2003/0038467 A1 | 2/2003 | Chernoff et al. |
| 2003/0038468 A1 | 2/2003 | Chernoff et al. |
| 2003/0038469 A1 | 2/2003 | Chernoff et al. |
| 2003/0038470 A1 | 2/2003 | Chernoff et al. |
| 2003/0038509 A1 | 2/2003 | Chernoff et al. |
| 2003/0040827 A1 | 2/2003 | Chernoff et al. |
| 2003/0040828 A1 | 2/2003 | Chernoff et al. |
| 2003/0040933 A1 | 2/2003 | Chernoff et al. |
| 2003/0040977 A1 | 2/2003 | Chernoff et al. |
| 2003/0040979 A1 | 2/2003 | Borroni-Bird et al. |
| 2003/0046802 A1 | 3/2003 | Chernoff et al. |
| 2003/0047362 A1 | 3/2003 | Chernoff et al. |
| 2003/0080577 A1 | 5/2003 | Roberts et al. |
| 2003/0089536 A1 | 5/2003 | Chernoff et al. |
| 2003/0094318 A1 | 5/2003 | Chernoff et al. |
| 2003/0094319 A1 | 5/2003 | Chernoff et al. |
| 2003/0094320 A1 | 5/2003 | Chernoff et al. |
| 2003/0116374 A1 | 6/2003 | Chernoff et al. |
| 2003/0141736 A1 | 7/2003 | Chernoff et al. |
| 2003/0159866 A1 | 8/2003 | Claypole et al. |
| 2003/0164255 A1 | 9/2003 | Borroni-Bird et al. |
| 2003/0168267 A1 | 9/2003 | Borroni-Bird et al. |
| 2003/0168844 A1 | 9/2003 | Borroni-Bird et al. |
| 2004/0060750 A1 | 4/2004 | Chernoff et al. |
| 2004/0066025 A1 | 4/2004 | Borroni-Bird et al. |
| 2004/0069545 A1 | 4/2004 | Chernoff et al. |
| 2004/0069556 A1 | 4/2004 | Chernoff et al. |
| 2004/0129487 A1 | 7/2004 | Shabana et al. |
| 2004/0163859 A1 | 8/2004 | Chernoff et al. |
| 2004/0163875 A1 | 8/2004 | Chernoff et al. |
| 2004/0164577 A1 | 8/2004 | Shabana et al. |
| 2004/0189054 A1 | 9/2004 | Chernoff et al. |
| 2004/0194280 A1 | 10/2004 | Borroni-Bird et al. |
| 2004/0194313 A1 | 10/2004 | Chernoff et al. |
| 2004/0195014 A1 | 10/2004 | Chernoff et al. |
| 2005/0049944 A1 | 3/2005 | Chernoff et al. |
| 2005/0082872 A1 | 4/2005 | Rich et al. |
| 2005/0121926 A1 | 6/2005 | Montanvert et al. |
| 2005/0161981 A1 | 7/2005 | Chernoff et al. |
| 2005/0168016 A1 | 8/2005 | Svartvatn |
| 2005/0263332 A1 | 12/2005 | Chernoff et al. |
| 2006/0027406 A1 | 2/2006 | Borroni-Bird et al. |
| 2006/0048994 A1 | 3/2006 | Young et al. |
| 2006/0061080 A1 | 3/2006 | Luttinen et al. |
| 2006/0102398 A1 | 5/2006 | Mizuno |
| 2007/0222251 A1 | 9/2007 | Abraham |
| 2008/0169671 A1 | 7/2008 | Hedderly |
| 2009/0058134 A1 | 3/2009 | Hiraishi et al. |
| 2009/0236877 A1 | 9/2009 | Peschansky et al. |
| 2010/0219720 A1 * | 9/2010 | Namuduri ................ F16F 1/06 |
| | | 310/319 |
| 2010/0219721 A1 | 9/2010 | Namuduri et al. |
| 2010/0219798 A1 | 9/2010 | Namuduri et al. |
| 2010/0242513 A1 | 9/2010 | Nishino et al. |
| 2010/0273411 A1 | 10/2010 | Kakizaki et al. |
| 2010/0314905 A1 | 12/2010 | Mori |
| 2011/0212355 A1 | 9/2011 | Essinger et al. |
| 2011/0259657 A1 | 10/2011 | Fuechtner |
| 2011/0296855 A1 | 12/2011 | Johnston et al. |
| 2012/0049664 A1 | 3/2012 | Yokoyama et al. |
| 2012/0169089 A1 | 7/2012 | Rawlinson et al. |
| 2012/0174602 A1 | 7/2012 | Olivier et al. |
| 2012/0175899 A1 | 7/2012 | Gadhiya et al. |
| 2012/0183815 A1 | 7/2012 | Johnston et al. |
| 2013/0088045 A1 | 4/2013 | Charbonneau et al. |
| 2013/0300138 A1 | 11/2013 | Banasiak et al. |
| 2013/0341882 A1 * | 12/2013 | Ehrlich ................. B60G 3/202 |
| | | 280/124.128 |
| 2014/0308551 A1 | 10/2014 | Schroeder et al. |
| 2014/0353937 A1 * | 12/2014 | Girelli Consolaro .... B60G 3/20 |
| | | 280/124.128 |
| 2015/0142245 A1 | 5/2015 | Cuddihy et al. |
| 2015/0258955 A1 | 9/2015 | Jayasuriya et al. |
| 2015/0298741 A1 | 10/2015 | Winberg et al. |
| 2016/0003553 A1 | 1/2016 | Campbell |
| 2016/0023532 A1 | 1/2016 | Gauthier |
| 2016/0107501 A1 | 4/2016 | Johnston |
| 2016/0107506 A1 | 4/2016 | Johnston |
| 2016/0164055 A1 | 6/2016 | Saitou |
| 2016/0207251 A1 * | 7/2016 | Moeller ................ F16F 1/3683 |
| 2016/0318409 A1 | 11/2016 | Rawlinson |
| 2017/0001507 A1 | 1/2017 | Ashraf et al. |
| 2017/0001667 A1 | 1/2017 | Ashraf et al. |
| 2017/0057546 A1 | 3/2017 | Dressel et al. |
| 2017/0225588 A1 | 8/2017 | Newman |
| 2017/0225714 A1 | 8/2017 | Ito |
| 2017/0305248 A1 | 10/2017 | Hara |
| 2017/0369112 A1 | 12/2017 | Ashraf et al. |
| 2018/0050606 A1 | 2/2018 | Sugitate et al. |
| 2018/0050607 A1 | 2/2018 | Matecki et al. |
| 2018/0065678 A1 | 3/2018 | Tutzer |
| 2018/0072131 A1 | 3/2018 | Lee et al. |
| 2018/0086224 A1 | 3/2018 | King |
| 2018/0097265 A1 | 4/2018 | Tarlau et al. |
| 2018/0105062 A1 | 4/2018 | Fees et al. |
| 2018/0108891 A1 | 4/2018 | Fees et al. |
| 2018/0215245 A1 | 8/2018 | Sudhindra et al. |
| 2018/0229628 A1 | 8/2018 | Minato et al. |
| 2018/0261899 A1 | 9/2018 | Milton et al. |
| 2018/0281864 A1 | 10/2018 | Nishigaki et al. |
| 2018/0337377 A1 | 11/2018 | Stephens et al. |
| 2018/0337378 A1 | 11/2018 | Stephens et al. |
| 2018/0361819 A1 | 12/2018 | Ryu et al. |
| 2019/0023321 A1 | 1/2019 | Ayukawa |
| 2019/0054956 A1 | 2/2019 | Stenvall |
| 2019/0070924 A1 | 3/2019 | Mancini et al. |
| 2019/0092113 A1 * | 3/2019 | Girelli Consolaro .. B60G 11/08 |
| 2019/0131602 A1 | 5/2019 | Hilfrich et al. |
| 2019/0135065 A1 * | 5/2019 | Wolf-Monheim ..... B60G 11/08 |
| 2019/0210470 A1 | 7/2019 | Thomas et al. |
| 2019/0225051 A1 | 7/2019 | Zenner et al. |
| 2019/0308669 A1 | 10/2019 | Aitharaju et al. |
| 2020/0079177 A1 | 3/2020 | Ferraris et al. |
| 2020/0079431 A1 | 3/2020 | Stainer et al. |
| 2020/0114973 A1 | 4/2020 | Takahashi et al. |
| 2020/0152926 A1 | 5/2020 | Wynn et al. |
| 2020/0156486 A1 | 5/2020 | Howard et al. |
| 2020/0215943 A1 * | 7/2020 | Hayashi ................. B60N 2/26 |
| 2020/0231218 A1 | 7/2020 | Arvidsson et al. |
| 2020/0339197 A1 | 10/2020 | Kecalevic et al. |
| 2020/0369140 A1 * | 11/2020 | McCarron ........... B62D 21/152 |
| 2020/0398732 A1 | 12/2020 | Glatfelter et al. |
| 2021/0070123 A1 * | 3/2021 | Haeusler ............. B60G 15/067 |
| 2021/0091352 A1 | 3/2021 | Weicker et al. |
| 2021/0122223 A1 | 4/2021 | McCarron et al. |
| 2021/0273285 A1 | 9/2021 | Bluemel |
| 2023/0102921 A1 | 3/2023 | Odhekar et al. |

FOREIGN PATENT DOCUMENTS

| | | |
|---|---|---|
| CN | 1675092 A | 9/2005 |
| CN | 1695050 A | 11/2005 |
| CN | 1791519 A | 6/2006 |

(56) References Cited

FOREIGN PATENT DOCUMENTS

| | | |
|---|---|---|
| CN | 100379612 C | 4/2008 |
| CN | 201217453 Y | 4/2009 |
| CN | 102275521 A | 12/2011 |
| CN | 102548780 A | 7/2012 |
| CN | 103183053 | 7/2013 |
| CN | 204150116 U | 2/2015 |
| CN | 104417303 A | 3/2015 |
| CN | 105522888 A | 4/2016 |
| CN | 106458123 A | 2/2017 |
| CN | 205916190 U | 2/2017 |
| CN | 106573651 A | 4/2017 |
| CN | 206287960 U | 6/2017 |
| CN | 107074051 A | 8/2017 |
| CN | 206417059 U | 8/2017 |
| CN | 107651021 A | 2/2018 |
| CN | 107709074 A | 2/2018 |
| CN | 107792185 A | 3/2018 |
| CN | 107813674 A | 3/2018 |
| CN | 108357565 A | 8/2018 |
| CN | 108860040 A | 11/2018 |
| CN | 108891248 A | 11/2018 |
| CN | 208069806 U | 11/2018 |
| CN | 109204462 A | 1/2019 |
| CN | 109291747 A | 2/2019 |
| CN | 110053451 A | 7/2019 |
| CN | 210149098 U | 3/2020 |
| DE | 3430129 A1 | 2/1986 |
| DE | 10154353 A1 | 5/2002 |
| DE | 10297137 T5 | 8/2004 |
| DE | 10297133 B4 | 5/2013 |
| DE | 102018123357 A1 | 3/2019 |
| DE | 102018122854 A1 | 3/2020 |
| DE | 102020101867 A1 | 7/2020 |
| EP | 0770517 A1 | 5/1997 |
| EP | 0857590 A1 | 8/1998 |
| EP | 1245436 A1 | 10/2002 |
| EP | 1446645 A2 | 8/2004 |
| EP | 1448969 A1 | 8/2004 |
| EP | 2392486 A2 | 12/2011 |
| EP | 3088230 A1 | 11/2016 |
| FR | 8239 E | 2/1908 |
| FR | 2821046 A1 | 8/2002 |
| FR | 2938475 A1 | 5/2010 |
| GB | 191217101 A | 6/1913 |
| JP | S63-151515 A | 6/1988 |
| JP | H01-158206 U | 11/1989 |
| JP | H03-91867 U | 9/1991 |
| JP | H04-83926 U | 7/1992 |
| JP | H05-19010 U | 3/1993 |
| JP | H11-78966 A | 3/1999 |
| JP | H11-348815 A | 12/1999 |
| JP | 2001-047828 A | 2/2001 |
| JP | 2002-229656 A | 8/2002 |
| JP | 2002-370544 A | 12/2002 |
| JP | 2004-338421 A | 12/2004 |
| JP | 2005500940 A | 1/2005 |
| JP | 2007-106320 A | 4/2007 |
| JP | 2007-303680 A | 11/2007 |
| JP | 2008512627 A | 4/2008 |
| JP | 2008149914 A | 7/2008 |
| JP | 2010221991 A | 10/2010 |
| JP | 2013-136308 A | 7/2013 |
| JP | 2014-127338 A | 7/2014 |
| JP | 2015-074244 A | 4/2015 |
| JP | 2017001441 A | 1/2017 |
| JP | 2018-176790 A | 11/2018 |
| KR | 10-2003-0046824 A | 6/2003 |
| KR | 10-1286675 B1 | 7/2013 |
| WO | 199104875 A1 | 4/1991 |
| WO | 2003018337 A2 | 3/2003 |
| WO | 2003018358 A2 | 3/2003 |
| WO | 2003018359 A2 | 3/2003 |
| WO | 2003018373 A1 | 3/2003 |
| WO | 2003019309 A1 | 3/2003 |
| WO | 2003050498 A1 | 6/2003 |
| WO | 2003054500 A2 | 7/2003 |
| WO | 2005084985 A1 | 9/2005 |
| WO | 2006029415 A2 | 3/2006 |
| WO | 2011134815 A1 | 11/2011 |
| WO | 2014173476 A1 | 10/2014 |
| WO | 2015128430 A1 | 9/2015 |
| WO | 2015136476 A1 | 9/2015 |
| WO | 2015151064 A1 | 10/2015 |
| WO | 2017136351 A2 | 8/2017 |
| WO | 2017207125 A1 | 12/2017 |
| WO | 2017215857 A1 | 12/2017 |
| WO | 2018149762 A1 | 8/2018 |
| WO | 2018158363 A1 | 9/2018 |
| WO | 2019169080 A1 | 9/2019 |
| WO | 2020236913 A1 | 11/2020 |
| WO | 2021050605 A1 | 3/2021 |
| WO | 2021055980 A1 | 3/2021 |
| WO | WO-2025078887 A1 * | 4/2025 ......... B60G 17/0275 |
| WO | WO-2025078888 A1 * | 4/2025 ......... B60G 17/0275 |

OTHER PUBLICATIONS

Invitation pursuant to Rule 63(1) EPC dated May 12, 2023, in connection with European Application No. 20809867.3, 7 pages.
Non-final Office Action dated Jul. 17, 2024, in connection with U.S. Appl. No. 17/646,653, 15 pages.
International Search Report and Written Opinion dated Nov. 30, 2020 in connection with International Patent Application No. PCT/US2020/050013, 10 pages.
International Search Report and Written Opinion dated Feb. 4, 2021 in connection with International Patent Application No. PCT/US2020/051870, 13 pages.
International Search Report and Written Opinion dated Feb. 5, 2021 in connection with International Patent Application No. PCT/US2020/051505, 12 pages.
International Search Report and Written Opinion dated Sep. 2, 2020 in connection with International Patent Application No. PCT/US2020/033769, 30 pages.
International Search Report and Written Opinion dated Dec. 14, 2020 in connection with International Patent Application No. PCT/US2020/051879, 8 pages.
International Search Report and Written Opinion dated Dec. 22, 2020 in connection with International Patent Application No. PCT/US2020/040788, 14 pages.
Non-Final Office Action dated Sep. 14, 2022 in connection with U.S. Appl. No. 17/016,299, 14 pages.
Notice of Allowance dated Nov. 7, 2022 in connection with U.S. Appl. No. 17/016,299, 5 pages.
Non-Final Office Action dated Jul. 20, 2021 in connection with U.S. Appl. No. 17/027,626, 20 pages.
Notice of Allowance dated Jul. 1, 2021 in connection with U.S. Appl. No. 17/142,889, 7 pages.
Notice of Allowance dated Sep. 28, 2021 in connection with U.S. Appl. No. 17/027,626, 7 pages.
Notice of Allowance dated Dec. 17, 2021 in connection with U.S. Appl. No. 16/920,375, 9 pages.
Notice of Allowance dated Nov. 29, 2021 in connection with U.S. Appl. No. 17/491,217, 10 pages.
Non-Final Office Action dated Jun. 7, 2022 in connection with U.S. Appl. No. 16/879,235, 14 pages.
Final Office Action dated Aug. 2, 2022 in connection with U.S. Appl. No. 16/879,235, 12 pages.
Cropley, "Williams reveals electric vehicle skateboard chassis," Autocar Industry News, Haymarket Media Group, Sep. 2017, 5 pages.
Office Action dated Feb. 13, 2023 in connection with Canadian Patent Application No. 3,145,383, 4 pages.
Notice of Reasons for Refusal dated Mar. 14, 2023 in connection with Japanese Patent Application No. 2021-568853, 4 pages.
Non-Final Office Action dated Mar. 24, 2023 in connection with U.S. Appl. No. 18/052,460, 8 pages.
Supplemental European Search Report dated Nov. 8, 2023, in connection with European Application No. 20863787.6, 10 pages.

(56) References Cited

OTHER PUBLICATIONS

Supplemental European Search Report dated Nov. 8, 2023, in connection with European Application No. 20865403.8, 13 pages.
Non-final Office Action dated Sep. 9, 2024, in connection with U.S. Appl. No. 17/761,997, 17 pages.
Rejection Decision dated Nov. 11, 2024, in connection with Chinese Application No. 202080073120.8, 28 pages.
Notification to Grant Patent Right for Invention dated Dec. 1, 2024, in connection with Chinese Application No. 202080048116.6, 3 pages.
Notice of Reasons for Refusal dated Dec. 3, 2024, in connection with Japanese Application No. 2023-101515, 8 pages.
Notification of the First Office Action dated Dec. 7, 2023, in connection with Chinese Application No. 202080079746.X, 16 pages.
Decision to Grant a Patent dated Jun. 20, 2023, in connection with Japanese Application No. 2021-568853, 6 pages.
Notice of Allowance dated Jul. 6, 2023, in connection with U.S. Appl. No. 16/879,235, 10 pages.
Notice of Grant dated Apr. 1, 2024, in connection with Chinese Application No. 202080052476.3, 8 pages.
Communication pursuant to Article 94(3) EPC dated Feb. 21, 2024, in connection with European Application No. 20920386.8, 10 pages.
Notice of Allowance dated Apr. 22, 2024, in connection with U.S. Appl. No. 17/651,221, 10 pages.
Non-Final Office Action dated Apr. 24, 2024, in connection with U.S. Appl. No. 17/646,656, 11 pages.
Supplementary European Search Report dated Dec. 5, 2023, in connection with European Application No. 20864821.2, 13 pages.
Office Action dated Nov. 2, 2023, in connection with Canadian Application No. 3,155,162, 7 pages.
Non-final Office Action dated Dec. 20, 2023, in connection with U.S. Appl. No. 17/646,653, 14 pages.
Notification of the Second Office Action dated Jan. 18, 2024, in connection with Chinese Application No. 202080048116.6, 14 pages.
Non-final Office Action dated Jan. 16, 2024, in connection with U.S. Appl. No. 17/646,656, 7 pages.
Notice of review opinion dated Jan. 11, 2024, in connection with Taiwanese Application No. 11320040860, 16 pages.
Supplementary European Search Report dated Jan. 16, 2024, in connection with European Application No. 20865142.2, 16 pages.
Rejection Decision dated May 27, 2024, in connection with Chinese Application No. 202080048116.6, 12 pages.
Notification to Grant Patent Right for Invention dated Jun. 10, 2024, in connection with Chinese Application No. 202080079746.X, 4 pages.
Notification to Grant Patent Right for Invention dated Jun. 20, 2024, in connection with Chinese Application No. 202080080584.1, 6 pages.
Supplementary Partial European Search Report dated Sep. 11, 2023, in connection with European Application No. 20864821.2, 14 pages.
Supplementary Partial European Search Report dated Sep. 19, 2023, in connection with European Application No. 20865142.2, 17 pages.
Final Office Action dated Aug. 1, 2024, in connection with U.S. Appl. No. 17/646,656, 9 pages.
Notice of Reasons for Rejection dated Aug. 6, 2024, in connection with Japanese Application No. 2023-114857, 11 pages.
Third Office Action dated Jul. 25, 2024, in connection with Chinese Application No. CN202080073120.8, 23 pages.
Notice of Reasons for Refusal dated Jun. 25, 2024, in connection with Japanese Application No. 2023-101515, 9 pages.
Notice of Allowance dated Jun. 19, 2024, in connection with Taiwanese Application No. 109116751, 3 pages.
Application Found Allowable dated May 24, 2024, in connection with Canadian Application No. 3,155,162, 1 page.
Commissioners Notice—Application Found Allowable dated Feb. 19, 2024, in connection with Canadian Application No. 3,145,383, 1 page.
Commissioners Notice—Application Found Allowable dated Feb. 8, 2024, in connection with Canadian Application No. 3,153,952, 1 page.
Notification of Second Office Action dated Mar. 5, 2024, in connection with Chinese Application No. 202080073120.8, 6 pages.
Notification of Second Office Action dated Mar. 5, 2024, in connection with Chinese Application No. 202080080584.1, 14 pages.
International Search Report and Written Opinion of the International Searching Authority dated Mar. 8, 2024, in connection with International Application No. PCT/US2023/080393, 9 pages.
Final Office Action dated Mar. 12, 2024, in connection with U.S. Appl. No. 17/646,653, 17 pages.
Commissioner's Notice—Application Found Allowable dated Feb. 12, 2024, in connection with Canadian Application No. 3,163,499, 1 page.
Supplementary European Search Report dated Jul. 24, 2023, in connection with European Patent Application No. 20809867.3, 24 pages.
Decision to Grant a Patent dated Aug. 15, 2023, in connection with Japanese Application No. 2021-577866, 5 pages.
Notification of the First Office Action dated Aug. 29, 2023, in connection with Chinese Patent Application No. 202080052476.3, 20 pages.
Notification of the First Office Action dated Sep. 1, 2023, in connection with Chinese Patent Application No. 202080073120.8, 17 pages.
Notification of the First Office Action dated Aug. 30, 2023, in connection with Chinese Patent Application No. 202080048116.6, 20 pages.
Notice of Allowance dated Sep. 12, 2023, in connection with Canadian Application No. 3,141,572, 1 page.
Office Action dated Aug. 10, 2023, in connection with Canadian Application No. 3,163,502, 3 pages.
Office Action dated Aug. 15, 2023, in connection with Canadian Application No. 3,163,499, 6 pages.
Notification of the First Office Action dated Aug. 16, 2023, in connection with Chinese Patent Application No. 202080080584.1, 20 pages.

* cited by examiner

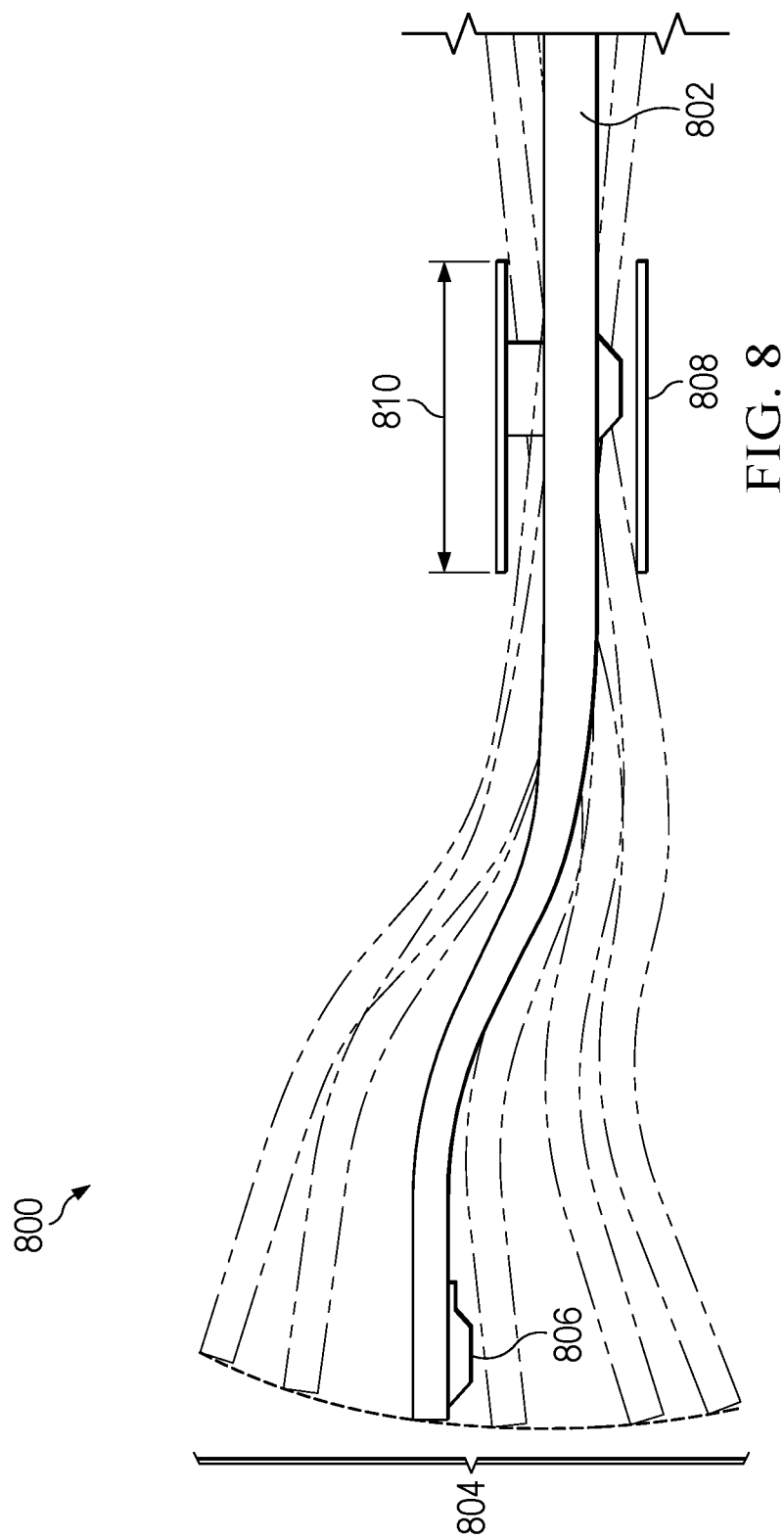

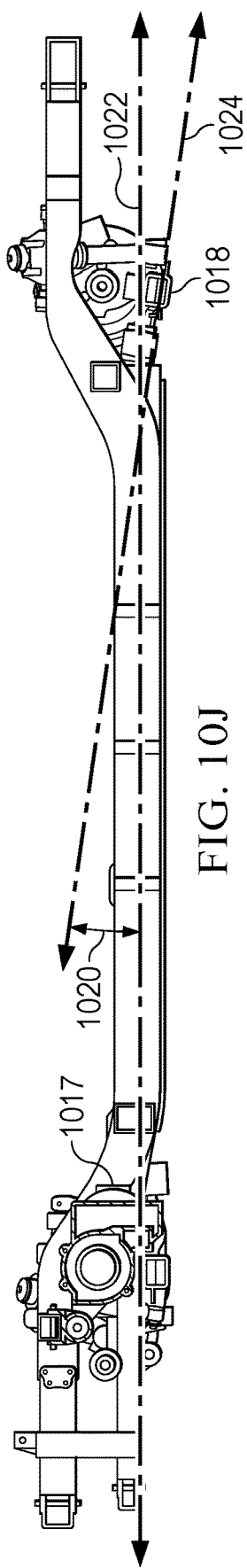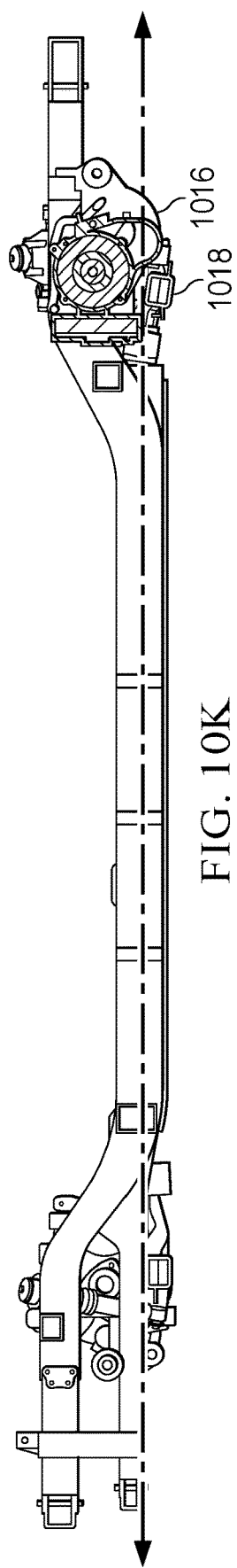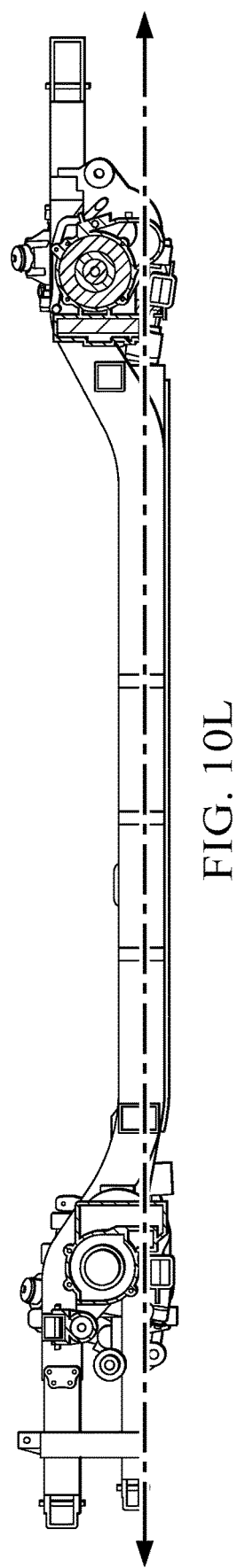
FIG. 10J
FIG. 10K
FIG. 10L

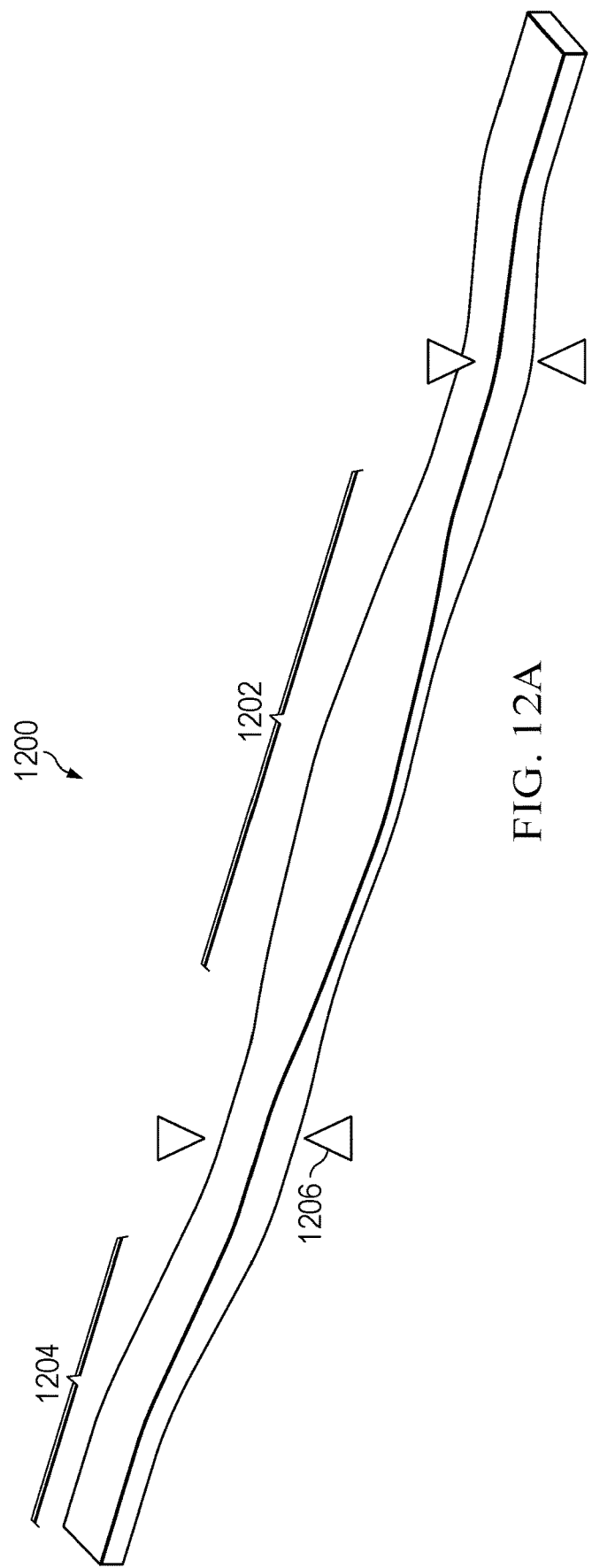

SUSPENSION SYSTEM

CROSS-REFERENCED APPLICATIONS

This application claims priority under 35 U.S.C. § 120 as a continuation of U.S. patent application Ser. No. 17/016,299 filed on Sep. 9, 2020, which claims priority under 35 U.S.C. § 119(e) to U.S. Provisional Patent Application No. 62/897,970 filed on Sep. 9, 2019. Both of these applications are hereby incorporated by reference in their entirety.

FIELD OF THE INVENTION

The present invention generally relates to electronic vehicles and suspension systems incorporated therein.

BACKGROUND

Automobiles generally are made up of a number of elements including a body or cabin designed to support one or more occupants, as well as a variety of other systems and subsystems that allow the occupant(s) to, among other things, maneuver the automobile in a safe and comfortable manner. Technological advancements in automobiles is also driving towards automobiles that are fully autonomous yet still provide a safe and comfortable ride for the occupants.

Among the various systems and subsystems that allow the ride to be safe and comfortable, are suspension systems. Suspension systems can include a number of components such as the chassis, the tires, control arm assemblies, and some type of shock absorber. The suspension system in traditional vehicles is designed to support the weight of the vehicle, including the body and chassis and other components, as well as absorb the forces that can occur from undulations or nonconformities in the road as the vehicle navigates across the terrain. There are a variety of types and classifications of suspensions systems that can be used on one or more wheels of a vehicle to accommodate that particular vehicle and allow the occupants to maintain stable and comfortable ride based on the desired use of the vehicle.

Throughout the development of automobiles, including electric, the combination of various suspension types and classifications have been used in devising new and improved suspension systems to meet the requirements for new vehicle. For example, the Chevrolet Corvette C4 and C5-C7 have incorporated the use of wishbone type systems with a transverse leaf spring in the front (C4) and front and rear (C5-C7) suspension systems to help produce an anti-roll effect. Chevrolet is among a variety of manufactures that have incorporated such features in combination with other mentioned elements to produce suspension systems for their individual vehicles. Accordingly, many manufactures have also experimented with a variety of concepts within the context of transverse leaf springs in vehicle designs. Such designs can be found in U.S. Pat. No. 5,141,209 (Honda), U.S. Pat. No. 6,029,987 (Porsche), U.S. Pat. No. 6,811,169 (Chrysler), and U.S. Pat. No. 7,029,017 (Ford).

All of the above mentioned suspension systems are designed to accommodate the bulky internal combustion space as well as act co-dependently with the body of the vehicle. Meaning that the suspension system is connected to both the chassis as well as the body in which the suspension system operates with both the body and the chassis to improve the ride.

The increasing development and practical use of electric vehicles is introducing a number of advantages that such vehicles have over conventional vehicles. Advantages such as smaller footprints of the drive train components, improvement in control systems allowing for drive by wire scenarios thus further reducing the mechanical connections between the cabin and the chassis, giving way to producing vehicle platforms that contain all the necessary functional components of a vehicle including the suspension. However, despite such advancements, many electric vehicle manufactures still maintain relics of the past and do not exploit the advantages that electric vehicles have to offer. As such, many of the mechanical connections between the chassis and the body remain. This is true even for the suspension systems.

SUMMARY OF THE INVENTION

Many embodiments are directed to suspension systems enclosed within a vehicle platform their design, methods of manufacture, subsystem components and materials.

Various embodiments are directed to vehicle suspension systems including:
 a frame structure of a vehicle platform having a variety of interconnected structural components each having a body with a top, a bottom and side elements that, when interconnected, make up a generally flat planar structure having a front portion, a rear portion, and a center portion, and further comprising a top and a bottom portion corresponding to the top and bottom elements respectively,
 a left and right control arm assembly, each having an upper and a lower control arm and a wheel mount structure wherein each of the upper and lower control arms have a first end and a second end where the first end is pivotably connected to the frame structure and the second end is rotatably connected to a wheel mount structure,
 a load dampening device having an elongated body that is compressible between an upper and lower component wherein the upper component is connected to the frame structure and the lower component is connected to the lower control arm, and
 one or more transverse leaf springs having an elongated body with a center portion and two outer portions and an upper surface and a lower surface and two side surfaces extending between a left and a right outer end, wherein the elongated body extends between the left and the right control arm assemblies and wherein the left and right ends are connected to the left and right control arm assemblies respectively through a mounting bracket attached at each of the outer ends, and wherein the transverse leaf spring also has at least two inner mounting brackets located at a distance between a center of the transverse leaf spring and the outer ends.

In some embodiments, the one or more left and right control arm assemblies comprises a front left and right control arm assembly and a rear left and right control arm assembly, wherein the one or more transverse leaf springs comprises a front transverse leaf spring and a rear transverse leaf spring, wherein the front transverse leaf spring comprises a front elongated body which extends between the front left and right control assemblies, and wherein the rear transverse leaf spring comprises a rear elongated body which extends between the rear left and right control assemblies.

In other embodiments, the suspension system further comprises a mounting bracket cover having a contoured body that is contoured to cover an inner mounting bracket and is connected to the frame structure with at least two attachment points.

In still other embodiments, the transverse leaf spring has a contoured elongated body such that a center portion of the elongated body deviates from a straight line in a downward direction such that the contoured portion extends below an electric drive system that is disposed within an internal space between the rails of the frame structure and wherein the electric drive system is attached to the frame structure.

In yet other embodiments, the first end of the upper control arm further comprises a forward and a rearward attachment point that connects to the rails of the frame structure via an opening in the rails of the frame structure such that at least a portion of the forward and rearward attachment points sit within the rails of the framework structure.

In yet still other embodiments, the inner mounting brackets are each moveable along the length of the transverse leaf spring wherein the position of the inner mounting brackets effects a movement envelope of the leaf spring.

In yet other embodiments, the suspension system further comprises second upper control arm, wherein the second upper control arm is pivotably connected to the rails of the frame work structure and rotatably connected to the wheel mount structure.

In other embodiments, the inner mounting brackets are configured to be mounted at various positions along center portion of the leaf spring such that various vehicle configurations may be supported by the suspension system.

In still other embodiments, each transverse leaf spring is configured such that when the inner mounting brackets are mounted proximal to the center of the center portion, the movement envelope of the transverse leaf spring is increased and when the inner mounting brackets are mounted proximal to the outside of the center portion, the movement envelope of the transverse leaf spring is decreased.

In yet other embodiments, the at least two inner mounting brackets comprises two inner mounting brackets positioned equidistance from the center of the center portion of the transverse leaf spring.

In still yet other embodiments, the at least two inner mounting brackets comprises two mounting brackets positioned at different distances from the center of the center portion of the transverse leaf spring.

In other embodiments, the at least two inner mounting brackets comprises a center mounting bracket mounted at the center of the center portion and two outer inner mounting brackets positioned at opposite sides of the center mounting bracket.

In still other embodiments, each inner mounting bracket fixedly contacts a top side and bottom side of the center portion.

In yet other embodiments, the center portion is positioned lower than the two outer ends.

In still yet other embodiments, the center portion comprises two narrower portions which surround a wider portion and wherein the at least two inner mounting brackets comprises two inner mounting brackets mounted on each of the narrower portions.

In other embodiments, the two narrower portions are thicker than the wider portion.

In still other embodiments, the suspension system further comprises at least a second lower control arm, wherein the at least second lower control arm is pivotably connected to the rails of the frame work structure and rotatably connected to the wheel mount structure.

In yet still other embodiments, the transverse leaf spring has a substantially rectangular cross section throughout the elongated body.

In other embodiments, the width of the middle portion is wider than the width of the outer portions.

In yet other embodiments, the height of the outer portions is higher than the height of the middle portion.

In still other embodiments, the width of the middle portion is 1.7 times greater than the width of the outer portions.

In yet still other embodiments, the height of the outer portions is 1.5 times greater than the height of the middle portion.

In other embodiments, the suspension system further comprises a body spacer, wherein the body spacer is disposed beneath the outer ends of the transverse leaf spring such that is positioned between the leaf spring mounting point and the lower control arm.

In yet other embodiments, the body spacer has a maximum height of 50 mm.

In still other embodiments, the body spacer has a minimum height of 1 mm.

In yet still other embodiments, the upper surface of the leaf spring is 50 mm away from an electric drive system housing disposed within the frame structure.

Other embodiments include a transverse leaf spring comprising an elongated body with a center portion and two outer portions and an upper surface and a lower surface and two side surfaces extending between a left and a right outer end, wherein the highest point of the cross-section of the transverse leaf spring on a vehicle centerline is at least 50 mm lower than the highest point of the upper surface of the left and right outer ends.

In other embodiments, the elongated body has a substantially rectangular cross section.

In still other embodiments, the vehicle suspension system has a vehicle cabin disposed on an upper portion of the framework such that the framework makes up a vehicle platform and wherein the left and right control arm assemblies, the load dampening device, and the one or more transverse leaf springs are solely connected to the vehicle platform.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 8 illustrates a movement envelope of a suspension system in accordance with embodiments of the invention.

FIG. 10J through 10N illustrate a vehicle platform and associated suspension systems in accordance with embodiments of the invention.

FIGS. 12A through 12C illustrate a variable cross section leaf spring in accordance with embodiments of the invention.

DETAILED DESCRIPTION OF THE INVENTION

Figure 1A:
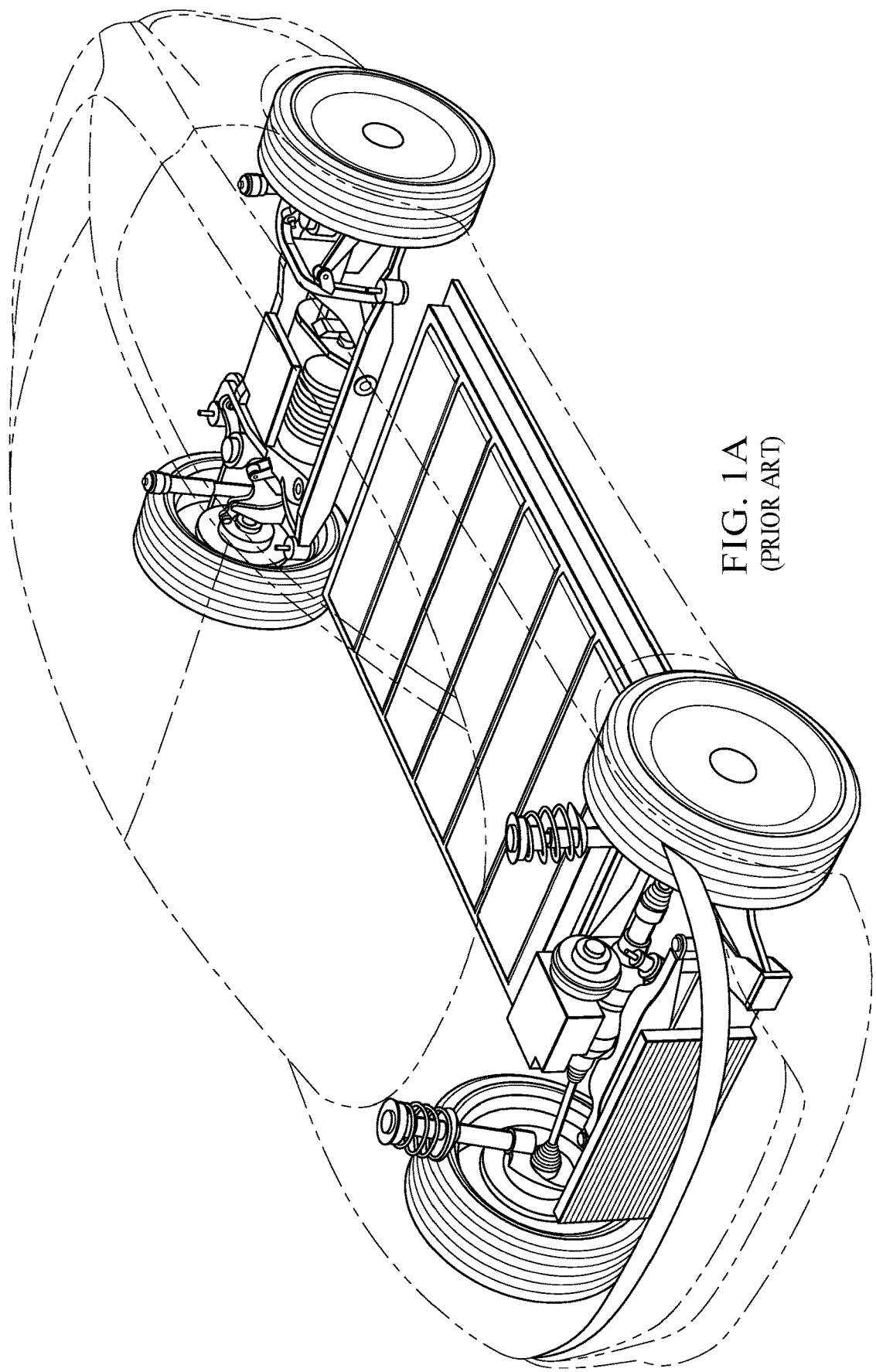
FIGS. 1A and 1B illustrate a traditional suspension system in accordance with prior art.

Turning now to the drawings, embodiments of a suspension system located within a common self-contained vehicle platform and connected to various elements of the platform including the chassis, steering control arm assembly and/or a spring damper arrangement are disclosed. In many embodiments, the front and rear suspension systems are configured to sit substantially within the profile of the vehicle platform such that none of the elements extends substantially above the relatively flat framework of the vehicle platform. In many embodiments, the suspension system utilizes a transverse leaf spring in combination with other suspension elements, such as damper, to allow the vehicle platform to maintain a generally flat profile and accommodate a variety of different top hat or body like structures. Many embodiments of the transverse leaf spring are adaptable such that the stiffness required to maintain roll and ride stability within context of the body derivatives can be sustained. Many embodiments of the leaf spring incorporate an out of plane profile and unique cross sectional dimensions allowing the functionality of the spring to be maintained while accommodating the space needed for a vehicle drive system. In many embodiments, the suspension system within the vehicle platform may cooperate with the other suspension components in such a manner that it does not require interaction with the body structure. In other words, it operates independently from the body and still is capable of supporting the ride and roll characteristics necessary to maintain a comfortable and stable ride. Such embodiments allow for a wide range of adaptability in terms of how the body structure is secured or mounted to the vehicle platform. For example, some embodiments may allow the body to be hard mounted without a traditional soft body mount bushing. In contrast, some embodiments may incorporate the traditional soft body mount bushings in conjunction with the embodiments of the suspension system.

The suspension system of a vehicle can be crucial to the overall function of the vehicle. Poor suspension systems can result in damage to other structures and features while properly tuned suspension systems can ensure the longevity of a vehicle. Electric vehicle manufacturers have approached how to package suspension systems with alternative fuel vehicles in a number of ways. Most rely on conventional suspension systems implementing struts, coils springs or bushings. The downside to these suspension designs is that they are difficult to package within the frame of the vehicle's underlying platform, as shown in the images of vehicle platforms from Volkswagen (FIG. 1a) and Tesla (FIG. 1b). Many embodiments of vehicle platforms according to the current disclosure increase the challenges in suspension design by implementing a hard mounted vehicle body atop the vehicle platform. While such hard mounting does remove the need for introducing bulk bushings between the vehicle platform and vehicle body (which would necessitate intrusion of such elements into the interior space of the vehicle body), the tradeoff is that the suspension is placed under enormous demands to address both ride and roll issues introduced by such a body/chassis interconnection.

In a dependent system, the wheels may be interconnected such that the movement of one wheel can affect the movement of the opposing wheel. In contrast, in an independent suspension system each of the wheels move independent of the other. Additionally, there are varieties of classifications of suspension systems such as MacPherson strut, push rod suspension, solid axle beam suspension, leaf spring suspension, or a wishbone suspension system. It is also possible for the classifications to be combined into an integrated suspension system.

As can be seen in the vast number of vehicles both electric and internal combustion, there can be any number of cabins or bodies for the vehicle. Within the context of the present invention, many embodiments incorporate a self-contained vehicle platform having the necessary components to drive a finished vehicle. Such components may include the battery, chassis control arms, steering, brakes, wheels, and suspension systems etc. Many such embodiments therefore would be a common vehicle platform that may be adaptable to any number of cabins or bodies that is desirable.

As there can be any number of vehicle cabins incorporated onto the vehicle platform of the many embodiments, it should be understood that each of the various vehicle derivatives could require a specific stiffness of the suspension system to ensure the basic ride and roll characteristics are met for the specific vehicle. For example, the stiffness of the suspension system on a passenger sedan may be significantly different from what might be required for a sport utility vehicle or a pickup truck. Furthermore, within the concept of the self-contained vehicle platform, having a design that allows for maximization of occupant space can be advantageous depending on the type of body to be used. Accordingly, the embodiments of the present invention illustrate a suspension system that may be adaptable to accommodate a variety of body types and be implemented within a common vehicle platform to engage with such body types.

Embodiments of a Suspension System

Suspension systems in accordance with embodiments are configured to allow for packaging within the confines of a vehicle platform while reducing the complexity. In accordance with various embodiments, the suspension systems of a self-contained vehicle platform may take on a variety of forms including independent suspension systems for each of the wheels or dependent or semi-independent suspension systems that operate collectively between two wheels in either the front or the rear of the vehicle. Many such embodiments implement a double wishbone independent suspension that incorporates a transverse mounted leaf spring that serves both as ride spring and anti-roll spring to avoid the need for additional coil springs or struts that would extend above the plane of the vehicle platform, and in some embodiments may eliminate the need for an additional anti-roll bar. Moreover, by removing the need for additional coil springs or struts there can be additional weight savings in the overall vehicle, thus increasing the efficiency and range.

Figure 2:
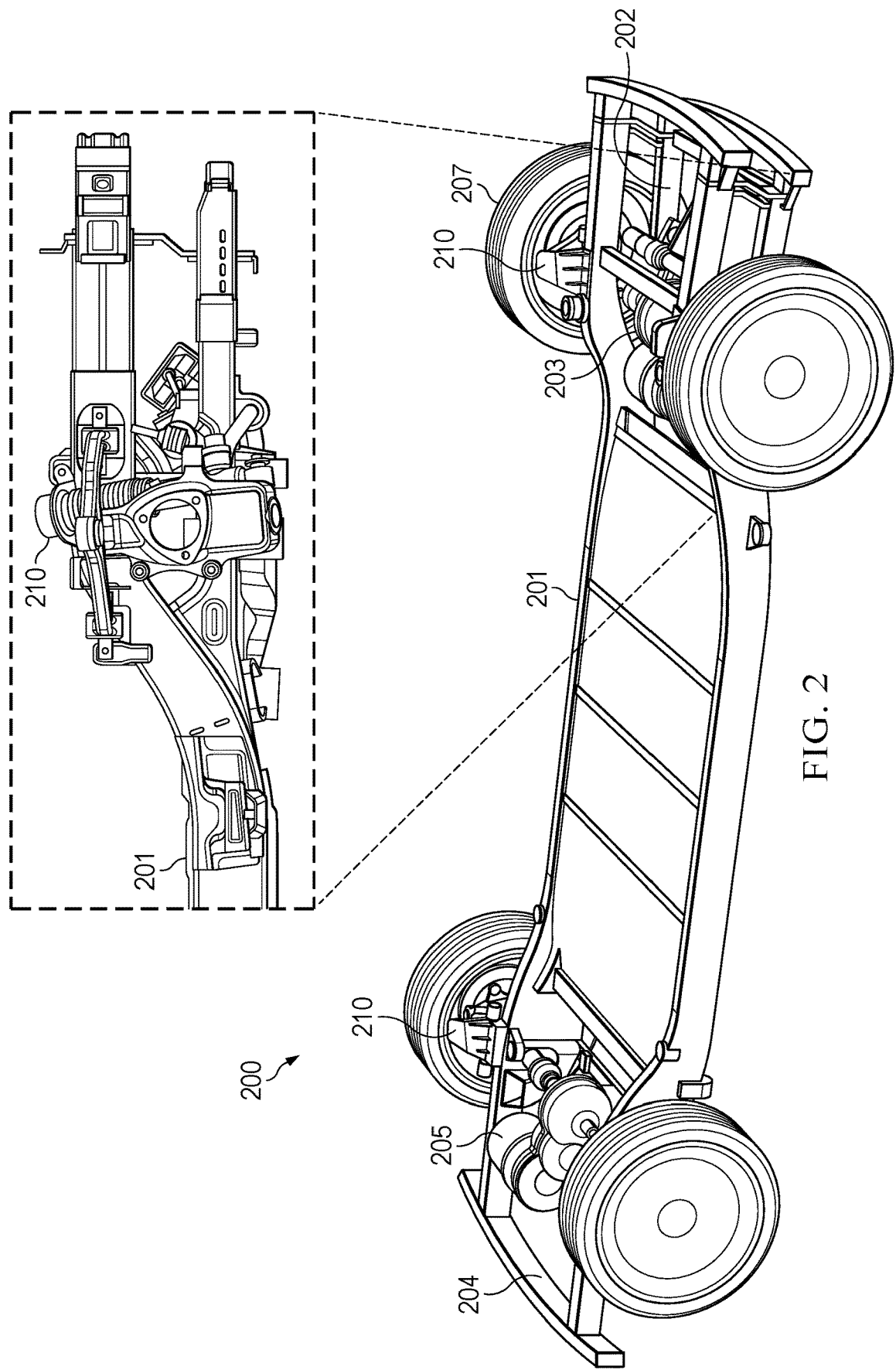
FIG. 2 illustrates an embodiment of a vehicle platform with a suspension system according to an embodiment.

FIG. 2 illustrates a self-contained electric vehicle platform 200 in accordance with embodiments. The embodiment of a vehicle platform has all the necessary functional components for the vehicle to drive. Included in such components may be a framework 201 that has a front space 202 for a front drive system 203 and a rear space 204 for a rear drive system 205. Additional elements may include an energy storage system 206 as well as front and rear tires 207. Finally, the vehicle platform may be configured with a suspension system 210 made up of a various components that will be discussed hereafter. Accordingly, the vehicle platform 200 may be adaptable to a variety of body structures that may be placed on top. Likewise, the suspension system 204 may be further illustrated to show the various elements of such that allow the suspension system to be adaptable to the variety of bodies.

Figure 3A:
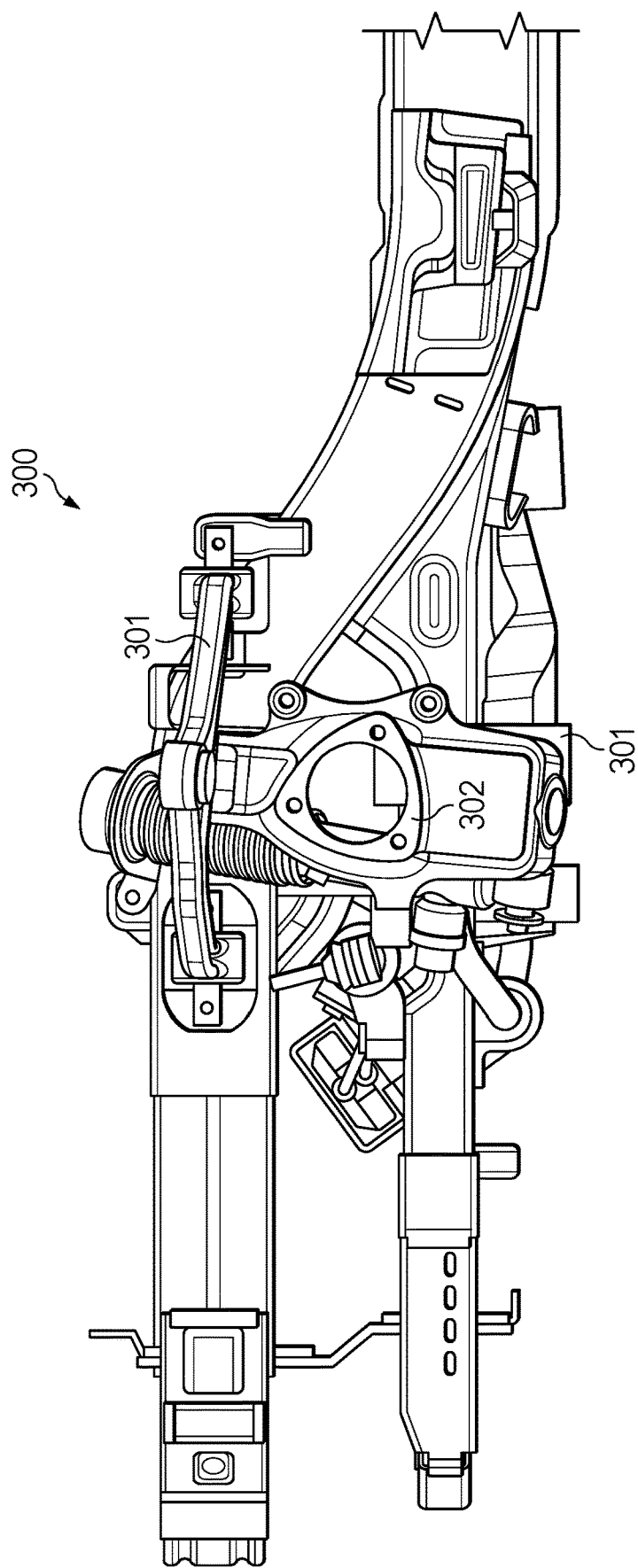
FIGS. 3A through 3G illustrate several views of a suspension system in accordance with embodiments of the invention.
Figure 3B:
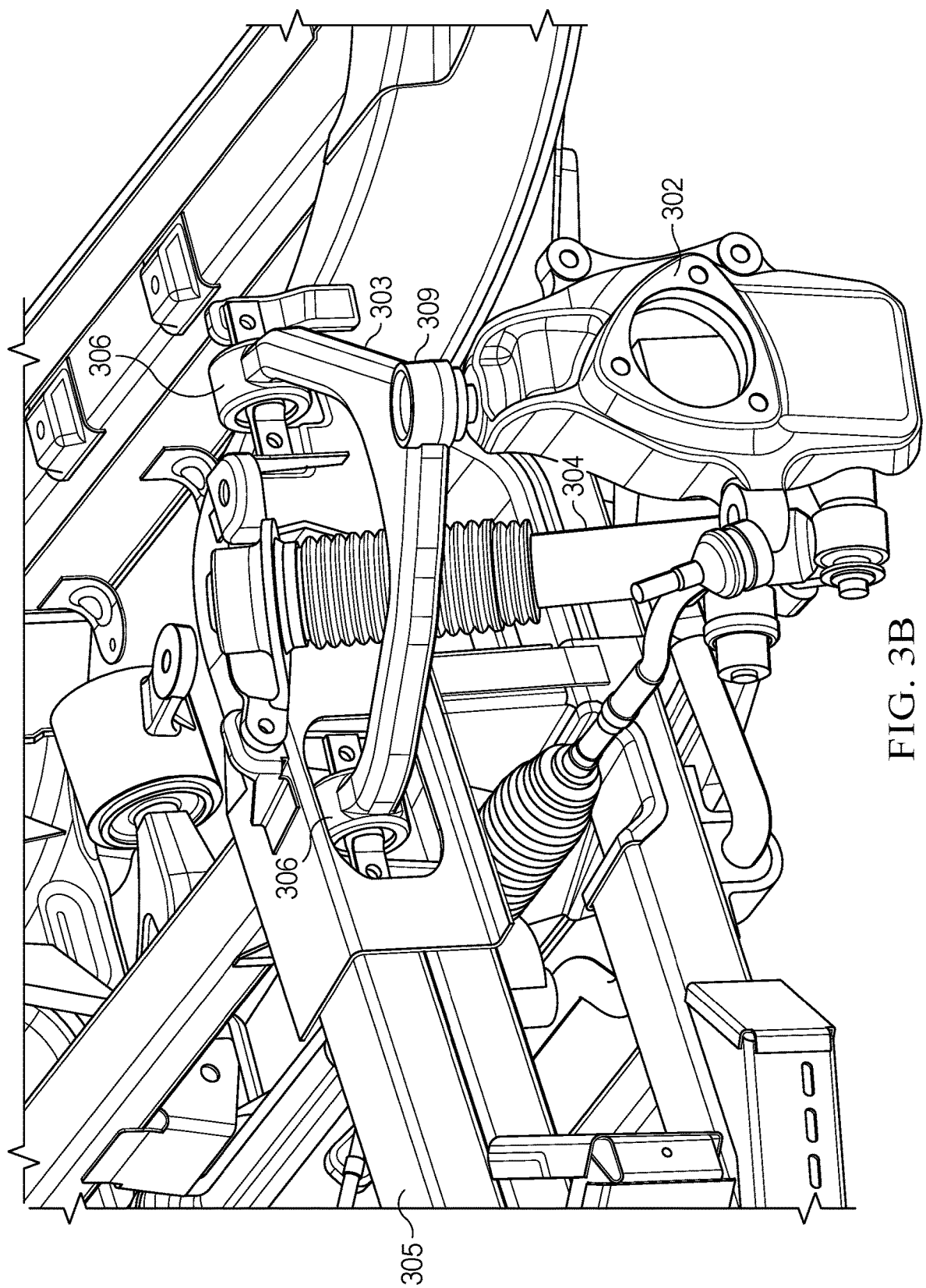
Figure 3C:
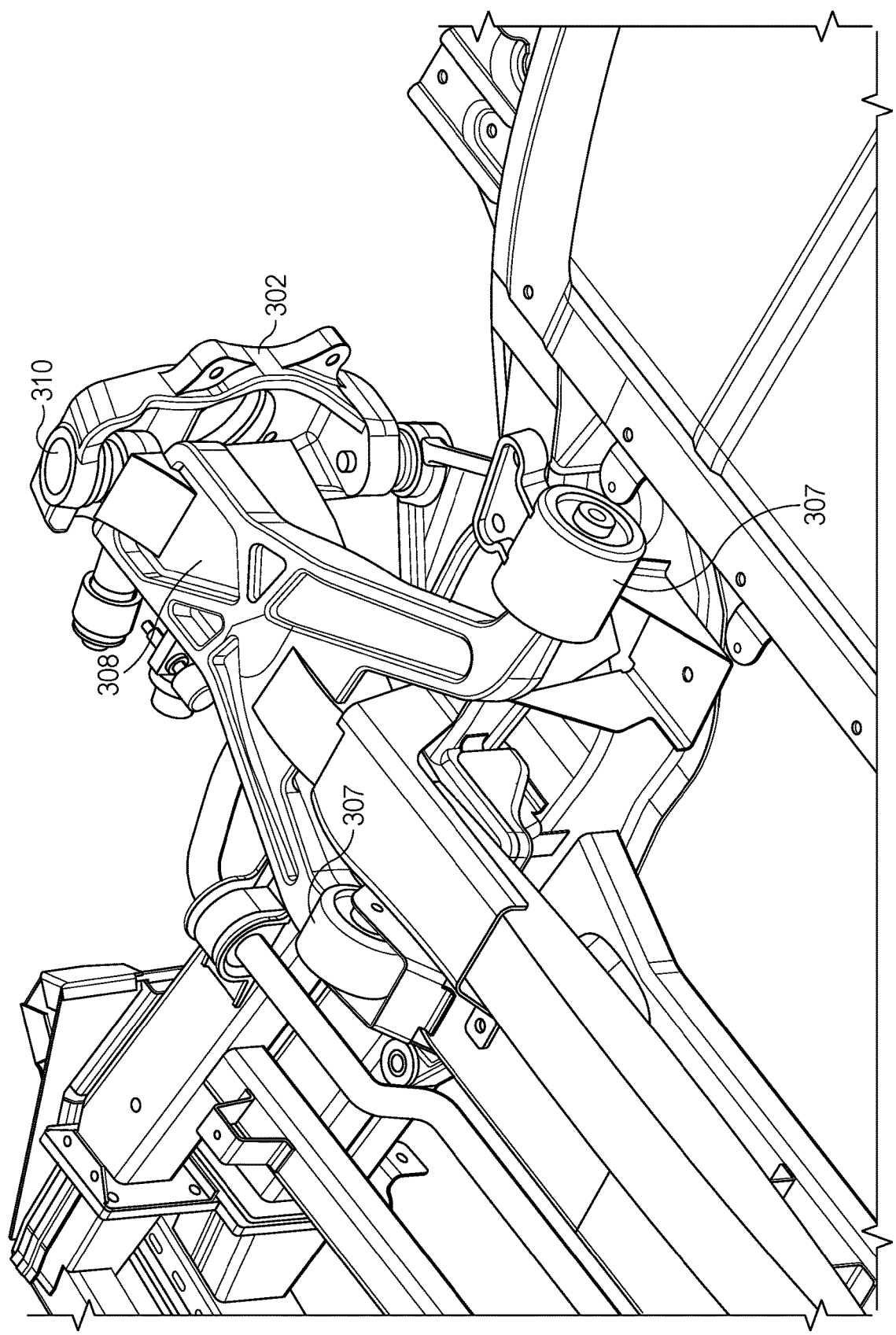

FIGS. 3A to 3C illustrate certain embodiments of suspension systems. As shown in various embodiments of suspension systems, a front suspension control arm assembly 300 of a vehicle platform may comprise a double wishbone structure 301 disposed around the steering knuckle or front wheel mount 302. The double wishbone structure (further illustrated in FIG. 3B) generally comprises an upper wishbone support arm 303 and a lower wishbone support arm (element 308 in FIG. 3C) and a damper 304 mounted between the two wishbones. As will be understood, the two wishbone arms 303/308 are secured and pivotably connected at one end to the platform frame 305 through pairs of pivot connections 306 and 307 (respectively) that allow relative vertical movement of the wishbone arms with respect to the frame 305. The wishbone arms can then be further rotationally connected to the front steering knuckle or front wheel mount 302 through rotational connectors 309 and 310 (upper and lower respectively) such that the steering knuckle 302 may be rotated by suitable control elements to steer the vehicle. By combining these joints, the wheels may move independently of each other and provide guidance to the vehicle. Various embodiments of a suspension system may also include at least one damper 304 per wheel is disposed securely between the lower wishbone arm 308 and the frame 305 such that vertical movement of the front steering knuckle or wheel mount 302 is dampened to reduce road shock and vibration being transmitted through the wishbone arms to the vehicle.

Figure 3D:
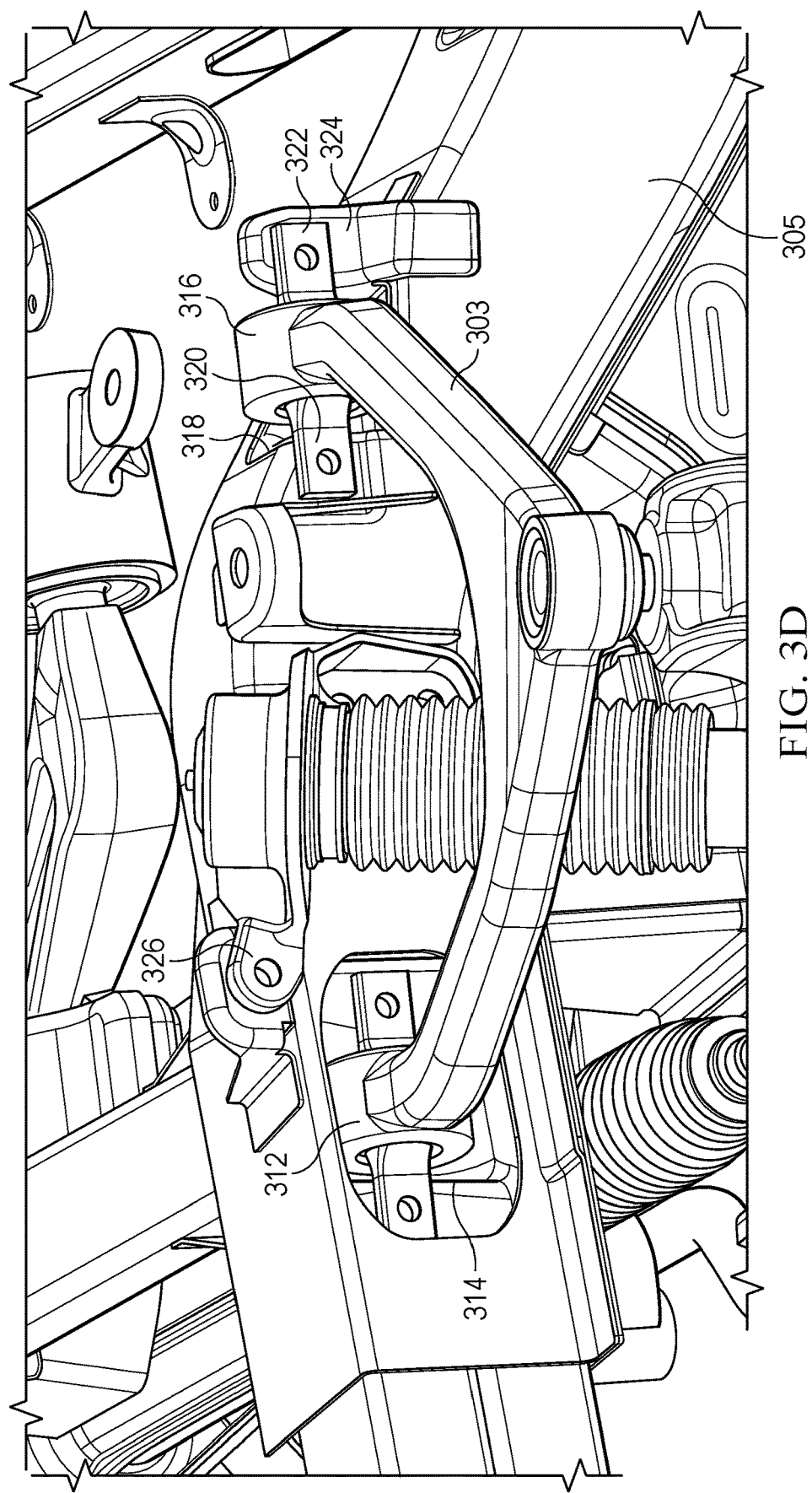
Figure 3E:
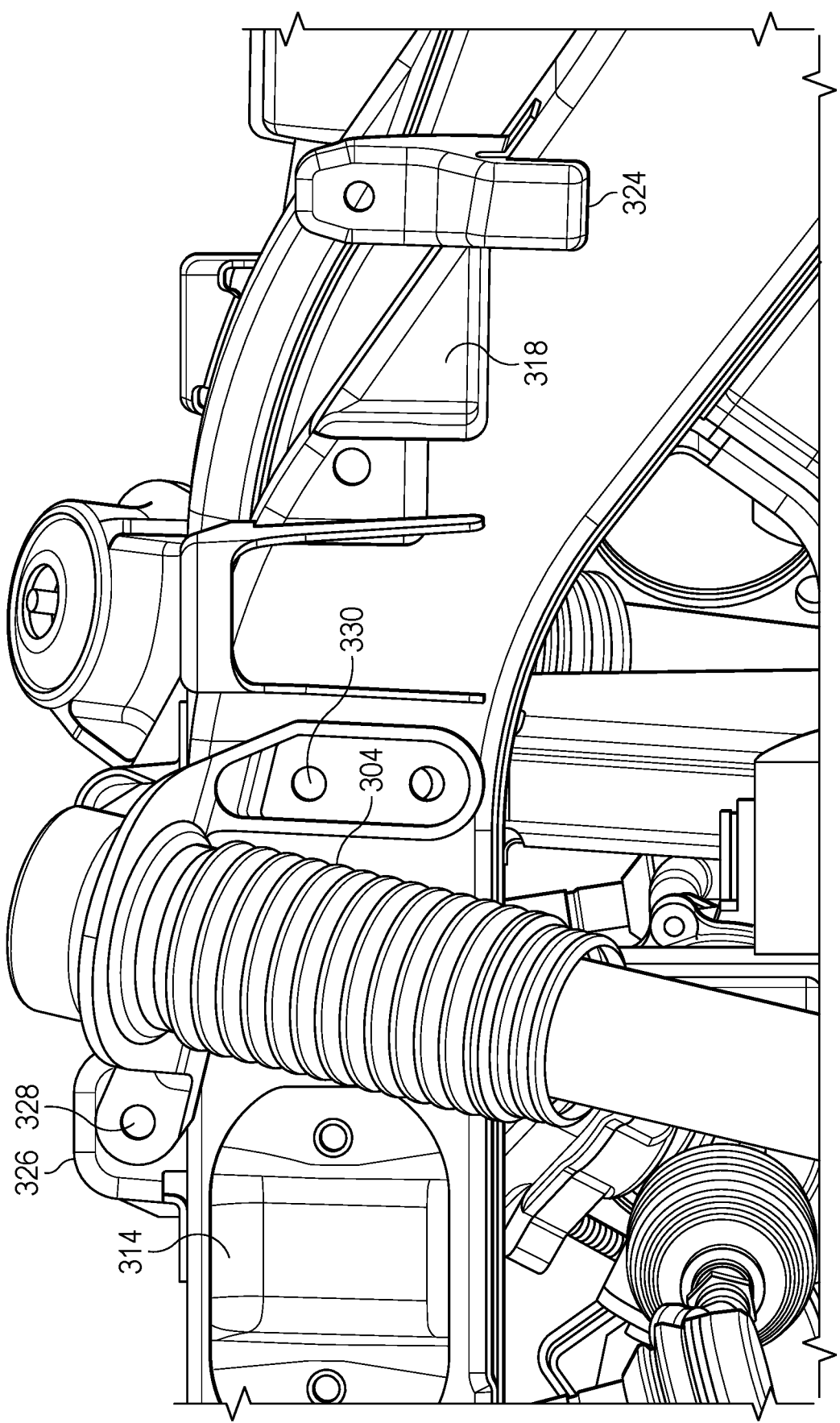

Although configurations of double wishbone suspensions are known in the art, integrating such suspension systems on a vehicle platform according to embodiments in such a way to minimize the location of suspension elements out of the plane of the vehicle platform have thus far not been described. According to many embodiments, as shown in FIGS. 3D and 3E, in order to package the upper wishbone support arm 303 within the space allotted for the front suspension the pivot interconnections of the upper wishbone support arm are located within the vertical plane defined by the body of the associated frame rail. In some embodiments, similar to those illustrated in FIGS. 3D and 3E, the frontward pivot interconnection 312 of the upper wishbone support arm 303 may be disposed within a receiving opening 314 formed in the frame rail or frame 305 of the vehicle platform, while the rearward pivot interconnection 316 may be disposed partially within a cutout 318 disposed in the frame rail body 305 with a frontward end 320 interconnected with the frame rail 305, and with a rearward end 322 interconnected with a bracket 324 that may be configured to extend beyond the perimeter of frame rail body. Moving the pivot points of the front upper wishbone support arm inboard within the body of the frame rail in accordance with embodiments allows for a more compact suspension system geometry than would otherwise be possible, thus allowing for the integration of the suspension system within the platform plane. FIG. 3E also illustrates the upper connection point for the front damper 304. In accordance with many embodiments, the various attachment points/opening/brackets may be manufactured in any number of methods that are known in the art. Additionally, they may be affixed to the various points on the framework in any number of manners suitable.

Figure 3F:
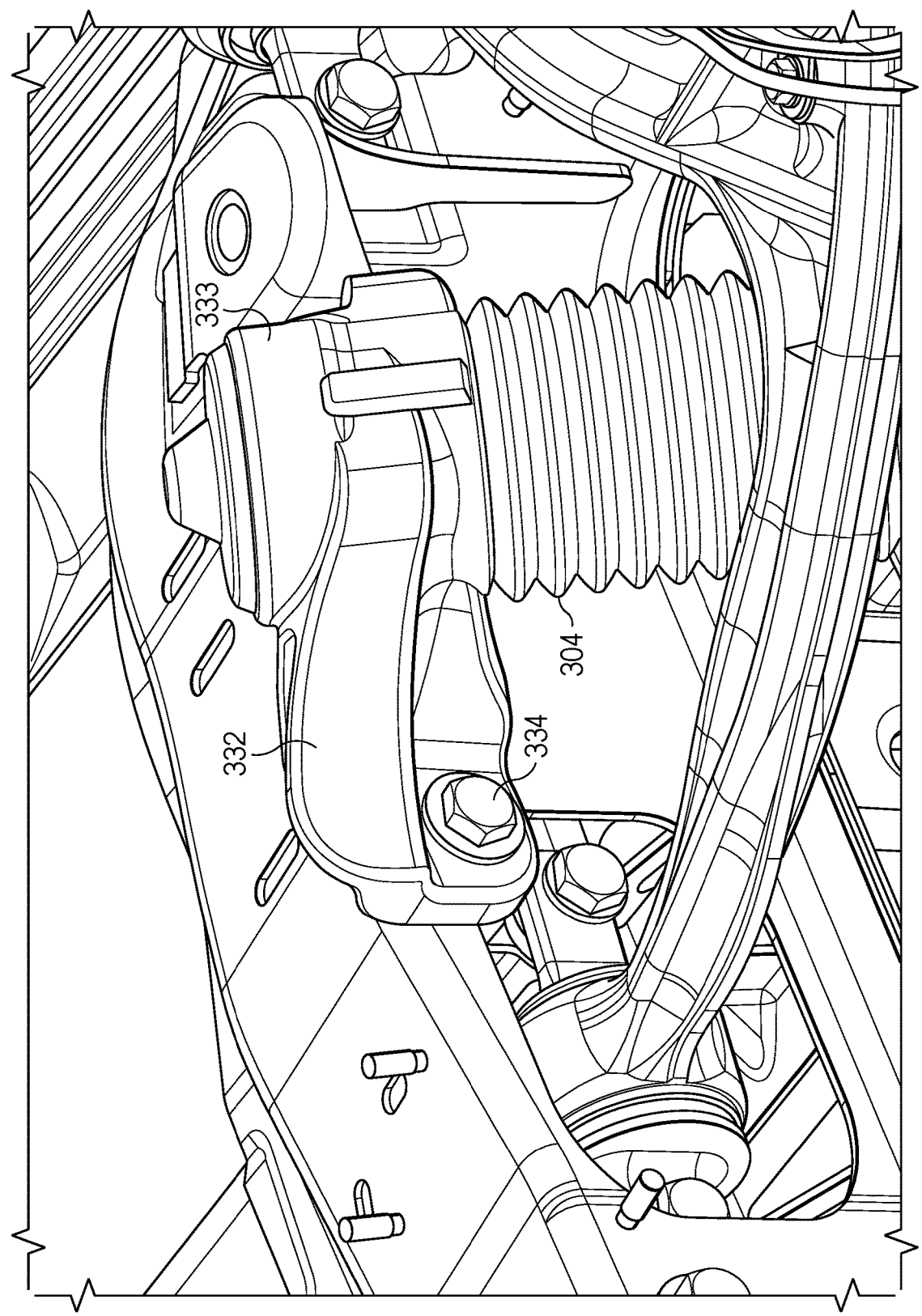
Figure 3G:
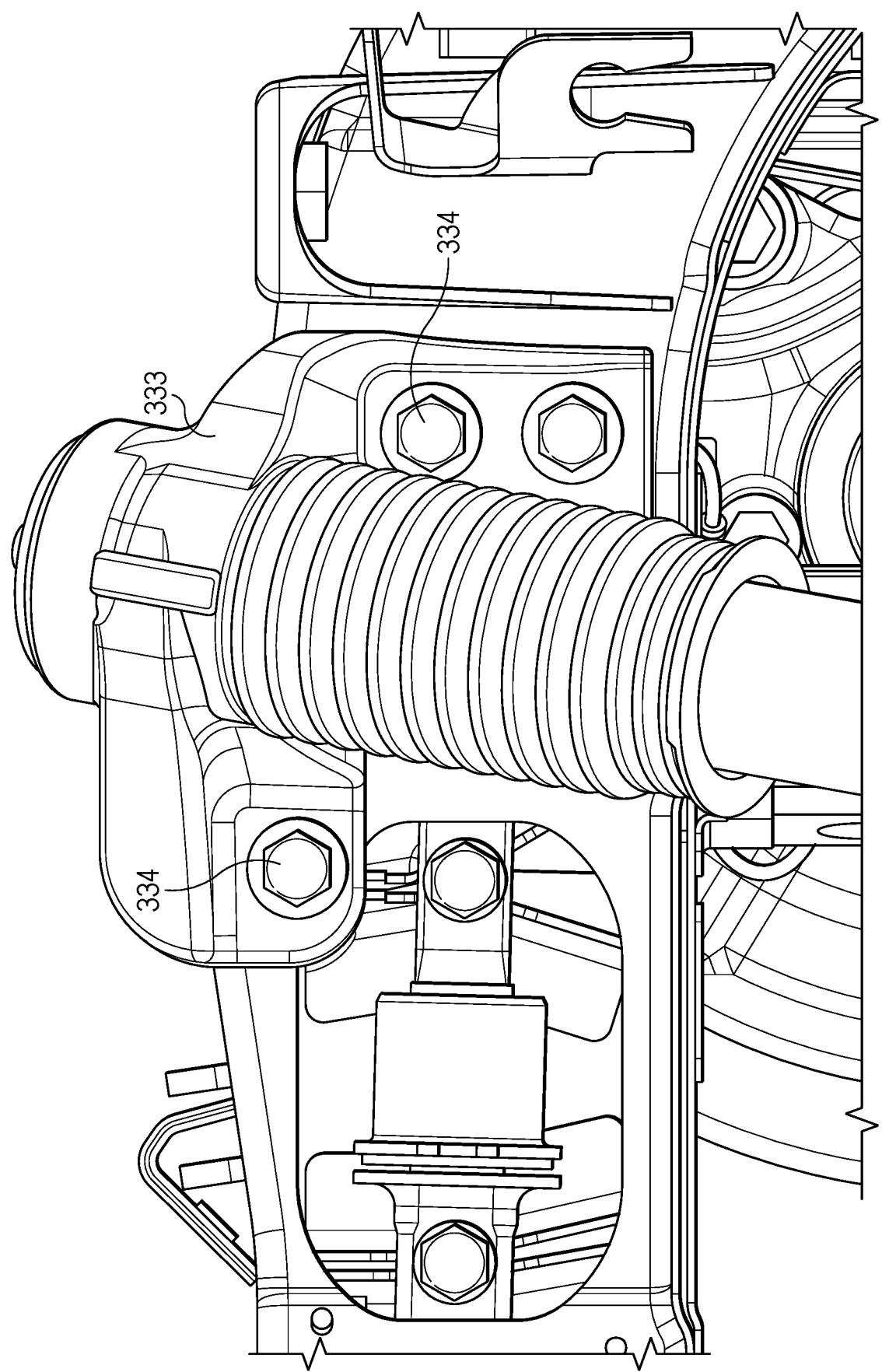

As shown, in embodiments, the damper 304 may be attached to one or more brackets 326 that extend slightly above the upper face of the vehicle platform and provide an attachment point 328 above the upper face of the vehicle platform. Other embodiments may also have brackets with secondary attachment points 330 that are below the upper surface of the frame or allow the bracket to attach to the side of the vehicle platform frame. Although some embodiments may provide brackets that extend beyond the upper surface of the frame, in compliance with many embodiments no portion of the suspension system extends beyond the upper perimeter of the vehicle wheel. Accordingly, many embodiments of a suspension system may be significantly compacted when compared to conventional systems. Other embodiments of suspension systems may utilize alternate damper attachment brackets similar to that illustrated in in FIGS. 3F and 3G, where the bracket 332 has a housing portion 333 that secures the upper portion of a damper 304. The bracket 332 may also have one or more attachment points 334 that allow the bracket 332 to be connected to the vehicle framework such that the attachment points 334 are all located below the upper border of the vehicle frame work. Such embodiments provide for a lower overall profile of the suspension system such that the suspension system can still be configured within a low profile vehicle platform framework.

Figure 1B:
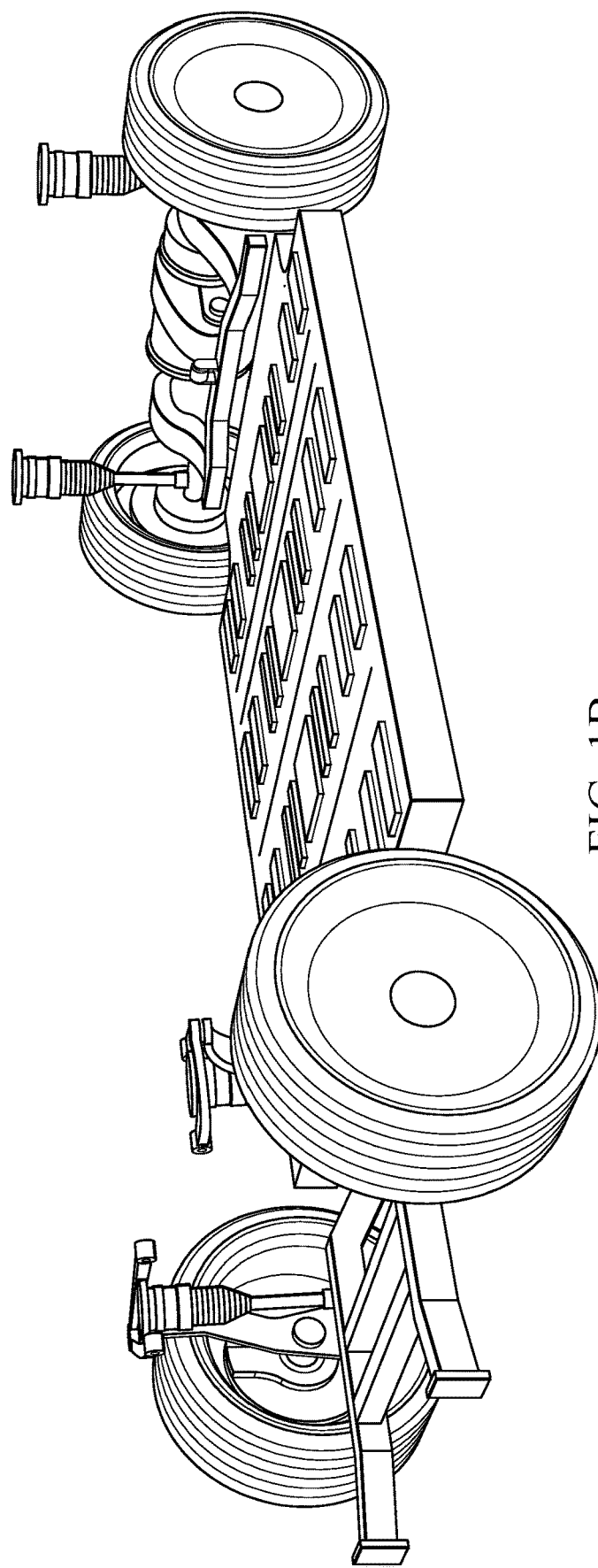
Figure 4A:
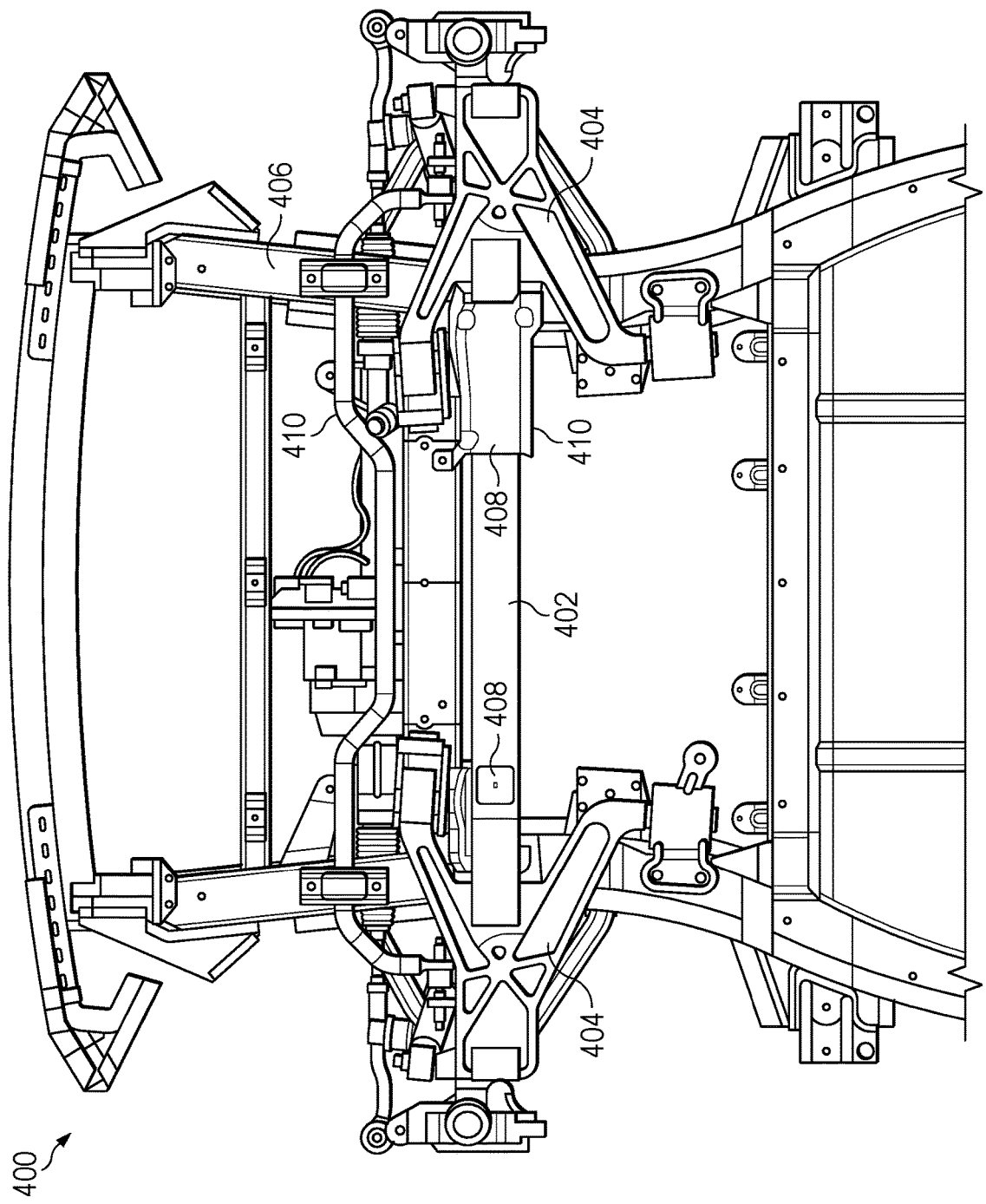
FIGS. 4A through 4D illustrates views of a transverse leaf spring within an embodiment of a suspension system.

To accomplish this compact geometry it is also necessary to remove the need for a strut or coil spring as these bulk elements are typically disposed in geometries that would require extending parts of the suspension system well beyond the platform plane (as illustrated by the prior art systems depicted in FIGS. 1A and 1B). Accordingly, many embodiments may incorporate additional suspension components that interconnect the independent suspension systems previously described. For example, various embodiments may implement a transverse leaf spring to interconnect the wheels and provide both ride and roll stability, thereby simultaneously obviating the need for additional coil springs or struts and an anti-roll bar. FIG. 4A provides a view of an embodiment of the underside of the vehicle platform 400 in which a transverse leaf spring 402 is incorporated into the suspension system. As shown, the transverse leaf spring 402 spans the right and left lower wishbone arms 404 and interconnects therewith. The transverse leaf spring 402 may also be interconnected with the frame 406 at two or more pivot or attachment points 408 disposed along the length of the leaf spring 402. It should be noted that in the illustration provided in FIG. 4A one of the pivot points 408 is shielded from view by a cover element 410, which can serve multiple purposes including, but not limited to, protective covering and installation tool. It should also be noted that while embodiments implementing transverse leaf springs may omit anti-roll bars, as shown in FIG. 4A, some embodiments of suspension systems may incorporate anti-roll bars (not shown) in conjunction with or separate from transfers leaf springs.

Figure 4B:
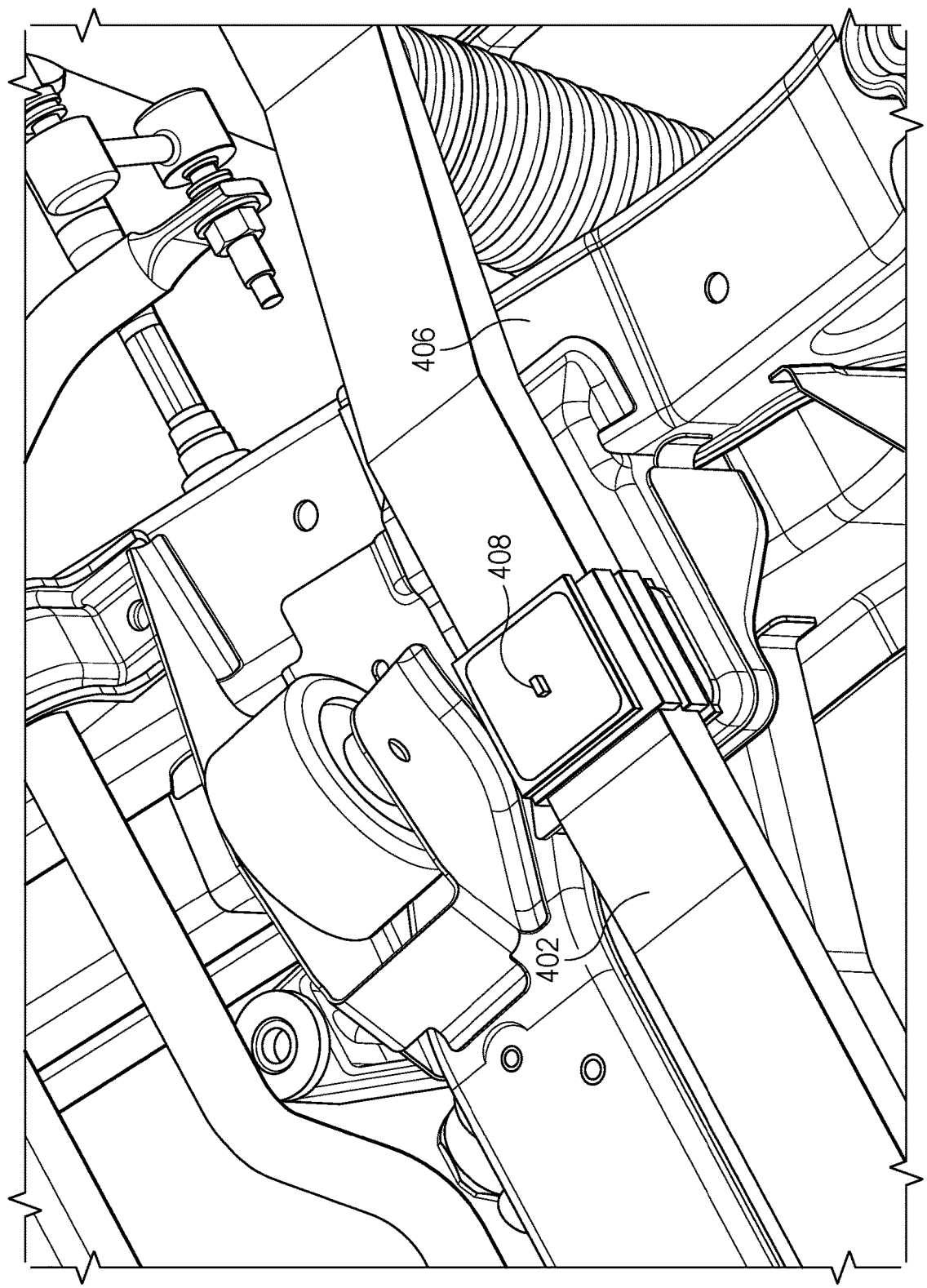
Figure 4C:
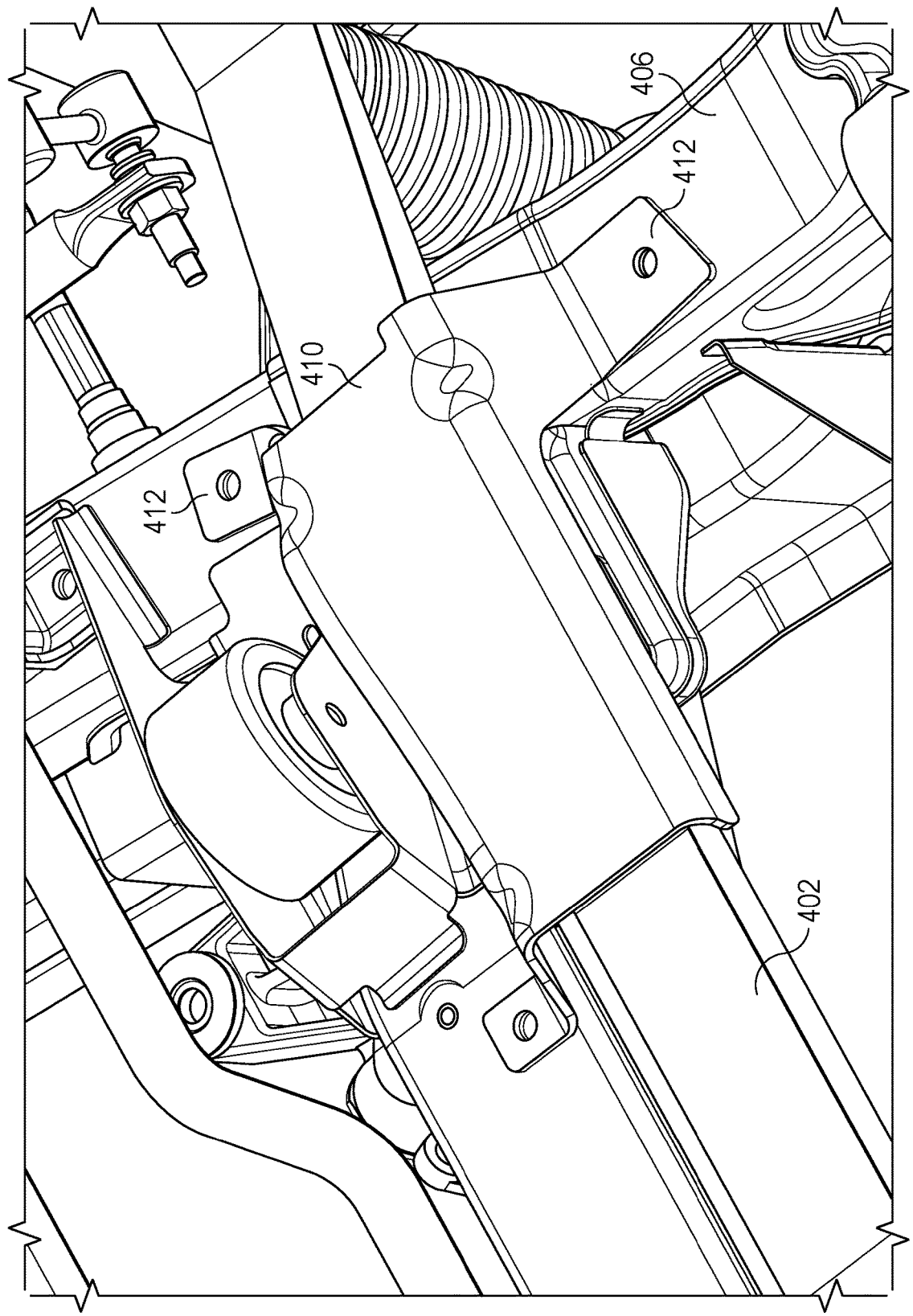
Figure 4D:
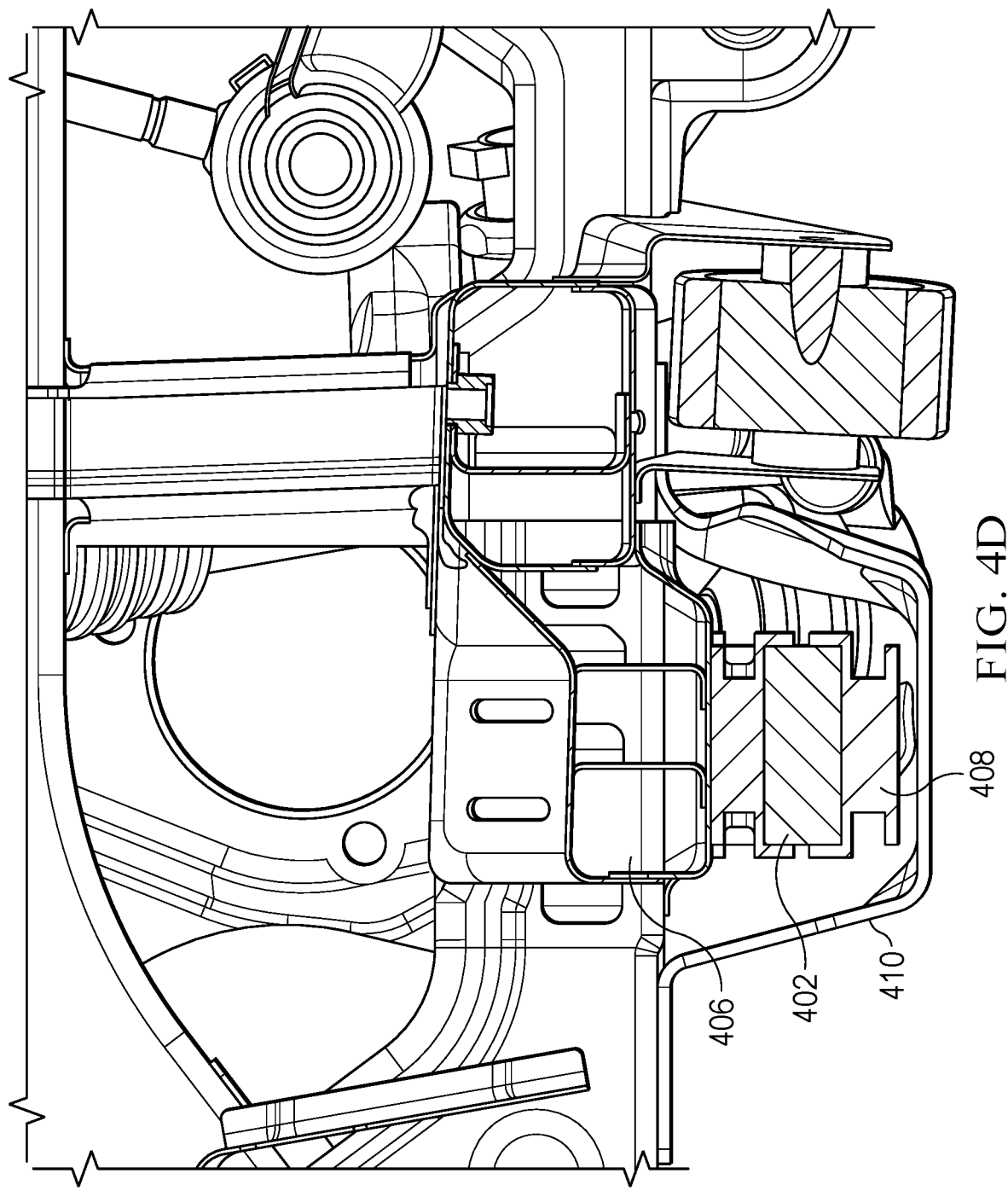

Turning now to FIGS. 4B and 4C leaf springs 402, in accordance with numerous embodiments, can be attached to the frame 406 at pivot points 408. Some embodiments may incorporate a cover plate 410 to protect and/or aid in the installation of the spring 402 at the pivot point. The cover 410 may be mounted onto the frame at several attachment points 412. Although a specific embodiment of a cover plate 406 is illustrated, it can be appreciated that any number of designs could be used. Additionally, it should also be understood that some embodiments may not utilize a separate cover plate but may have protection coverings integrated within the design of the leaf spring 402 and pivot points 408. For example, some embodiments may have coverings that serve as an installation tool to aid in installing the leaf spring 402 to the vehicle frame while simultaneously serving as a covering to cover and protect the pivot point 408. FIG. 4D illustrates a cross-sectional view of the interconnection of the leaf spring 402 and associated pivot point 408 and cover plate 410 in accordance with some embodiments.

Figure 5A:
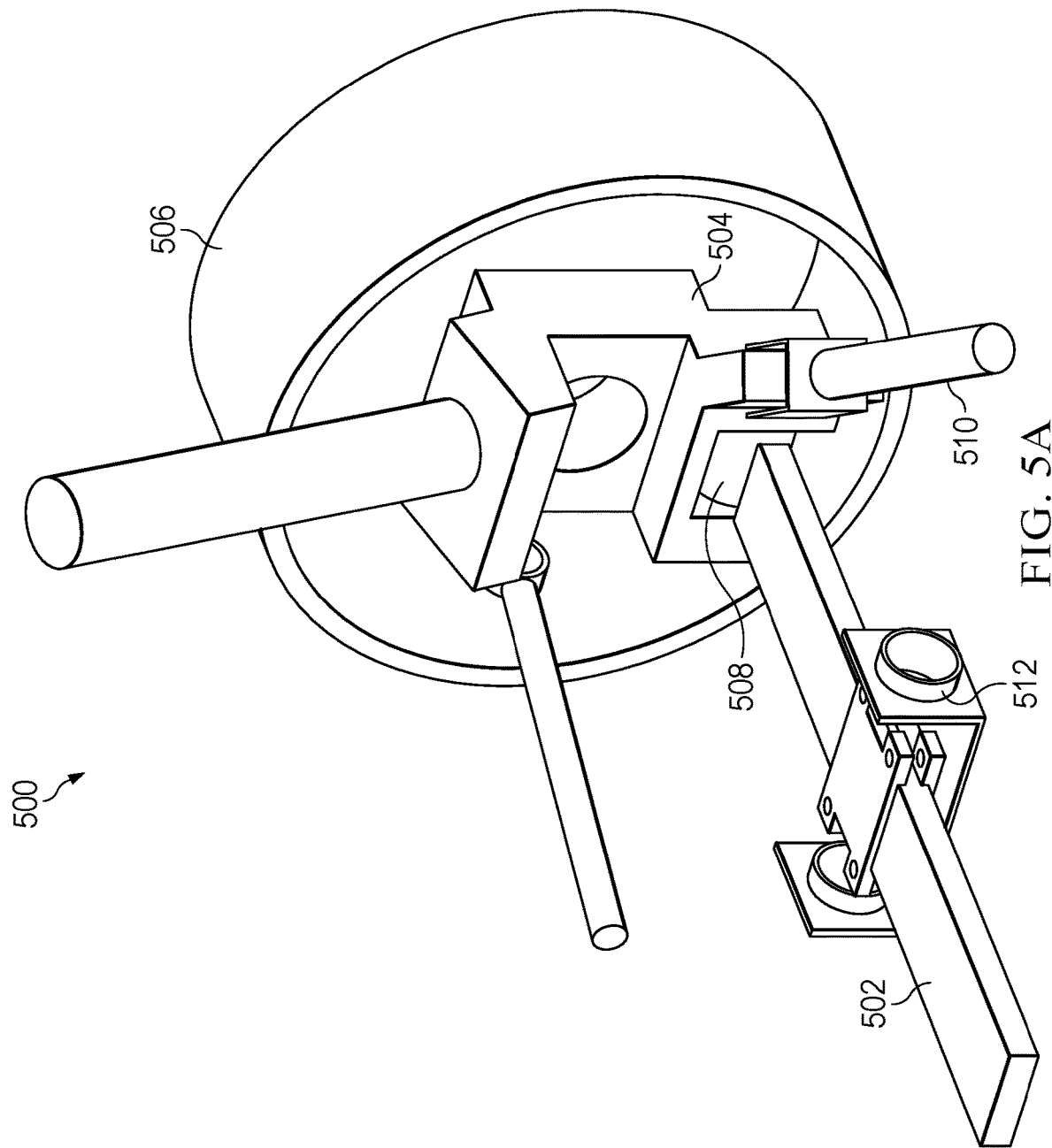
FIGS. 5A and 5B illustrate suspension attachment points in accordance with embodiments of the invention.

Turning now to FIGS. 5A through 6C, various embodiments of connecting a leaf spring type suspension system to other components and the vehicle platform frame can be further illustrated. For example, FIG. 5A illustrates an embodiment of a wheel assembly 500 with a leaf spring 502 connected to a wheel knuckle 504 from which the wheel 506 can be connected. In various embodiments, the leaf spring 502 can connect to the knuckle 504 by way of a connection mechanism 508. In some embodiments, the connection mechanism may be a rubber bushing while others may use a ball joint. It can be appreciated that any number of connection mechanisms. Embodiments of such attachment methods and configurations can provide for a transverse leaf spring to act as a control arm, which can take over wheel guiding functionality. Accordingly, such embodiments can allow the leaf spring 502 to counteract wheel forces and movements. In some embodiments, an additional control arm 510 can be used in conjunction with the leaf spring. This can account for increased load requirements that may occur with the various embodiments of the overall vehicle platform and associated body or top hat. Additionally, many embodiments may incorporate modified pivot/attachment points 512 for the leaf spring to attach to the vehicle platform framework.

Figure 5B:
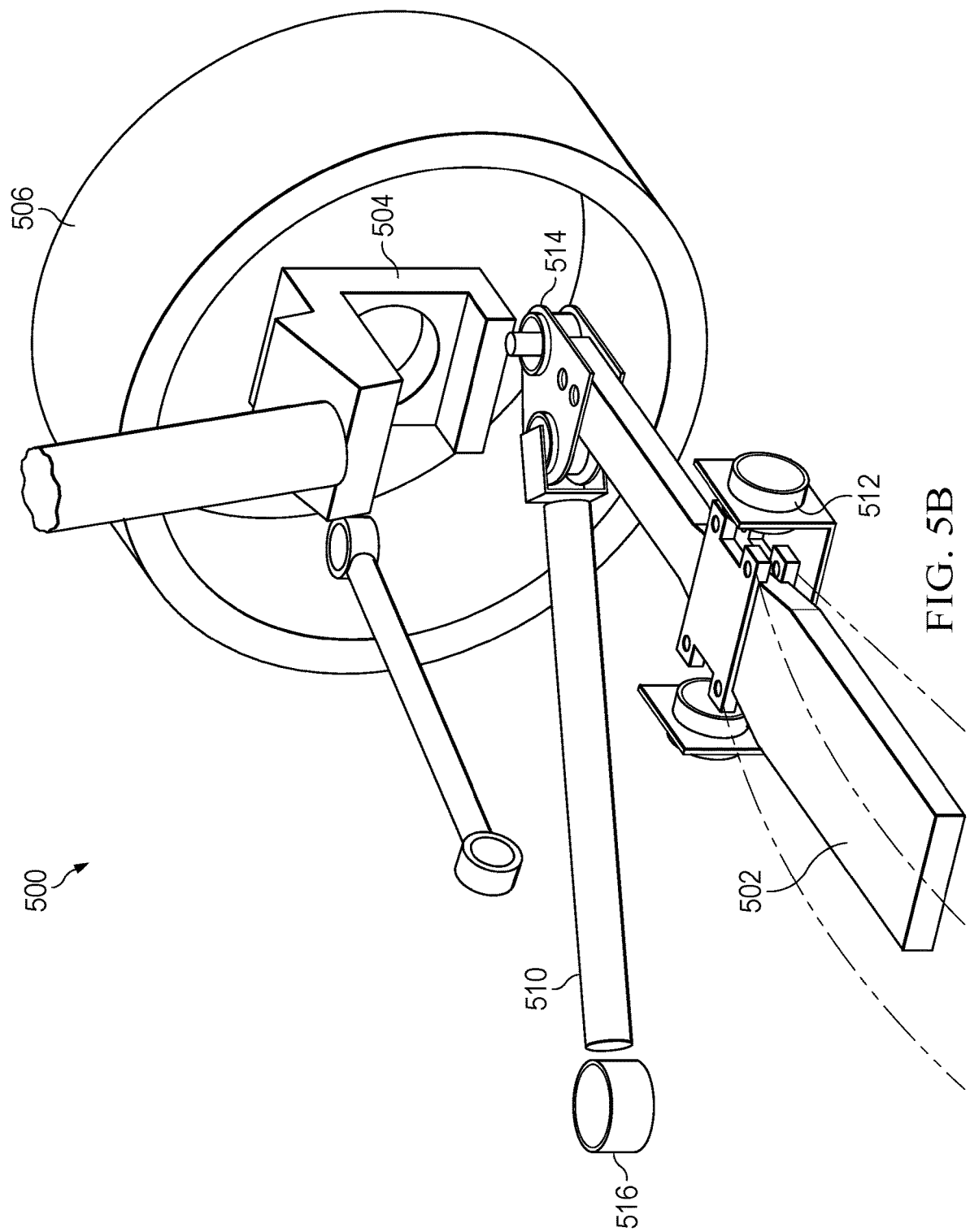

Adjustability and adaptability are well-integrated components in the many embodiments of the vehicle platform. Therefore, it can be appreciated that the connection of the suspension system can be adapted based on the variety of embodiments of the vehicle platform and associated body. FIG. 5B illustrates an embodiment of a wheel assembly similar to FIG. 5A but with improved control arm 510 configurations. For example, the control arm 510 may be connected to the leaf spring 502 through a connector plate 514. In many embodiments, the connector plate 514 can provide connections to the leaf spring 502 as well as the knuckle portion 504 of the wheel assembly. In various embodiments, the connection between the different components can be bushings, ball joints, hinges, or any manner of connection that allows for adequate control over the wheel functionality. In addition to the connection with the wheel assembly 500, the control arm 510 can be connected to the vehicle framework (not shown) through an independent connection point 516. In accordance with various embodiments, the independent connection point 516 can be a bushing, ball joint, hinge, or any variety of suitable connection devices. It can be appreciated that with the improved adaptability of the many embodiments of the vehicle platform, the connections between the control arm 510 and the other suspension components can be moveable as described above, but may also be rigid or semi-rigid based on the end functionality requirements of the vehicle platform and associated body.

Figure 6A:
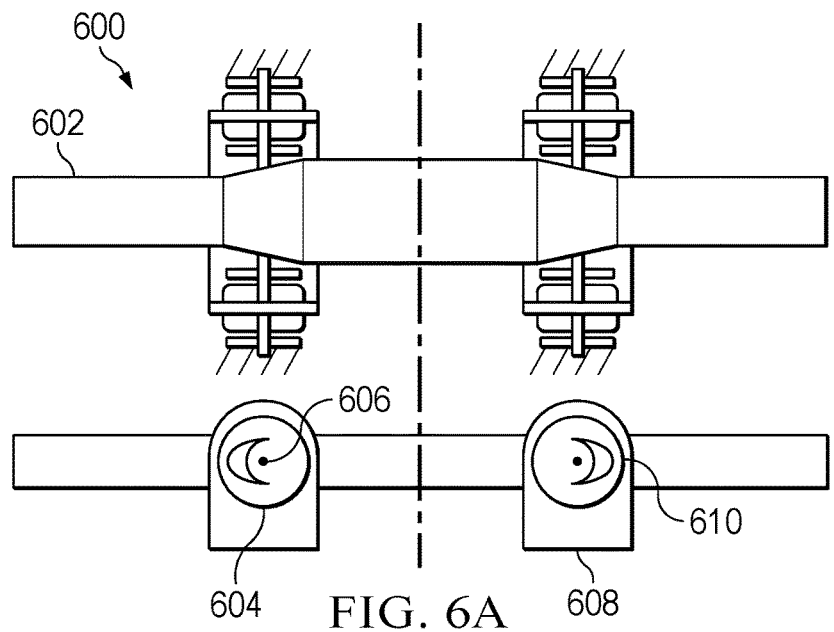
FIGS. 6A through 6C illustrate leaf spring attachment points in accordance with embodiments of the invention.
Figure 6B:
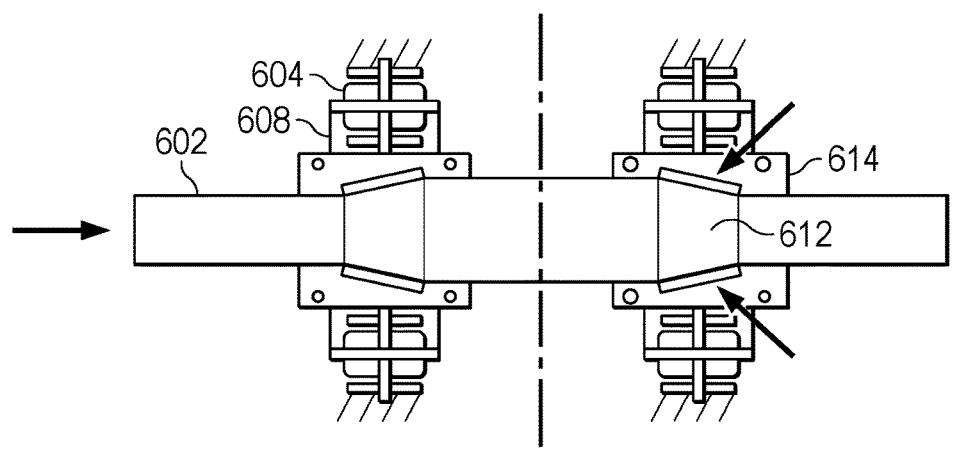
Figure 6C:
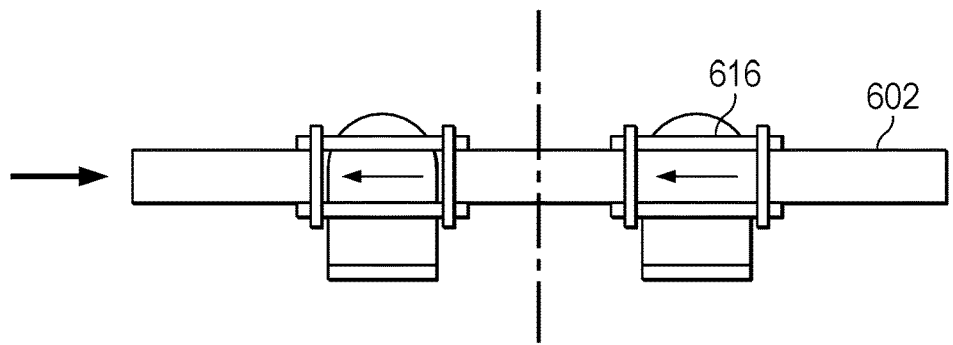

FIGS. 6A through 6C illustrate various embodiments of connection mechanisms that can be used to connect the leaf spring components to the vehicle platform framework. Many such embodiments can be used in conjunction with covers or other elements previously discussed in relation to the pivot/attachment points in FIGS. 4A-4D. FIG. 6A illustrates a top and side view of mounting points 600 that also serve as the pivot points about which the leaf spring 602 can rotate or flex during use. In accordance with many embodiments, the mounting points 600 may have cylindrical bushings 604 placed on either side of the leaf spring 602 such that the central axis 606 of the bushings 604 is perpendicular to the longitudinal axis of the leaf spring and perpendicular to the predominant motion plane of the leaf spring 602. In various embodiments, the bushings 604 can be supported by a bracket 608 that is connected to the spring 602. In some embodiments, the core of the bushing can be connected to the bracket by a clevis 610 that can be fixed to the body of the bracket 608.

In some embodiments, the leaf spring 602 may have a trapezoidal section 612 that interfaces with a corresponding mounting bracket 614 as seen in FIGS. 6B and 6C. The trapezoidal section 612, in many embodiments can be used to transfer lateral forces via the mounting bracket 614. In various embodiments, the position of the mounting bracket 614 can be further assured through the use of a clamping mechanism 616. It should be understood that any number of clamping mechanisms 616 can be used in the various embodiments to hold the attachment point 600 in the desired location along the leaf spring 602.

Figure 7:
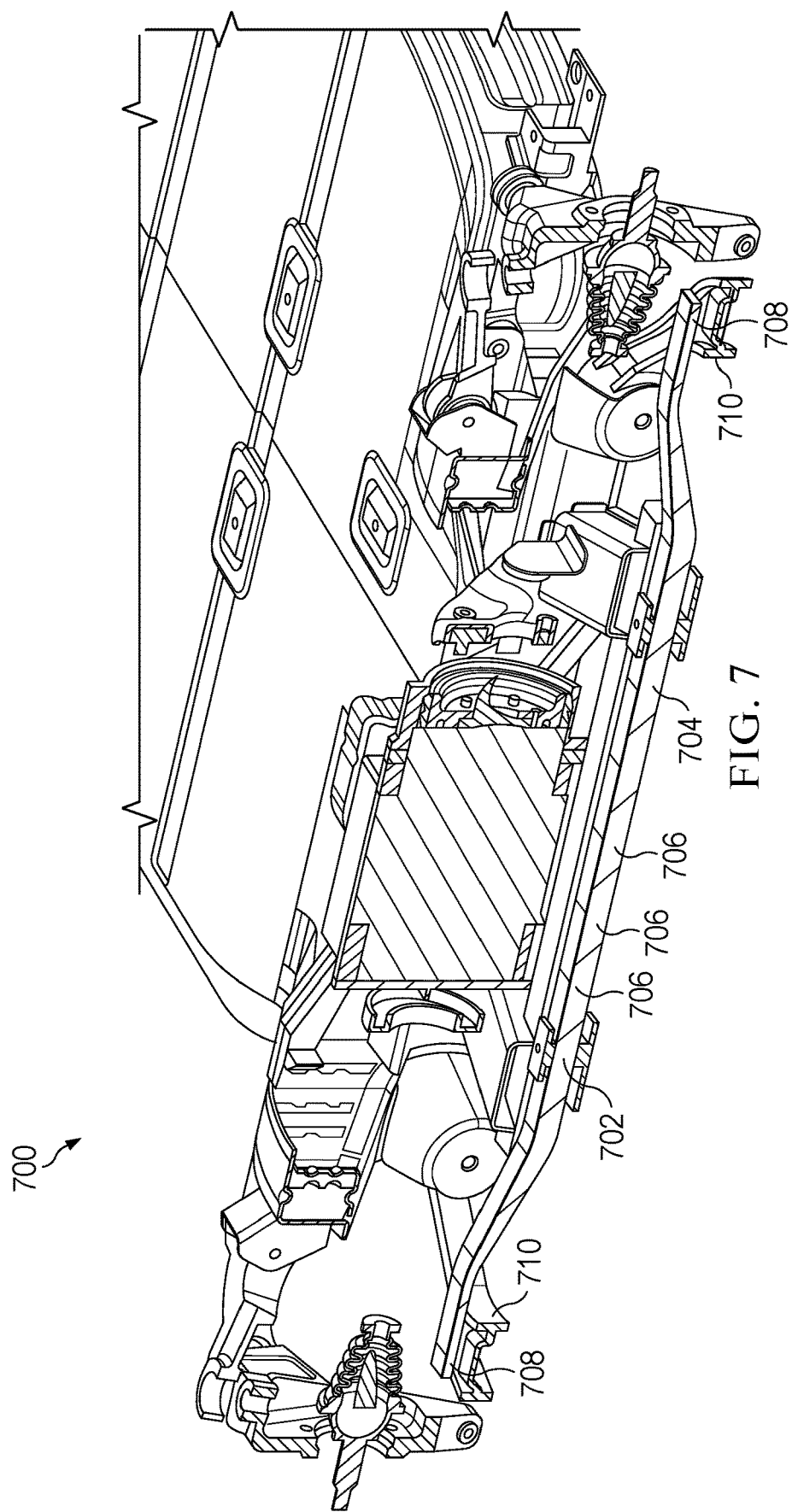
FIG. 7 illustrates a cross sectional view of a vehicle platform drive train and suspension system in accordance with embodiments of the invention.

One advantage of incorporating leaf springs into the suspension system according to embodiments is the ability to adapt the spring in various ways to provide the desired ride and roll stiffness of the vehicle platform and associated vehicle body. The adaptability can allow for a variety of embodiments of vehicle platforms to accommodate any number of vehicle body or top-hat designs. FIG. 7, for example, illustrates a cross sectional view of a suspension system on a vehicle platform 700 where pivot points 702 can be positioned at different locations along a leaf spring 704 to adjust the flexibility and movement of the leaf spring. This adjustability can thereby act as a control measure to accommodate a number of different scenarios for which the vehicle may encounter. In some embodiments, the position of the pivot points 702 may be accomplished by altering the distance between the pivot points of the leaf spring. For example, the pivot points 702 could be positioned at various locations 706 along the length of the leaf spring 704. In many embodiments, altering the positions of the pivot points 702 may increase or decrease ride and roll stiffness. Accordingly, this can be done within a desired range of space for each pivot point 702 for which the desired performance can be achieved. Further adjustment may be made by altering the geometry of the attachment of the ends 708 of the leaf spring 704 to the lower wishbone arms 710. Such adjustability according to embodiments could allow for the use of a common leaf spring across a wide range of different vehicle bodies having different weights and desired ride characteristics.

As has been discussed, the adjustability of the attachment points of the transverse leaf spring can have simple and yet dramatic effects on the overall response of the suspension system to be able to maintain the desired ride and roll stiffness of the vehicle. FIG. 8, for example, illustrates a cross sectional view of a leaf spring in accordance with embodiments of the invention. The leaf spring 802, in many embodiments, may have a specified movement envelope 804 of a leaf spring 802. The movement envelope 804 can be determined by any number of factors such as the material of the spring, the attachment positions at the ends 806, as well as the attachment or pivot points 808 along the length of the spring 802. FIG. 8 also illustrates how the change in position of the mounting/pivot points 808 within a mounting range 810 can affect the movement envelope 800 of the leaf spring 802. Most inner mounting points 808 will provide the lowest ride and roll stiffness, whereas most outer mounting points 806 provide the highest roll and ride stiffness within the embodiments of the leaf spring. Keep in mind that the embodiments of the leaf spring are preferable to be a common design that allows for some adjustability in the mounting points to modify the ride and roll stiffness. Accordingly, the inner mounting points 808 may be adjusted within a desired range 810 longitudinally along the length of the leaf spring 802 to adjust the overall ride and roll stiffness in accordance with the body derivative to be used.

Figure 9A:
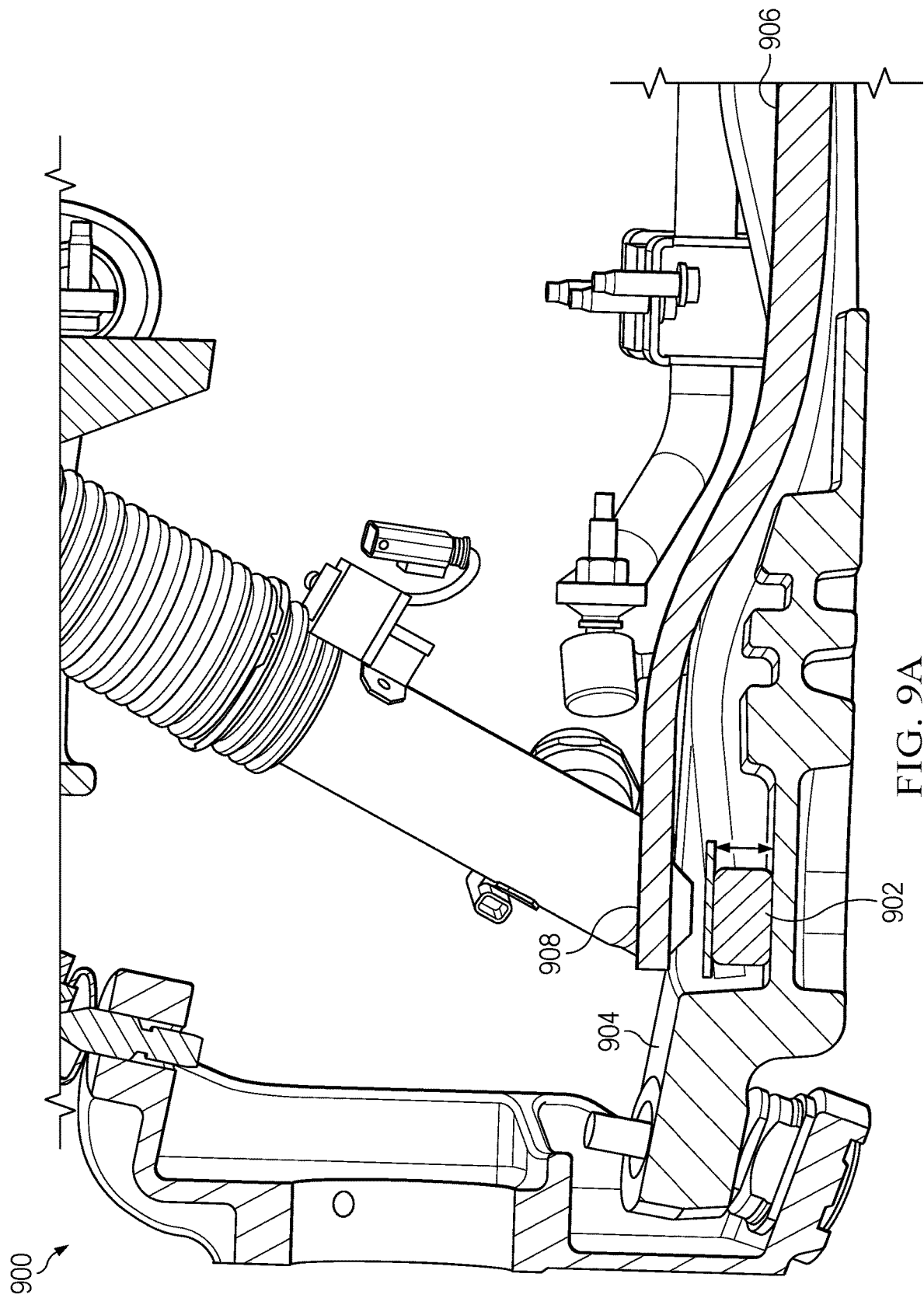
FIG. 9A illustrates a suspension system attachment in accordance with embodiments of the invention.

Since many body derivatives will carry with them a change in dimensions and weight, the overall height of the vehicle can be affected when one body is removed and the other body is installed on the vehicle platform. Hence the greater desire and need for an adjustable suspension system. However, if the vehicle height is simply left to vary according to the changing body then the overall efficiency of the vehicle can be dramatically affected. For example, ground clearance may be affected causing damage to the undercarriage of the vehicle. Additionally, the aerodynamics of the vehicle can be negatively influenced and would thus greatly reduce the range of an electric vehicle. Accordingly, many embodiments may incorporate additional features that can improve the suspension response with change. For example, FIG. 9A illustrates a cross sectional view of a suspension system wheel assembly 900 that incorporates body or top hat specific spacers 902. The body specific spacers 902 can have a variety of heights according the body to be used. For example, a body that reaches the capacity in axle weight would require the largest spacer to bridge the distance between the control arm structure 904 and the leaf spring 906 at the outer most mounting point 908 thus helping the leaf spring 906 operate within the desired movement envelope. In contrast, a body that results in the minimum axel weight would require the smallest spacer. In some embodiments, the spacer 902 may be sized up to 50 mm in height. Other embodiments may not require a spacer while others may be larger based on the overall vehicle configuration. For example, a heavier vehicle with a larger top hat like a pickup truck or van may require a larger spacer to accommodate for the added movement in the suspension system, while a vehicle configuration similar to a smaller sport sedan may not require the use of a spacer at all. In many embodiments, the spacer can act as a connection between the outer mounting point and the control arm assembly 904 and in many embodiments; the spacer can help to maintain the required/desired tension on the suspension system to provide the best overall ride for the vehicle.

Figure 9B:
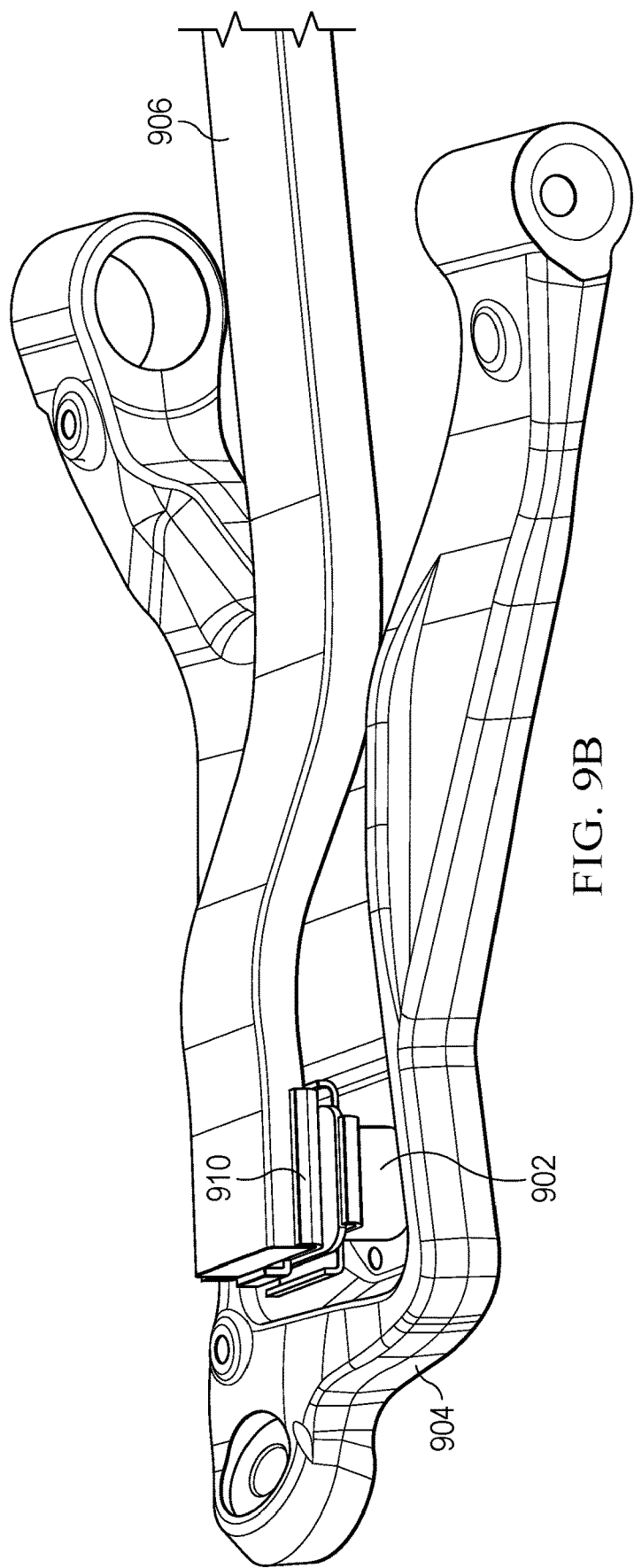
FIGS. 9B through 9F illustrate an adjustable suspension spacer in accordance with embodiments of the invention.
Figure 9C:
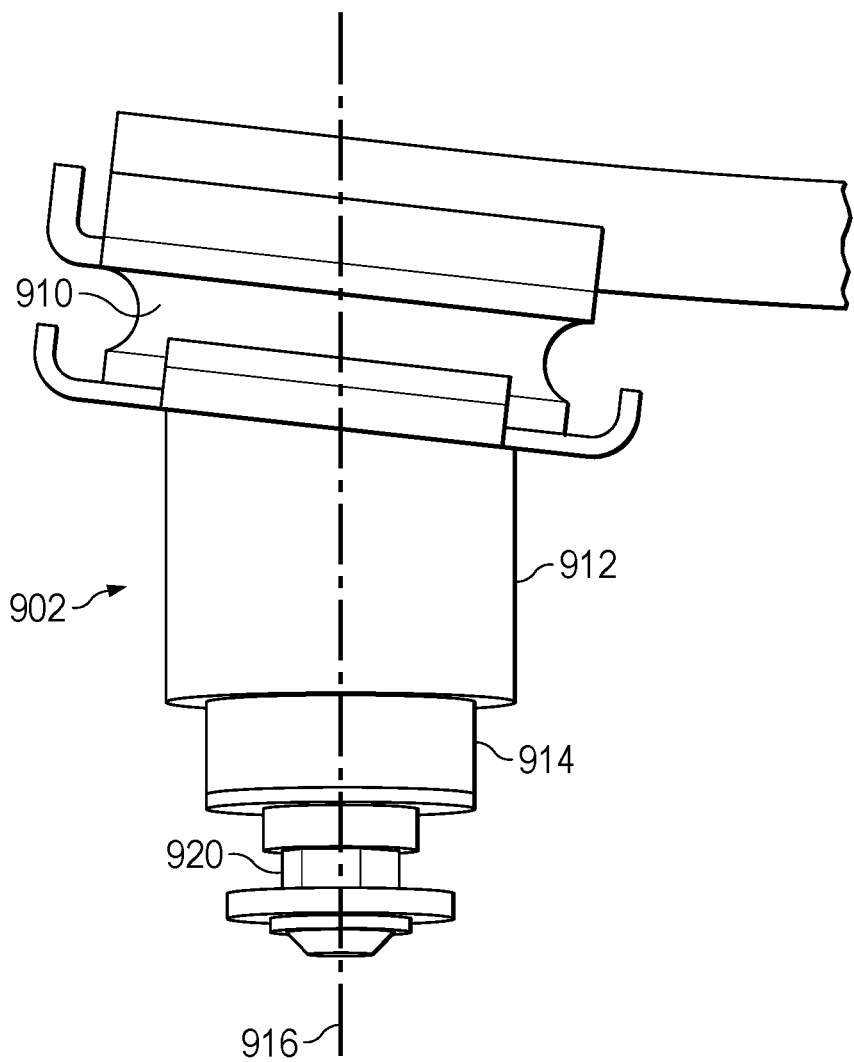
Figure 9D:
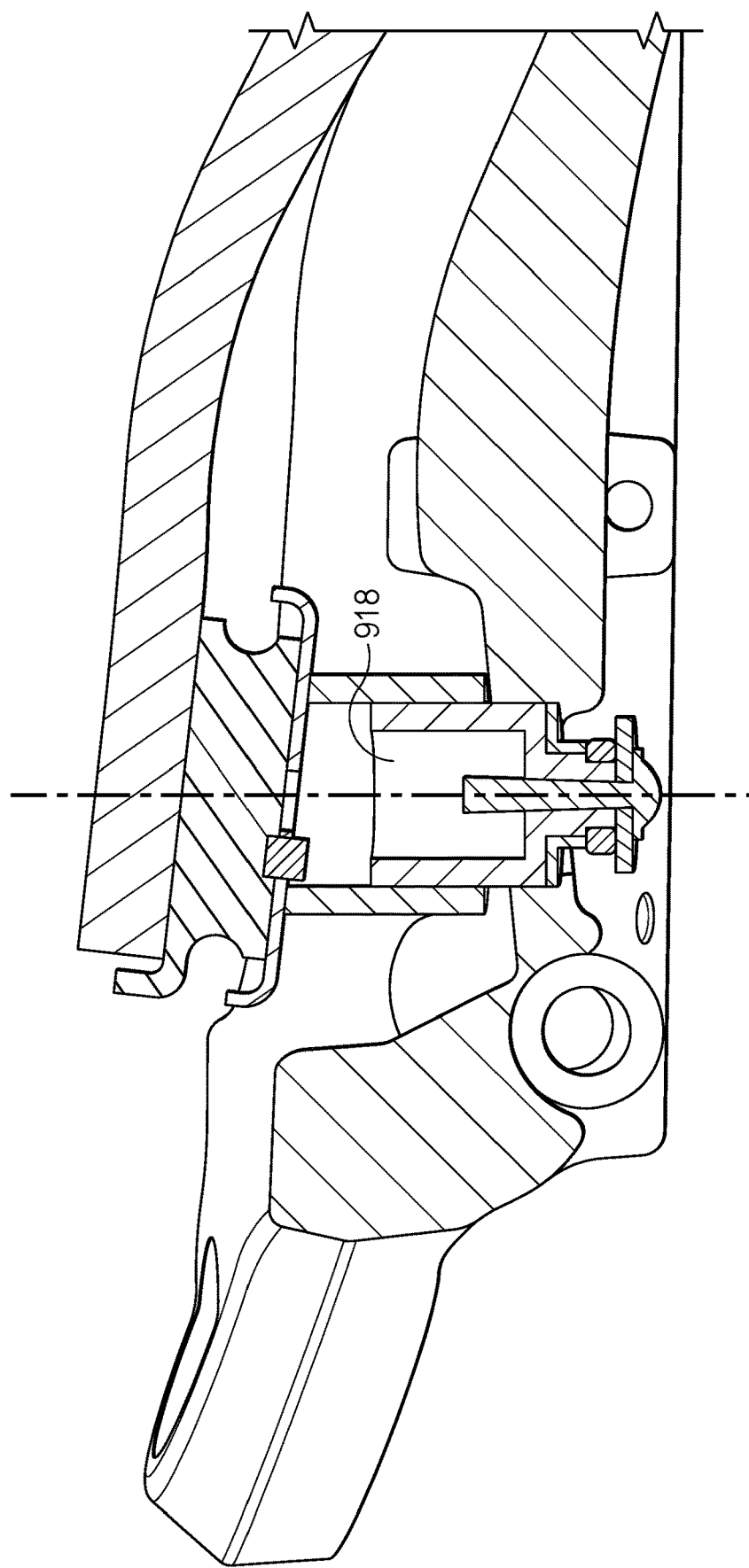

Moving now to FIGS. 9B through 9G, embodiments of a spacer and spacer system for adjusting the height of the suspension system can be seen. FIG. 9B illustrates an embodiment of a portion of a suspension system with a leaf spring 906 that is connected to a control arm structure 904. In various embodiments, the spring 906 may be connected by a bushing 910 and a spacer 902 as discussed previously. The spacer 902 in accordance with many embodiments the spacer can be adjustable to account for the various types of overall vehicle configurations. For example, FIGS. 9C and 9D illustrate a spacer 902 that can be adjusted in height through a mechanical adjustment mechanism. The spacer 902 in some embodiments may have an outer tube 912 and an inner tube 914 that are designed to cooperatively engage with each other along a longitudinal axis 916. The outer tube 912 may be connected to the bushing 910 and surrounds the outer portion of the inner tube, as shown in FIG. 9D. Additionally, said embodiments may have a screw 918 disposed between the outer 912 and inner tubes 914.

In many embodiments, the inner tube 914 may be connected to an rotational device 920 such as a nut or other device that is connected to the screw. The rotational device 920 may have a hexagon type profile or other profile that is suitable for the function of adjusting the height of the spacer.

In accordance with various embodiments, the rotation of the rotational device 920 can drive an extension or separation of the inner and outer tubes along the longitudinal axis and thereby increase the overall height of the spacer 902. In accordance with various embodiments, the height of the spacer can be blocked or limited by the configuration of the spring and the bushing. Such embodiments enable the easy adjustment of a spacer height in accordance with the many embodiments of vehicle bodies that can be used. Additionally, it allows for easy service of the spacers that can occur over time as other components of the suspension system wear with use.

Figure 9E:
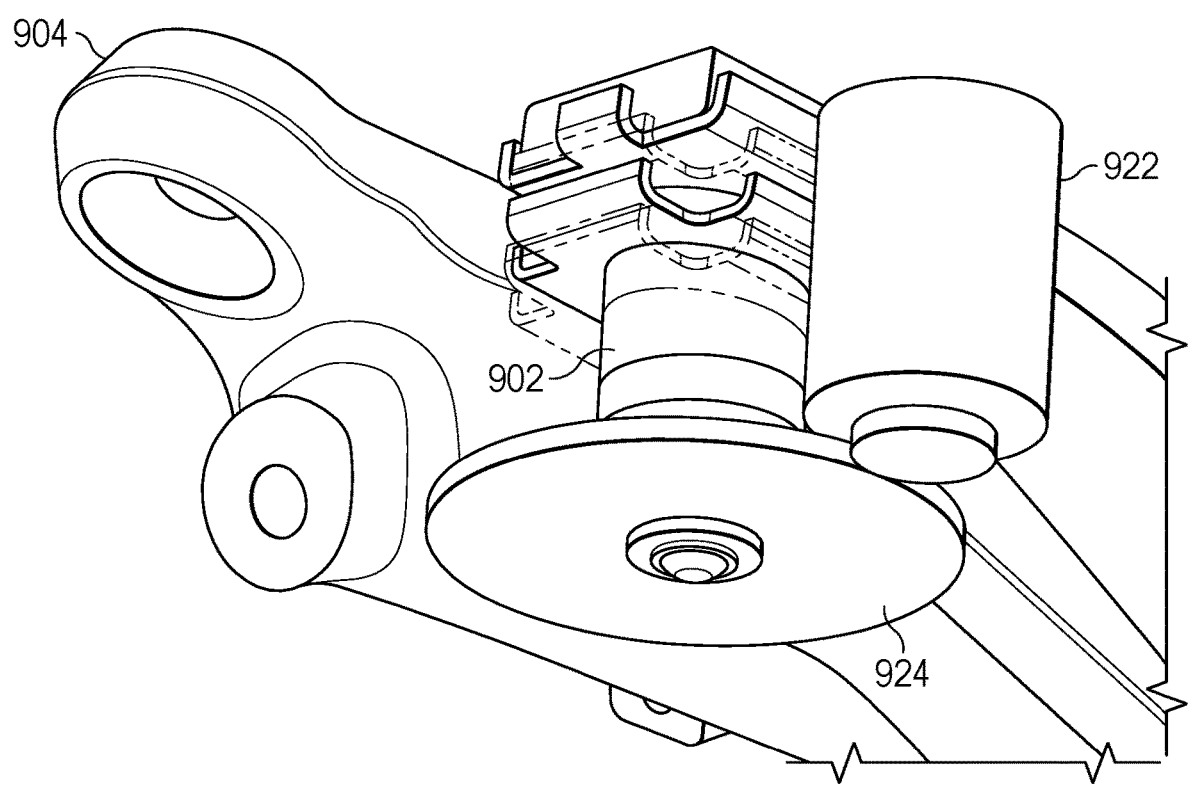
Figure 9F:
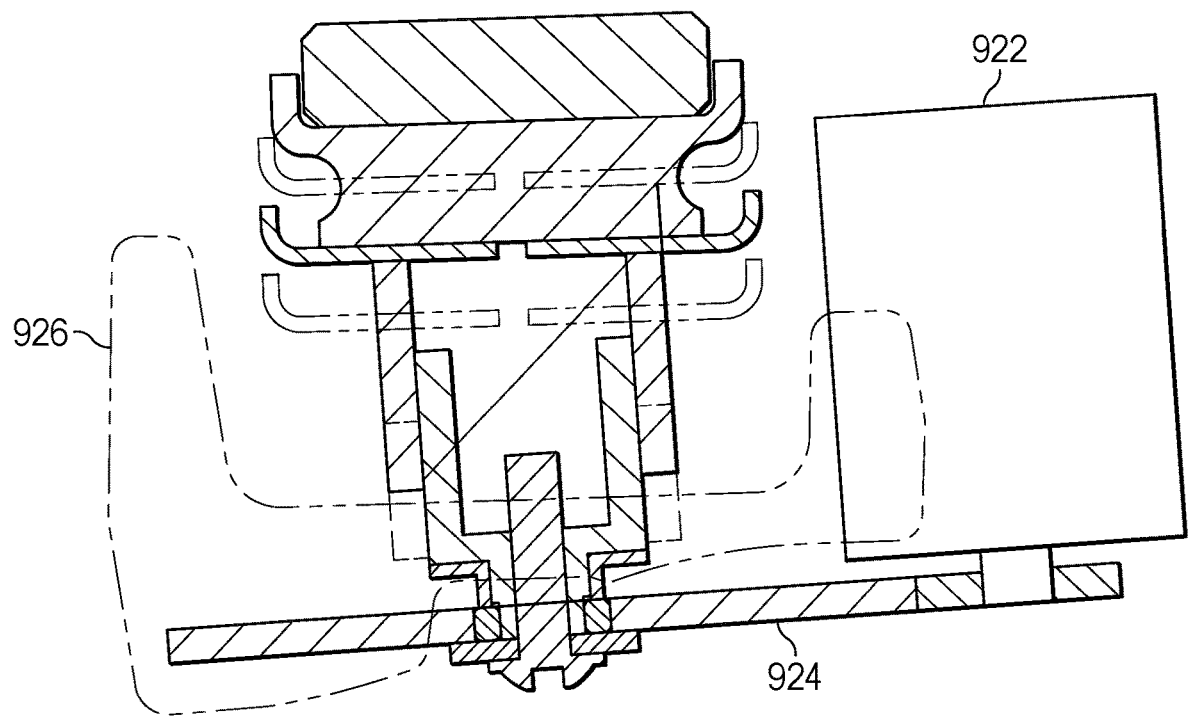

Turning now to FIGS. 9E and 9F, other embodiments of an adjustable spacer can be seen. For example, some embodiments may incorporate a motor 922 that is connected to a gear drive 924. In many embodiments, the gear drive 924 takes the place of or is equivalent to the rotational device as illustrated in FIGS. 9C and 9D. In various embodiments the gear drive 924 may be one or more gears. In some embodiments the motor 922 can be configured to turn or rotate the gear 924 such the rotation there of rotates the screw and drives the separation of the inner and outer tubes. In some embodiments, the motor may be connected to the control arm 904 and can rest either above or below the control arm 904. In some embodiments the motor have a mounting bracket 926 designed to support the motor 922 near the adjustable spacer. In many embodiments, the motor 922 can be controlled by a number of methods and or external devices including direct control from the vehicle information system or a mobile device application. This can allow a user to adjust the height of the spacer as needed or in many embodiments can allow a service technician to adjust the height as required for regular maintenance or adjustment of the vehicle body.

Figure 10A:
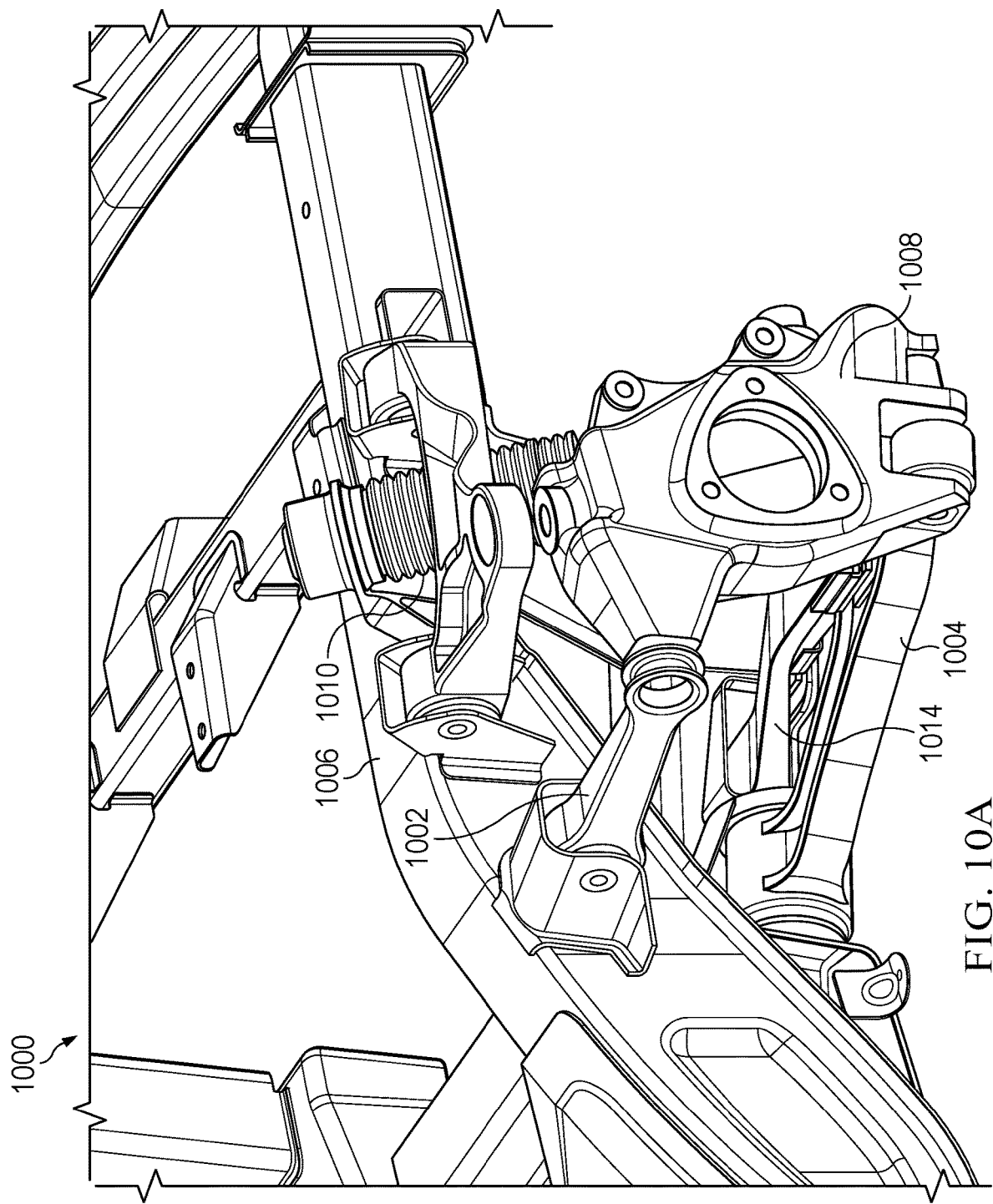
FIGS. 10A to 10C illustrate a vehicle platform rear suspension system with a leaf spring in accordance with embodiments of the invention.
Figure 10B:
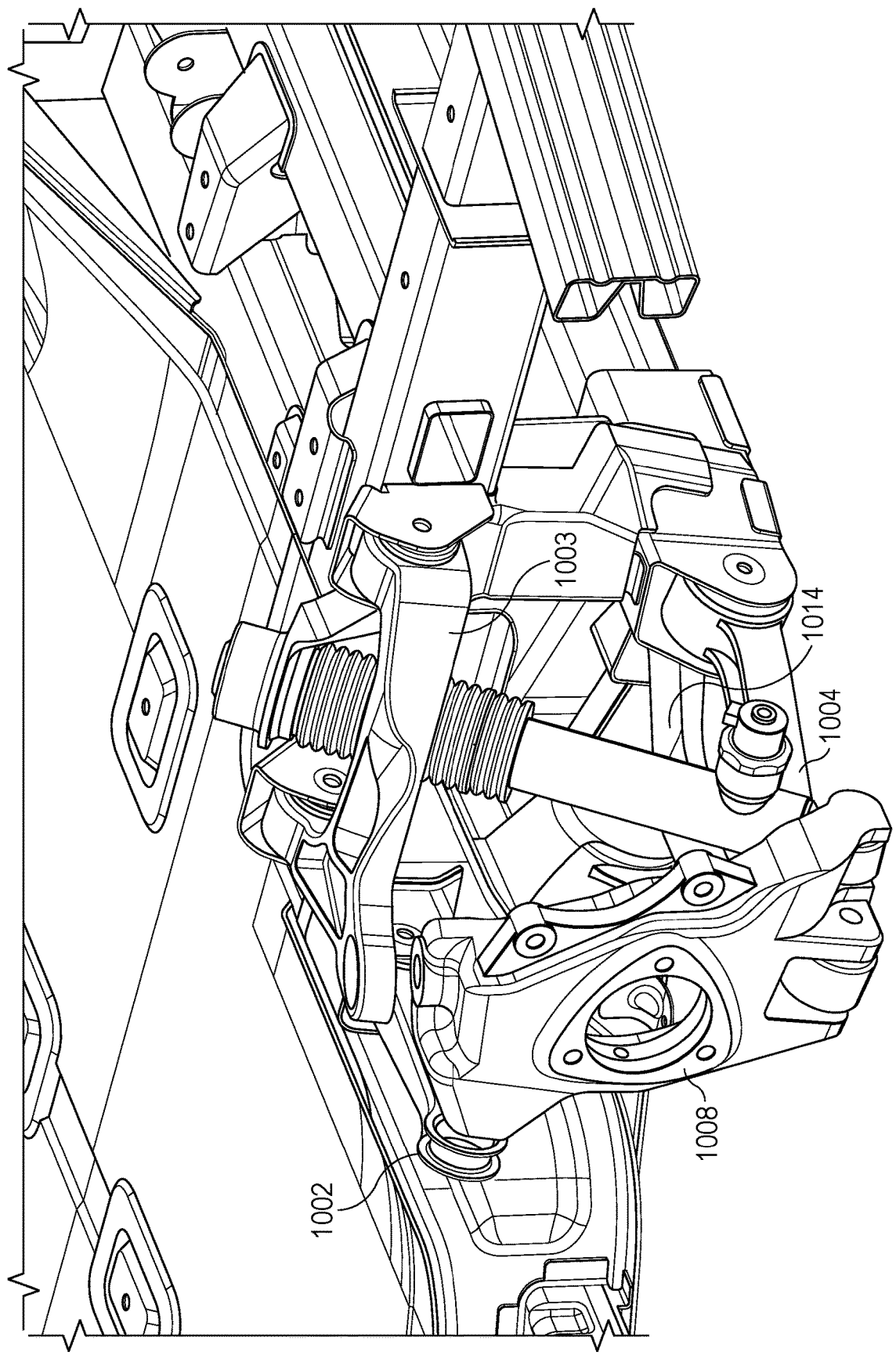
Figure 10C:
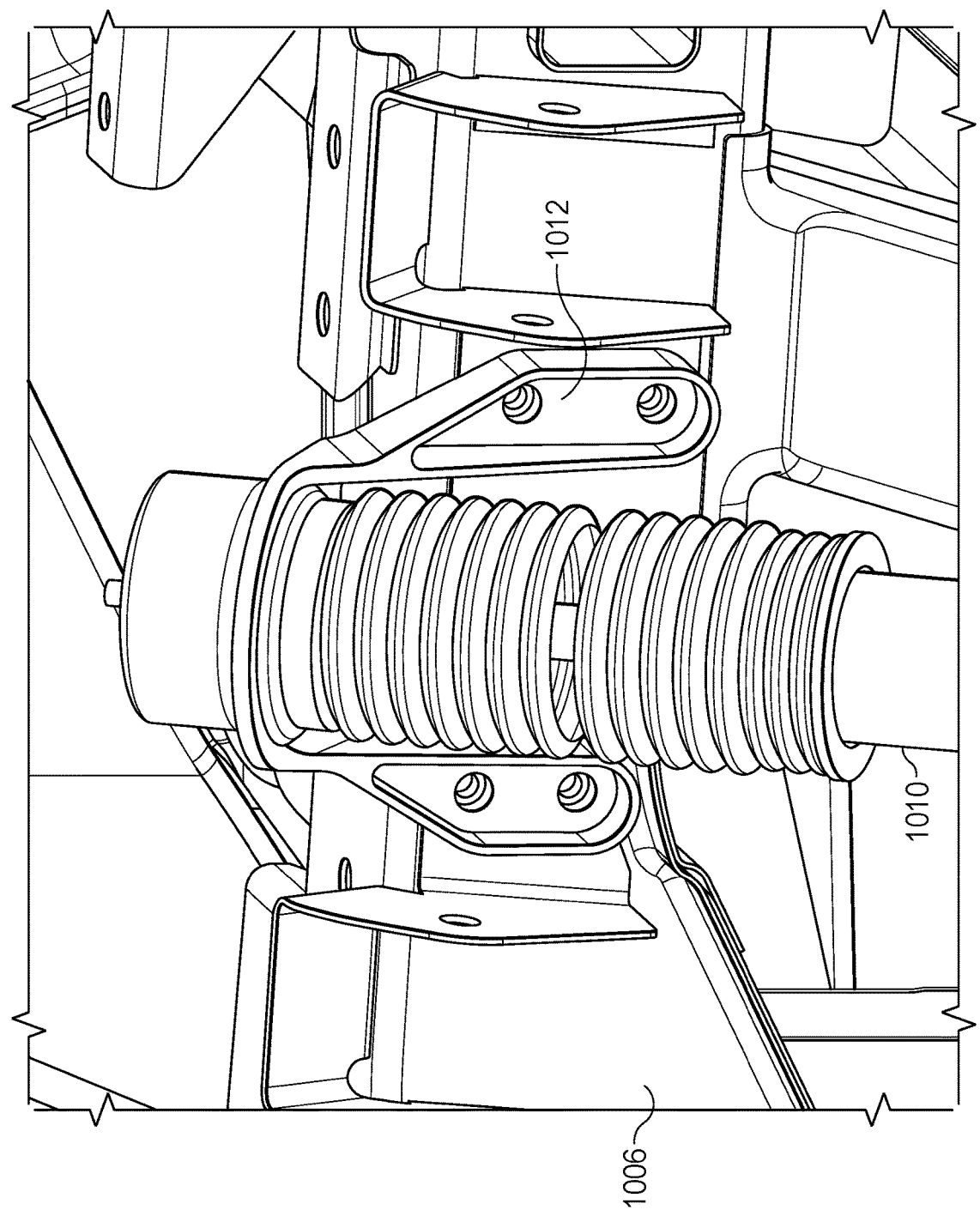
Figure 10D:
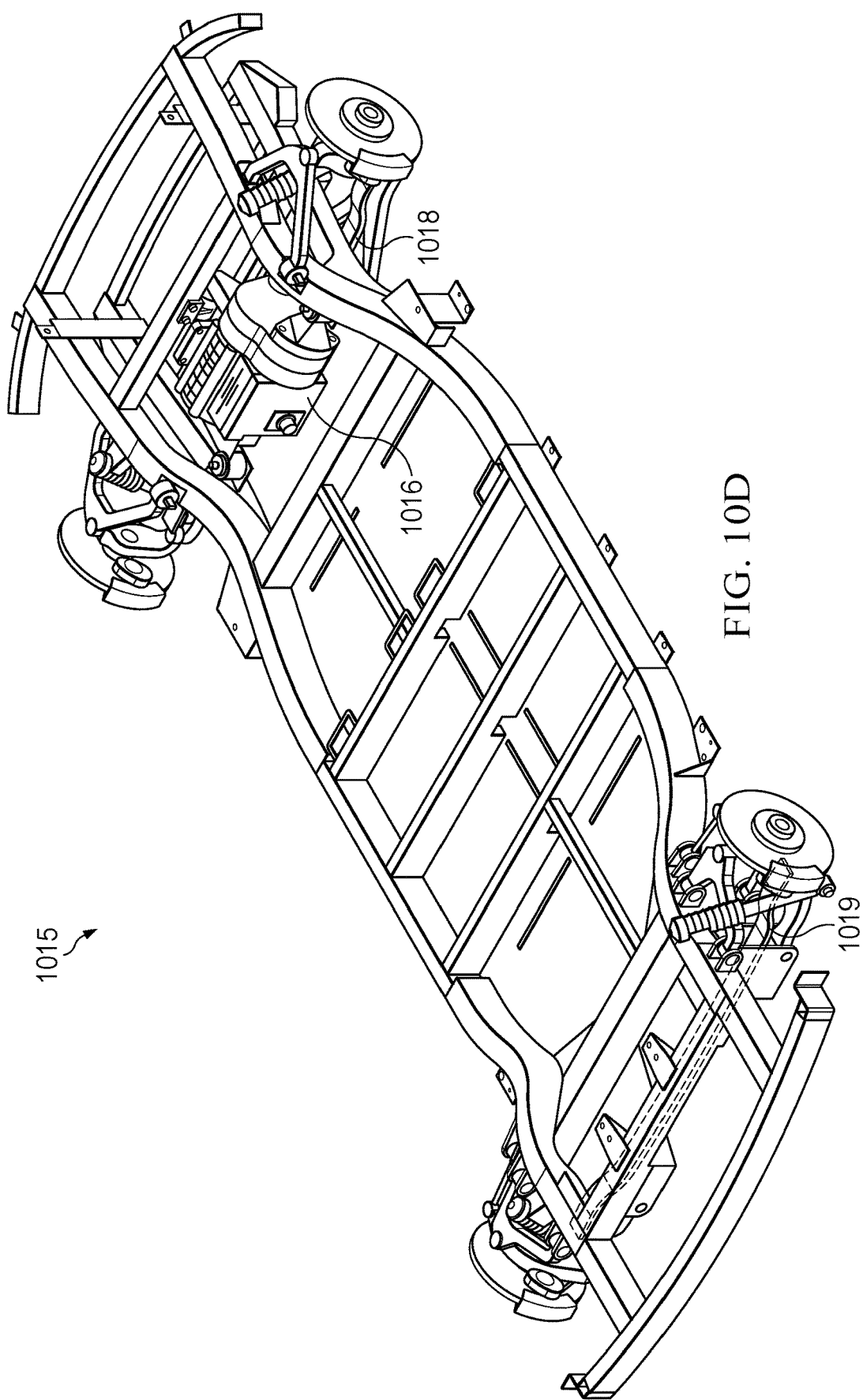
FIGS. 10D through 10I illustrate a vehicle platform with different motor configurations in accordance with embodiments of the invention.
Figure 10E:
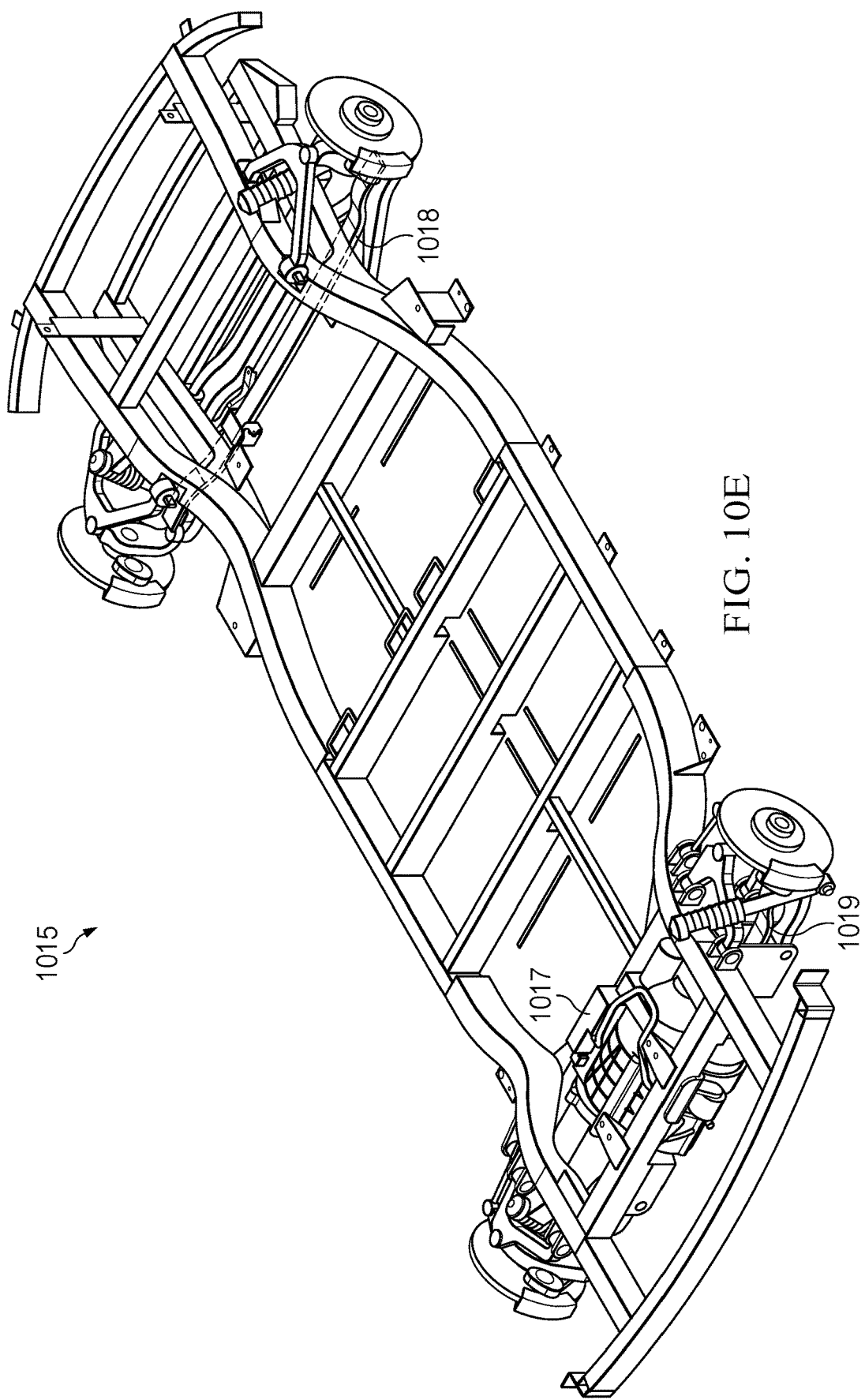
Figure 10F:
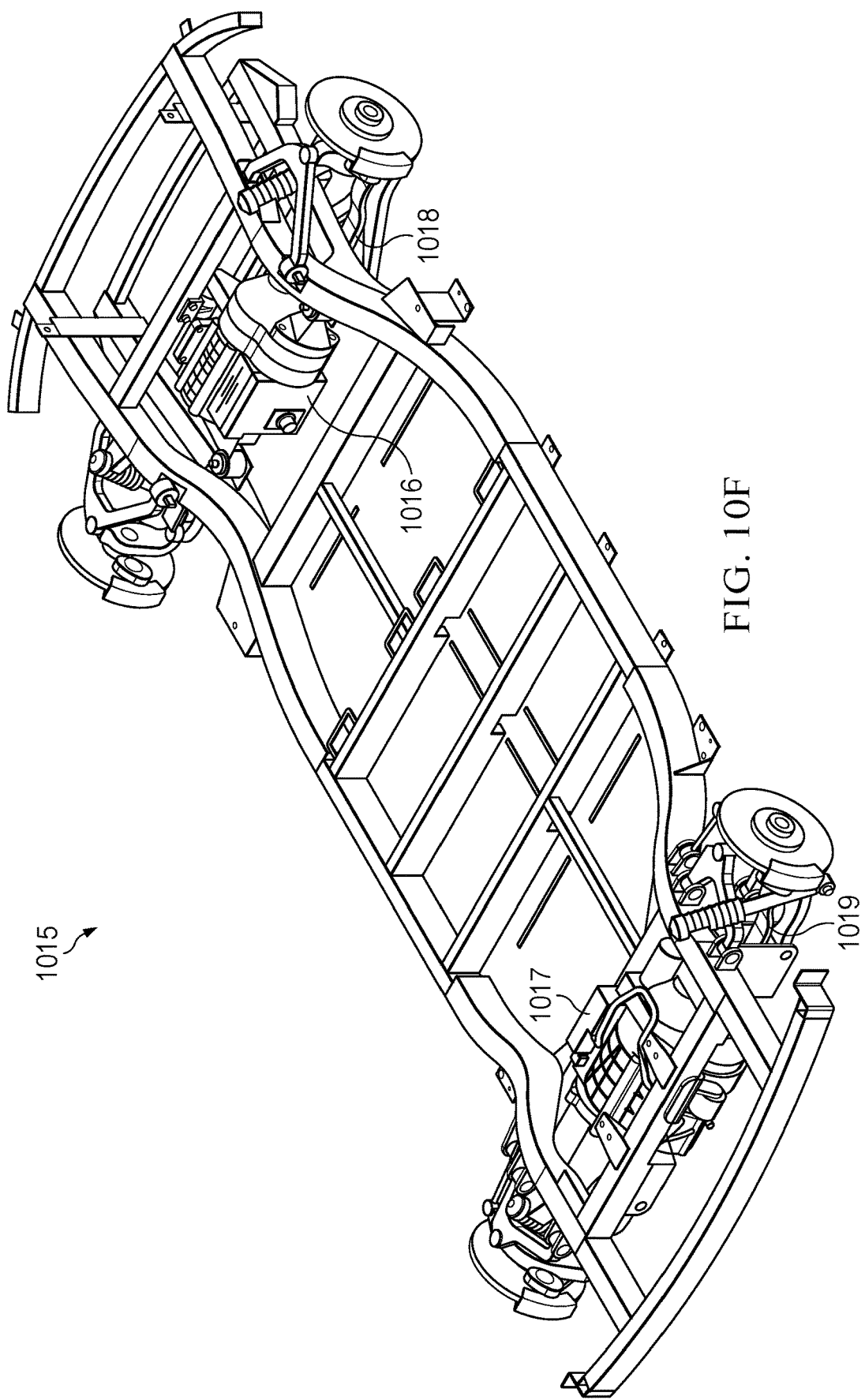

Although the above discussion has focused on the design and configuration of the front suspension system, it will be understood that similar suspension systems incorporating transverse leaf springs may be implemented on the rear wheels, as shown in FIGS. 10A to 10C. Specifically, as shown in FIGS. 10A and 10B, the rear suspension systems 1000 may also incorporate multiple supports arms 1002, 1003, and 1004 pivotably interconnected between the frame 1006 and rear wheel mount 1008. Note, instead of two arms, several embodiments may incorporate three separate pivoting arms (as shown in FIGS. 10A and 10B). Such suspension systems further incorporate dampers 1010 similar to those used in a front-end suspension. The dampers 1010 may be interconnected between the lower suspension arm 1004 and the frame 1006 via a suitable attachment element 1012, such as, for example a cooperative bracket, as shown in FIG. 10C. Embodiments of rear suspension systems can also incorporate transverse leaf springs 1014 as shown in FIGS. 10A and 10B. Accordingly, embodiments of vehicle platforms may be outfitted with independent suspensions incorporating a transverse leaf spring in both the front and the rear suspensions. Additionally, many embodiments of rear suspension systems 1000 may be adaptable with spacer and a number of different pivot/attachment points along the length of the leaf spring to improve the overall ride and roll stiffness and control of the vehicle. Moreover, although many embodiments exhibit vehicle suspension systems in association with various embodiments of vehicle platforms, it should be understood that any combination of the various structural and functional elements of such suspension systems can be included and or omitted in any number of vehicle designs.

Figure 10G:
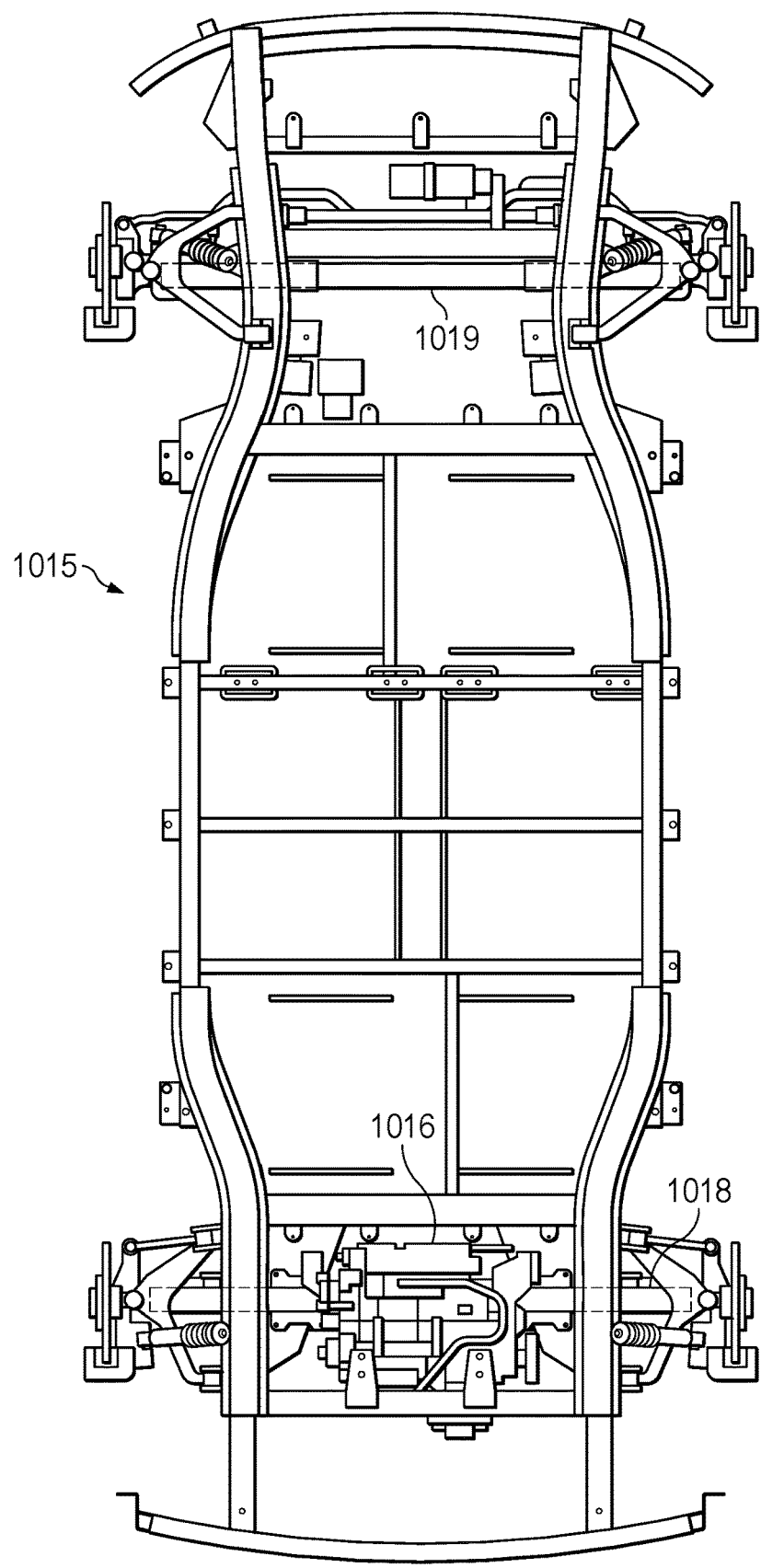
Figure 10H:
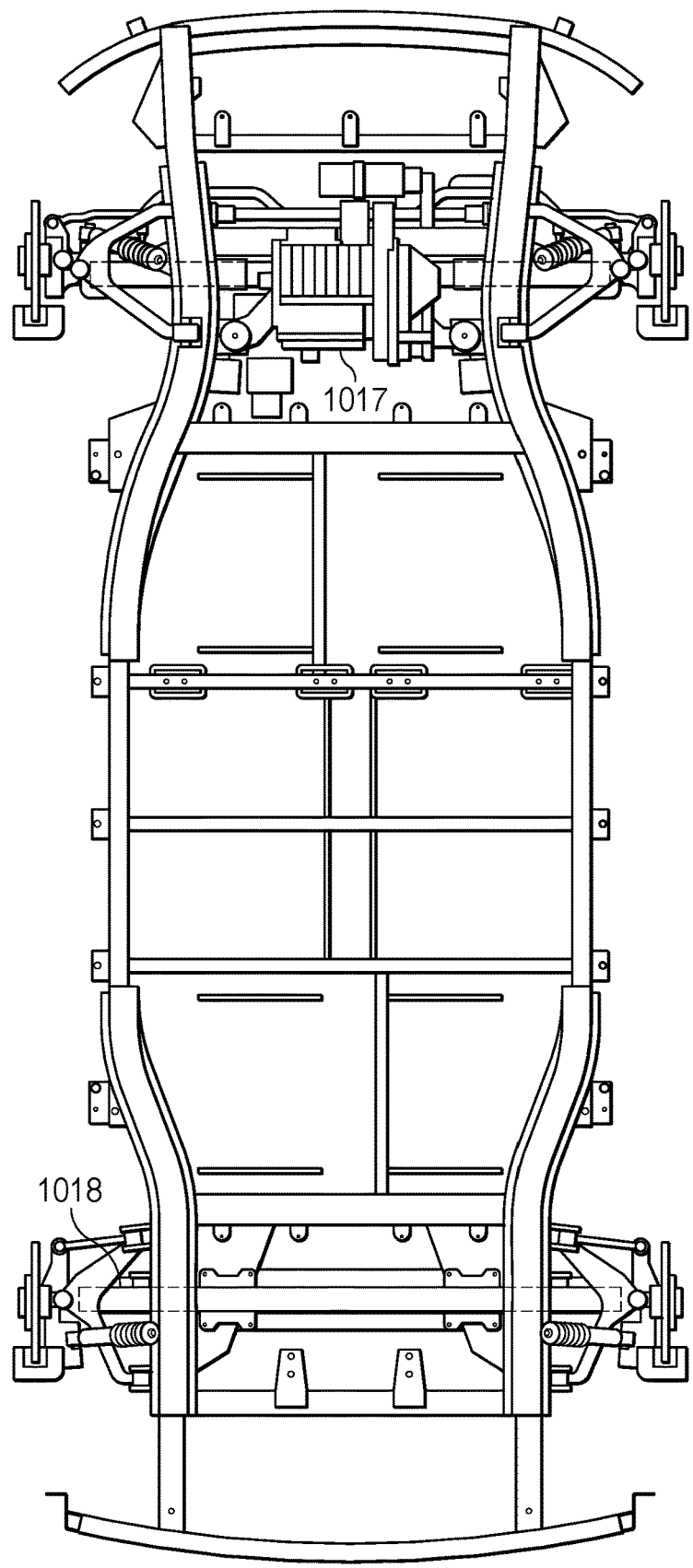
Figure 10I:
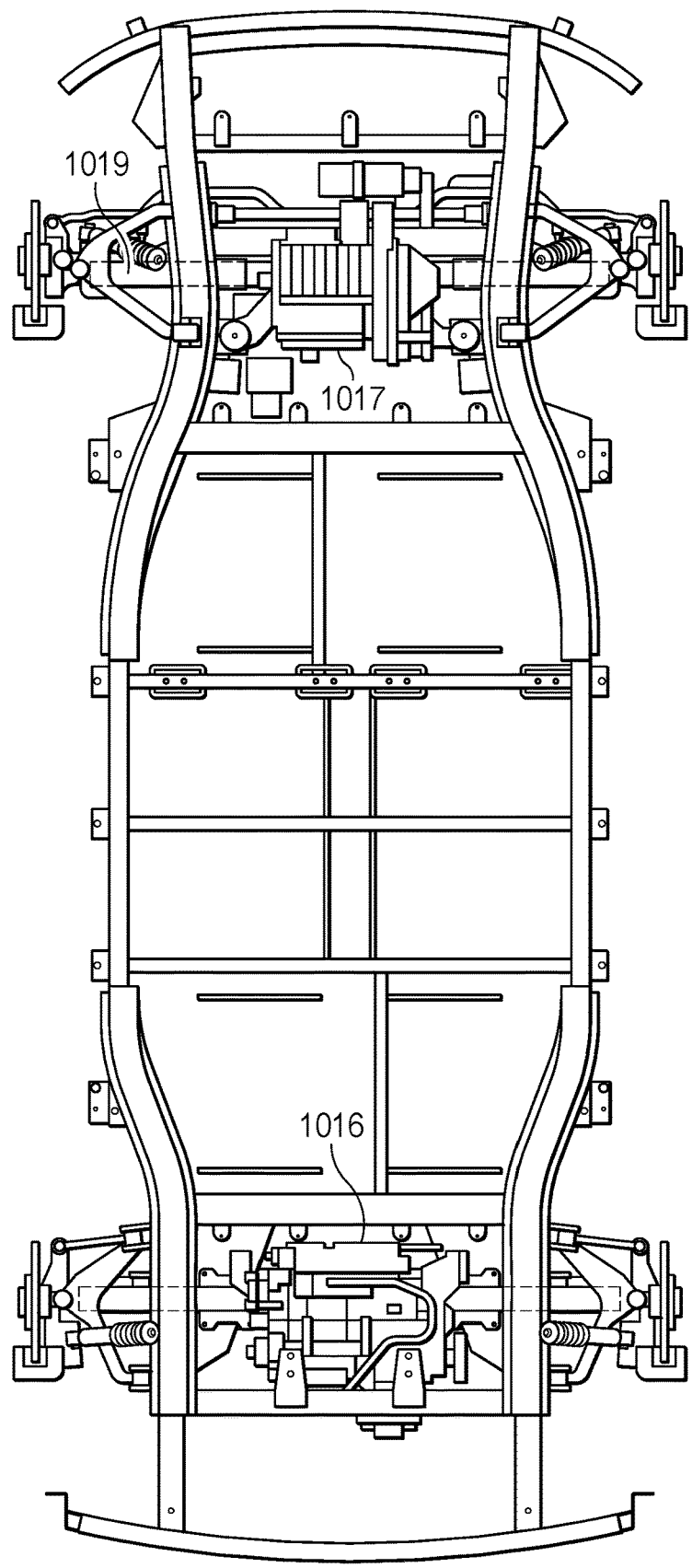

In accordance with numerous embodiments, the rear suspension systems as described above, can be modified in a similar fashion of the front suspension systems. In other words, many embodiments of a vehicle platform may include a rear suspension system adapted to include a rear motor system. For example, FIGS. 10D through 10L illustrate different embodiments of a vehicle platform 1015 with a rear 1016 (FIG. 10D), a front 1017 (FIG. 10E) or both a front and rear drive motor (FIG. 10F); each with an associated leaf spring (1018 & 1019) that is adapted to accommodate the respective motor(s). Accordingly, each of the front and rear portions have a suspension system in accordance with the various embodiments described herein. As can be appreciated, each of the front and rear suspension systems are fully connected to the vehicle platform such that no portion thereof extends into a space that may be occupied by a vehicle cabin or body that can be connected to an upper portion of the vehicle platform. FIGS. 10G through 10I further illustrate top views of embodiments of a vehicle platform 1015 with the rear, front, and both rear and front drive motors and associated suspension systems.

Figure 10M:
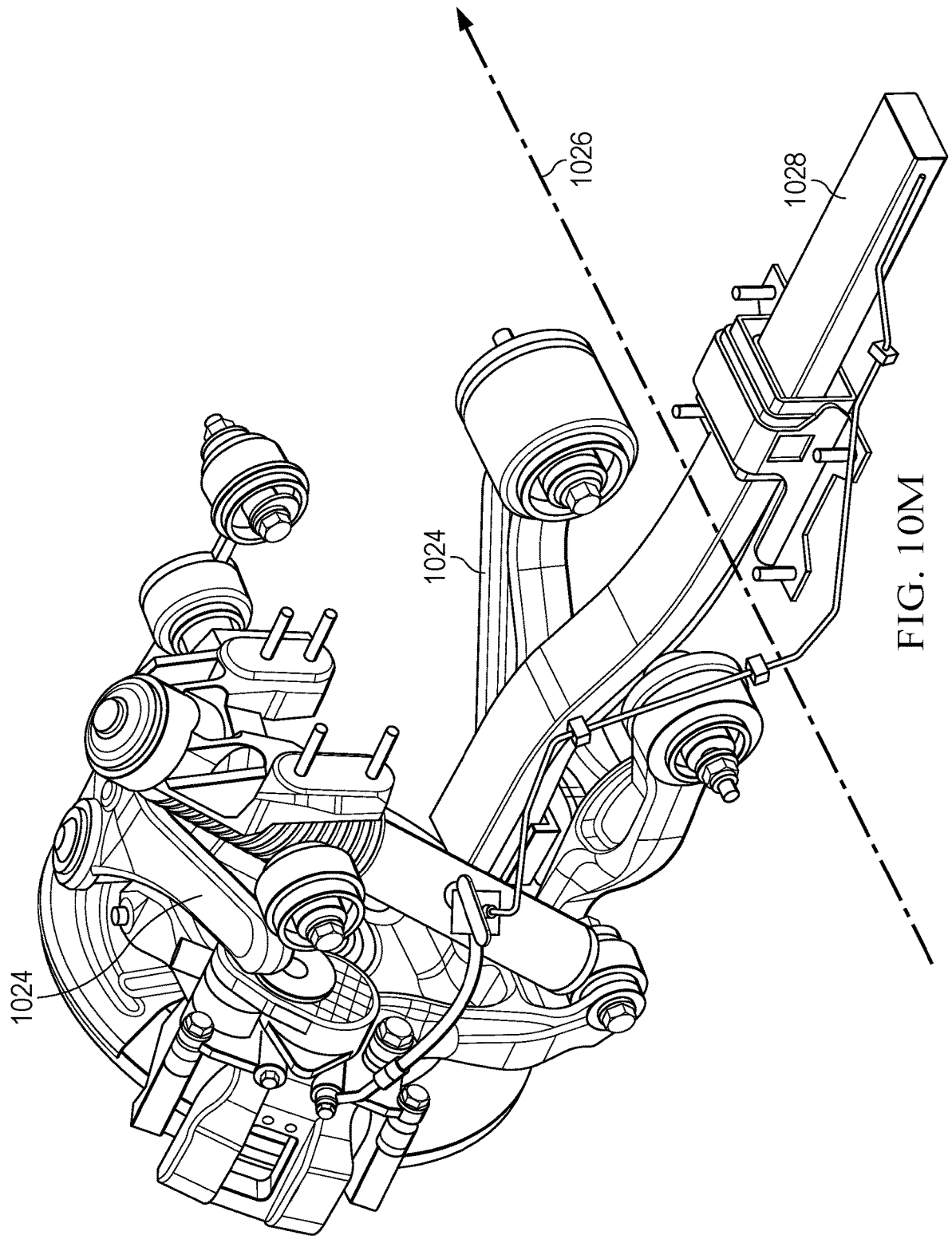
Figure 10N:
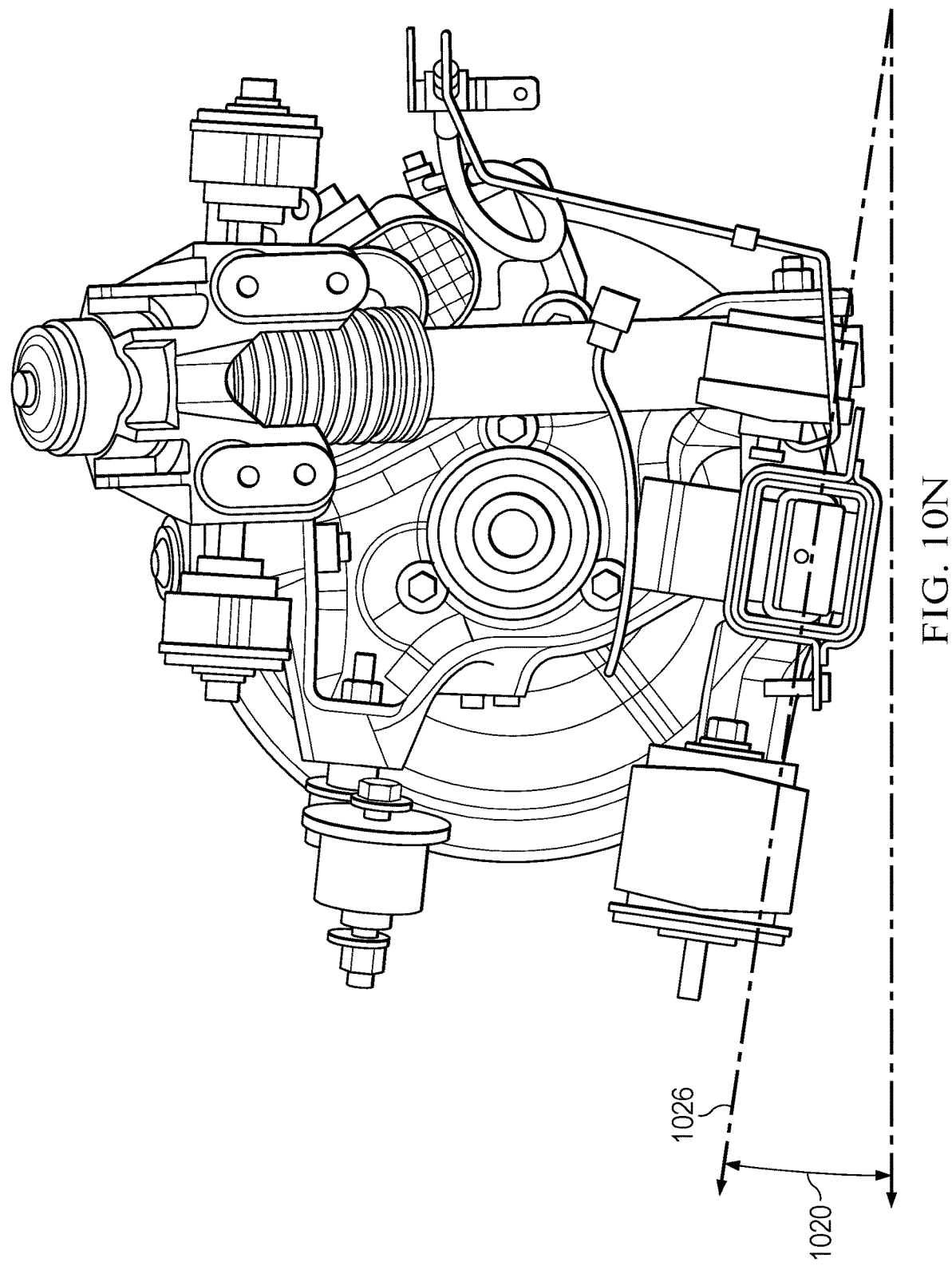

FIGS. 10J through 10L illustrate side views of various embodiments of a vehicle platform 1515 with a front 1017 and/or rear 1016 drive motors and respective suspension systems. As can be further illustrated, many embodiments may provide a rear leaf spring 1018 that is configured to rest at an angle 1020 that is not parallel to the overall longitudinal axis 1022 of the vehicle. This is in contrast to the positioning angle of the front leaf spring which may rest at an angle parallel to the longitudinal plane of the vehicle platform. FIG. 10M illustrates a perspective view of a rear leaf spring 1018 in relation to a rear control arm assembly 1024. It can be appreciated that the leaf spring 1018 has a transverse axis 1026 that runs parallel to the longitudinal axis of the vehicle platform. In accordance with various embodiments, the transvers axis 1026 of the rear leaf spring 1018 can be positioned at an angle 1020 above the horizontal such that a front edge 1028, or edge towards the front of the vehicle platform, is angled upwards above the horizontal plane. In some embodiments the angle is at least 8 degrees. The angle 1020 that the transverse leaf spring is positioned at is such that it can accommodate the movement and position of the suspension arm 1024. In accordance with many embodiments, the angle 1020 can be modified or adjusted in order to accommodate any number of suspension functional requirements that a vehicle configuration may require. For example, the angle 1020 can be adjusted as required if the overall design of the suspension is adjusted to accommodate a different vehicle body or cabin that may be placed on the vehicle platform.

Embodiments of Transverse Leaf Springs

With all the adjustability that is factored into the embodiments of the suspension system and more specifically the transverse leaf spring, it should be considered that the transverse leaf spring itself might have variety embodiments that help to improve the ride and roll stiffness to ensure a comfortable and stable ride. In order to achieve the desired roll and ride stiffness the transverse leaf spring must be able to provide the same or similar ride and roll stiffness that would be seen on traditional coil spring system like the MacPherson strut. Furthermore, the ratio between roll and ride stiffness depends on both the type of vehicle (car, truck, SUV, etc.) and the desired driving performance. Typical values for a rear suspension system are 1 to 1.5 whereas the front suspension has values between 2.5 and 3.5 due to the larger loads typically seen. In many embodiments, the leaf spring may maintain a roll stiffness that is 2.5 to 3.5 times greater than that of the ride stiffness.

Figure 11A:
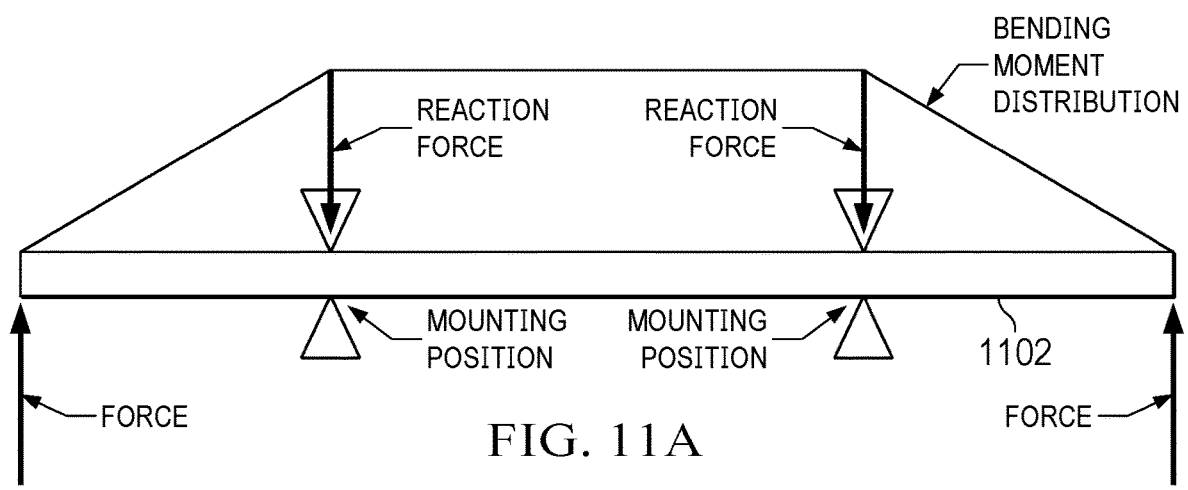
FIGS. 11A and 11B illustrate a load diagram of a suspension system.
Figure 11B:
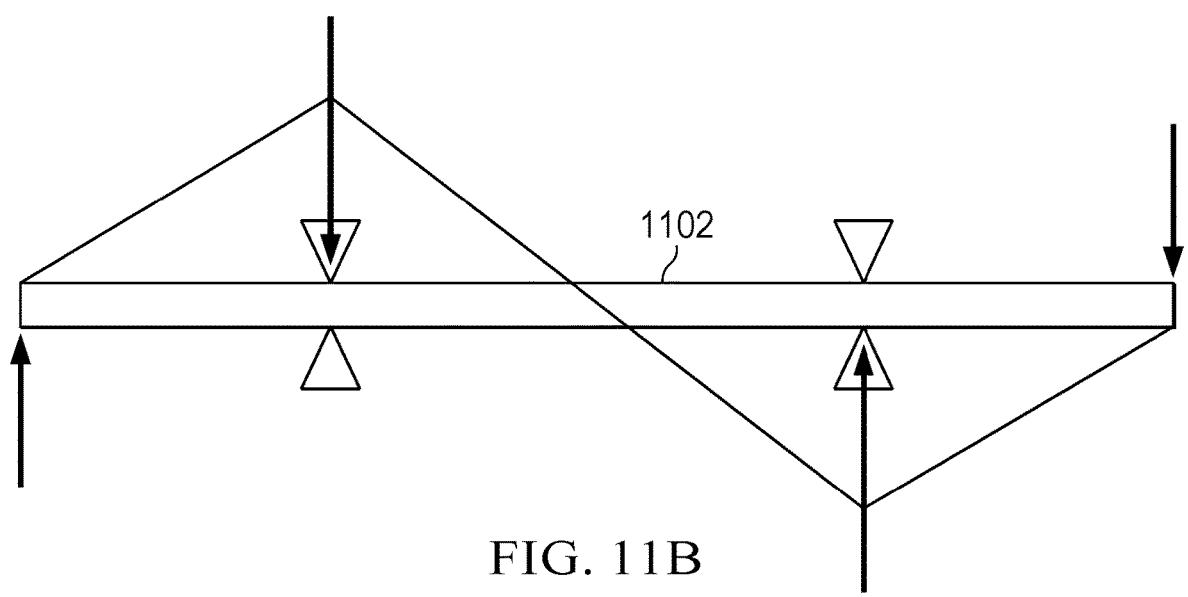

FIGS. 11A and 11B illustrate the traditional load diagrams that a transverse leaf spring might see for the given ride (11A) and roll (11B) of a vehicle. The forces applied at both ends of the leaf spring determine the ride rate or load. Such loads create a bending moment or force on the leaf spring 1102. The roll rate or load is more equivalent to a torsional force on the spring as a force is applied at one end causing a rotational moment about the opposite end. The deflections and therefore the stiffness of a traverse leave spring are predominantly depended on locally appearing bending moment (see distribution curves FIGS. 11A and 11B) as well as on the areal moment inertia of the cross section involved. The moment of inertia in a rectangular cross section depends on height and width of the cross section. Many embodiments of the leaf spring may maintain a predominantly rectangular cross section when viewed from the ends. However, many embodiments may incorporate a variable width cross section of the leaf spring in order to ensure the ride and roll stiffness are maintained.

Figure 12B:
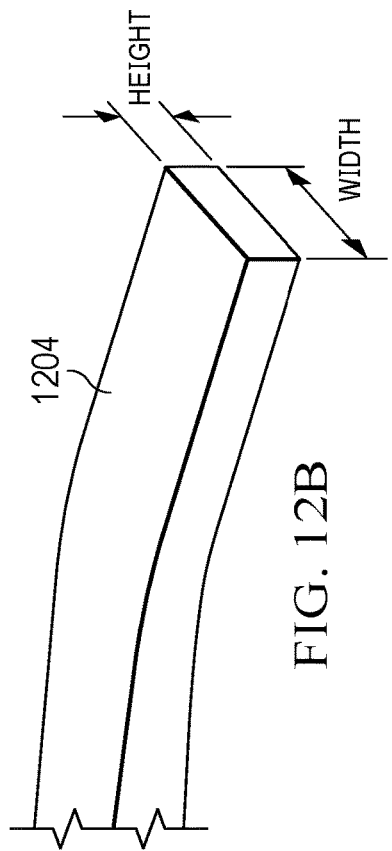
Figure 12C:
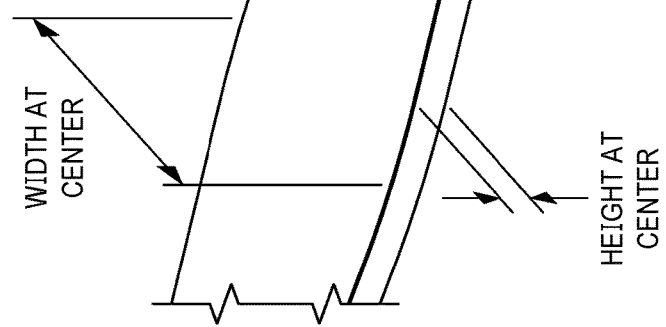

For example, FIGS. 12A to 12C illustrate embodiments of a transverse leaf spring 1200 with a variable width cross section. It can be seen that the middle section 1202 is wider than the outer sections 1204 and is wider than the location of the mounting points 1206. FIGS. 12B and 12C illustrate a zoomed in view of the leaf spring 1200 at both the center 1202 an outer portions 1204 to better illustrate the various embodiment of a leaf spring.

It can be seen in FIG. 12B that some embodiments have a specified height and width of the cross section of the ends of the leaf spring. Although some embodiments may incorporate a specific cross sectional height and width at the ends it should be understood that, other embodiments may vary the height and width of the cross section depending on the desired functionality of the leaf spring.

FIG. 12C illustrates one such change in cross sectional width and height of the leaf spring at various points along the length of the spring. An embodiment like those illustrated in FIGS. 12A to 12C may vary the height and width of the cross section depending on the section and purpose of the spring. For example, in some embodiments the height of the cross section of the spring at the mounting points may be at least 1.7 times the height of the cross section at the center of the leaf spring. In contrast, some embodiments may have the width of the cross section at the center section to be at least 1.5 time the width of the cross section at the mounting positions. Accordingly, these design variations aim to ultimately maintain the overall ride and roll stiffness of the vehicle. However, the variations may not be limitless. In some embodiments it may be provided that the cross sectional area along the length of the leaf spring does not exceed a ratio of 1.5 from the smallest to biggest sections. Again, such ratios may be important in maintaining the desired roll and ride stiffness according the body derivative that is ultimately used. Although a specific configuration of the variable cross sectional leaf spring is shown, it should be understood that the embodiments shown are not meant to be binding but only illustrate an embodiment. Furthermore, embodiments the cross sectional leaf spring may be manufactured from any number of materials including steel, composite, carbon fiber, aluminum, any number of alloys etc. such that the desired strengths and characteristics are illustrated in the leaf spring according to the desired ride and roll stiffness. Moreover, although many embodiments exhibit transverse leaf spring designs in relation to vehicle suspension systems, it should be understood that various combinations of structural and functional elements of a transverse leaf spring can be included or omitted as required by the specific vehicle or suspension system design.

Moreover, although many embodiments exhibit a transverse leaf spring in association with vehicle suspension systems, it should be understood that any combination of the various structural and functional elements of such leaf spring designs can be included and or omitted in any number of suspension systems.

Embodiments of Leaf Spring Attachment

Figure 13:
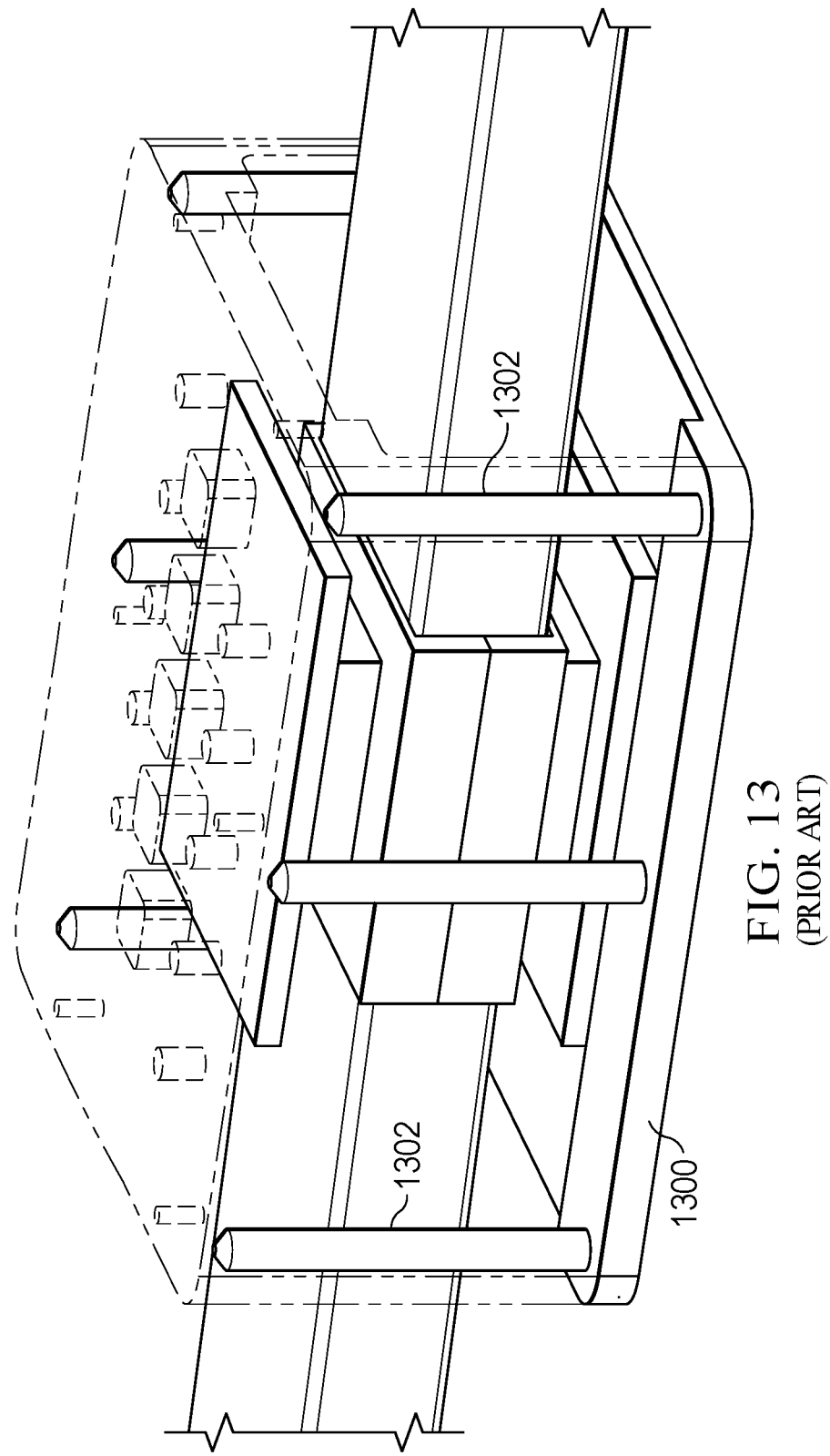
FIG. 13 illustrates an embodiment of a bushing housing according to known art.

As discussed with respect to FIGS. 4A through 4D, many embodiments of the leaf spring may include a number of pivot points that may also serve as a bushing mount for the leaf spring. In some embodiments, the bushing mount may also serve to pretension the leaf spring. Pretension is typically applied to the leaf spring in such a manner that the tension is greater than the operating forces generated by the movement of the vehicle supported by the spring. The pretensioning of a leaf spring can be helpful to maintain the desired level of tension in the leaf spring and overall suspension system in order to properly and consistently respond to the operating forces of the vehicle. Depending on the design, this might cause significant stress to the structure surrounding the bushing mounts. Many present solutions for mounting leaf springs utilizes a bolted on solution so as to generate the spring pretension required. This is similar to the design illustrated in FIG. 13, where a bushing mount structure 1300 is secured by a number of bolts 1302. The bolts 1302 are designed to apply a compressive force on the bushings to hole them in place with respect to the spring. The frame and additional bolts of many bolt on solutions tend to result in a relatively heavy and expensive structure when compared to a press in solution as shown according the many embodiments.

Figure 14A:
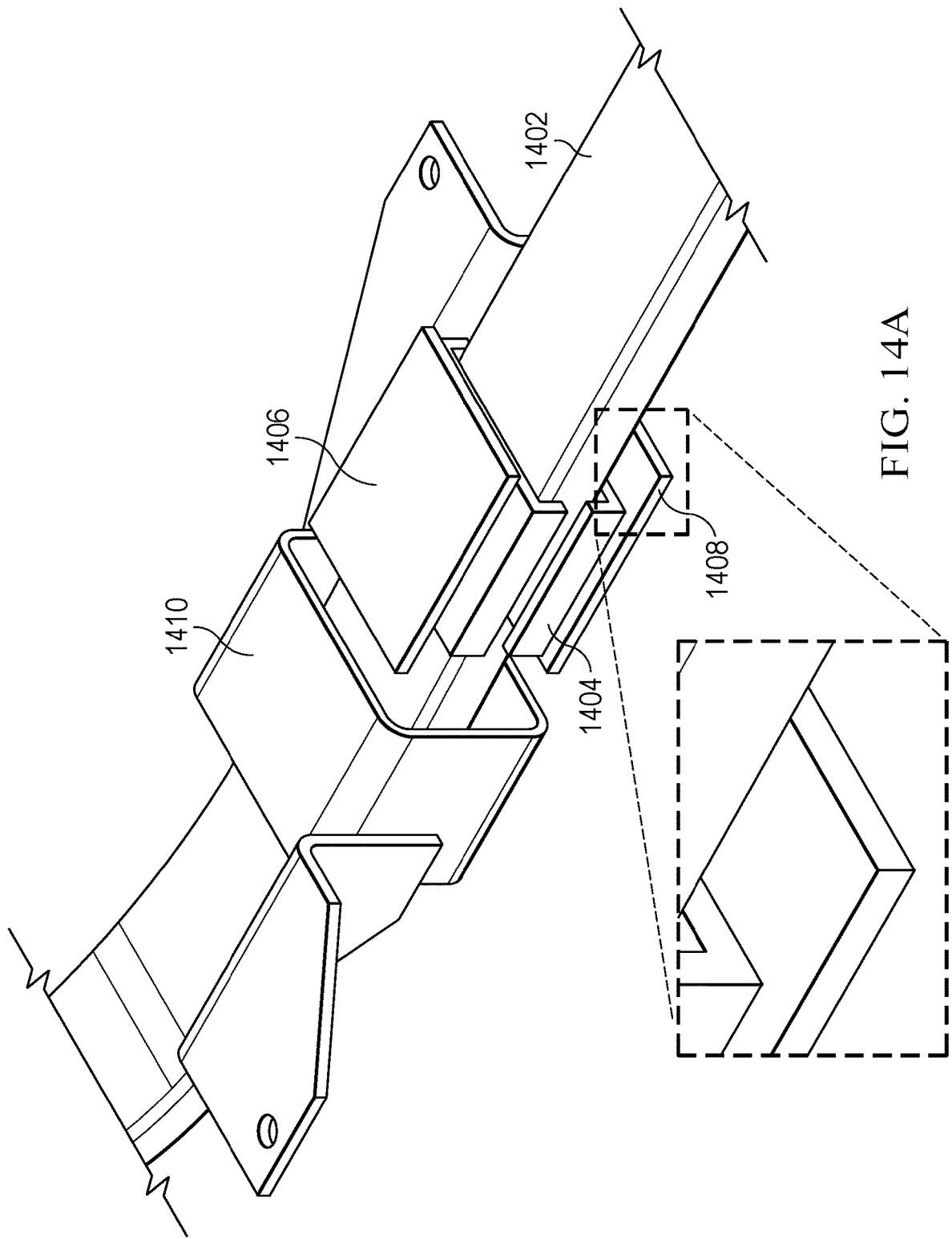
FIGS. 14A and 14B illustrate bushing housing in accordance with embodiments.
Figure 14B:
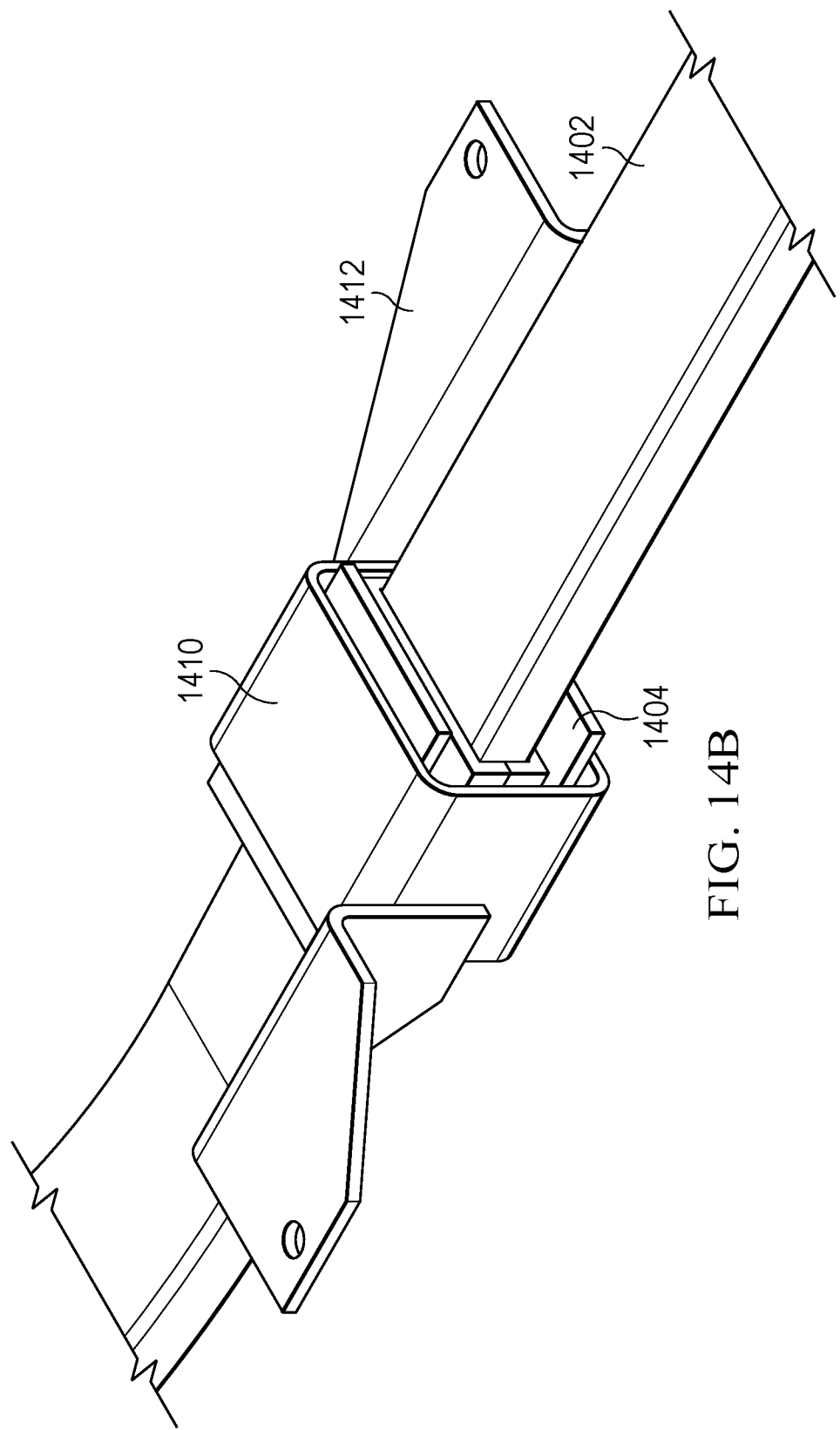

Turning now to FIGS. 14A and 14B, an embodiment of a press in solution is provided. In accordance with many embodiments the leaf spring 1402 has one or more bushing mounts (1404, 1406) that are positioned at various points along the length of the leaf spring 1402. The bushing mounts (1404, 1406), as previously discussed also serve as pivot points for the leaf spring and may be configured with one or more spacers 1208 that optimize the tension and movement of the leaf spring under the operating forces that are generated from the movement of the vehicle. In accordance with many embodiments, the bushing mount (1404, 1406) and spacer 1408 may be secured enclosed by a mounting housing 1410 that is designed to slide over the mounting bushing (1404, 1406) and any applicable spacers 1408. The mounting housing 1410 may be designed to place a compressive force on the bushing mounts (1404, 1406) such that they positively engage with the leaf spring 1402. Accordingly, the mounting housing 1410 may be designed to incorporate an interference fit between the mounting bushing (1404, 1406) and any spacers 1408 that are positioned on the leaf spring 1402. In other words, in numerous embodiments, the housing 1410 may have an opening that is slightly smaller than the combined height or thickness of the leaf spring 1402, the mounting bushing (1404, 1406) and any spacers 1408. This interference fit factors into the application of the pretension on the spring 1402. The pretension is calculated by the difference in height or overall thickness multiplied by the combined stiffness of the components involved (i.e., housing 1410, leaf spring 1402, bushing (1404, 1406), and spacer 1208). Furthermore, in many embodiments, the pretension of the assembly can be specifically tuned to the overall structure of the vehicle by factoring in and adjusting the height for the optimal spacer 1408. Accordingly, it can be appreciated that the spacer can be adjusted in size to accommodate the maximum movement of the leaf spring 1402 based on the overall structure of the vehicle, including the body component and any occupant or loads that may be present.

Numerous embodiments of leaf spring attachments may incorporate two part bushing mounts with an upper and a lower component that act as a single bushing mount around a portion of the leaf spring. Accordingly the housing can act as an additional support or clamping device that holds the upper and lower portions around the leaf spring and keeps them from moving during the movement of the vehicle. Additionally, many embodiments of the may be configured with one or more flanges or protrusions 1412 that are designed to provide a mounting surface to mount the housing 1410 to the vehicle frame or a portion thereof. Likewise many of the flanges 1412 may be configured with pre-fabricated holes or mounting orifices that simplify the mounting of both the housing 1410 and subsequently the leaf spring 1402.

Figure 15A:
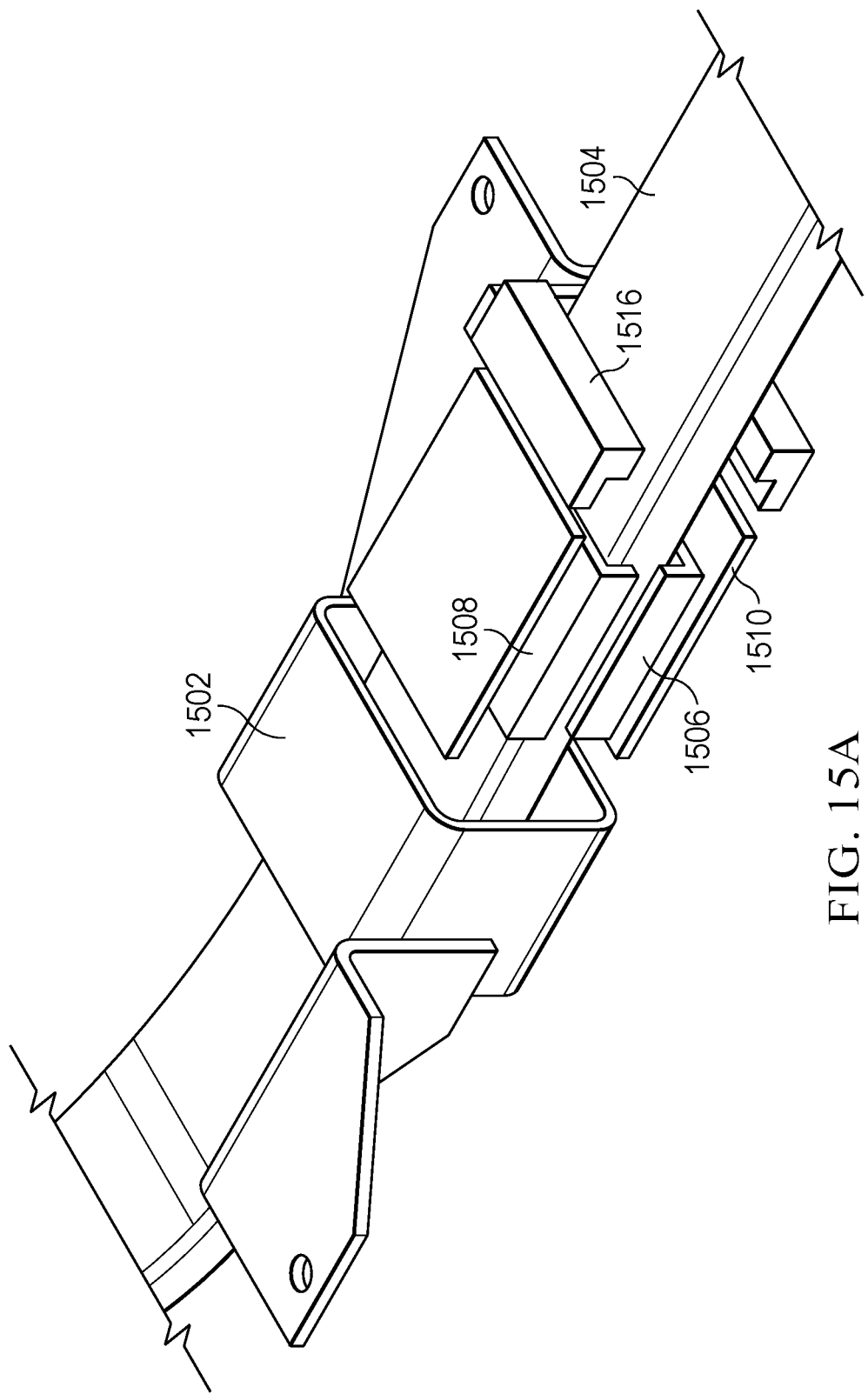
FIGS. 15A through 15D illustrate a bushing housing mounting according to embodiments.
Figure 15B:
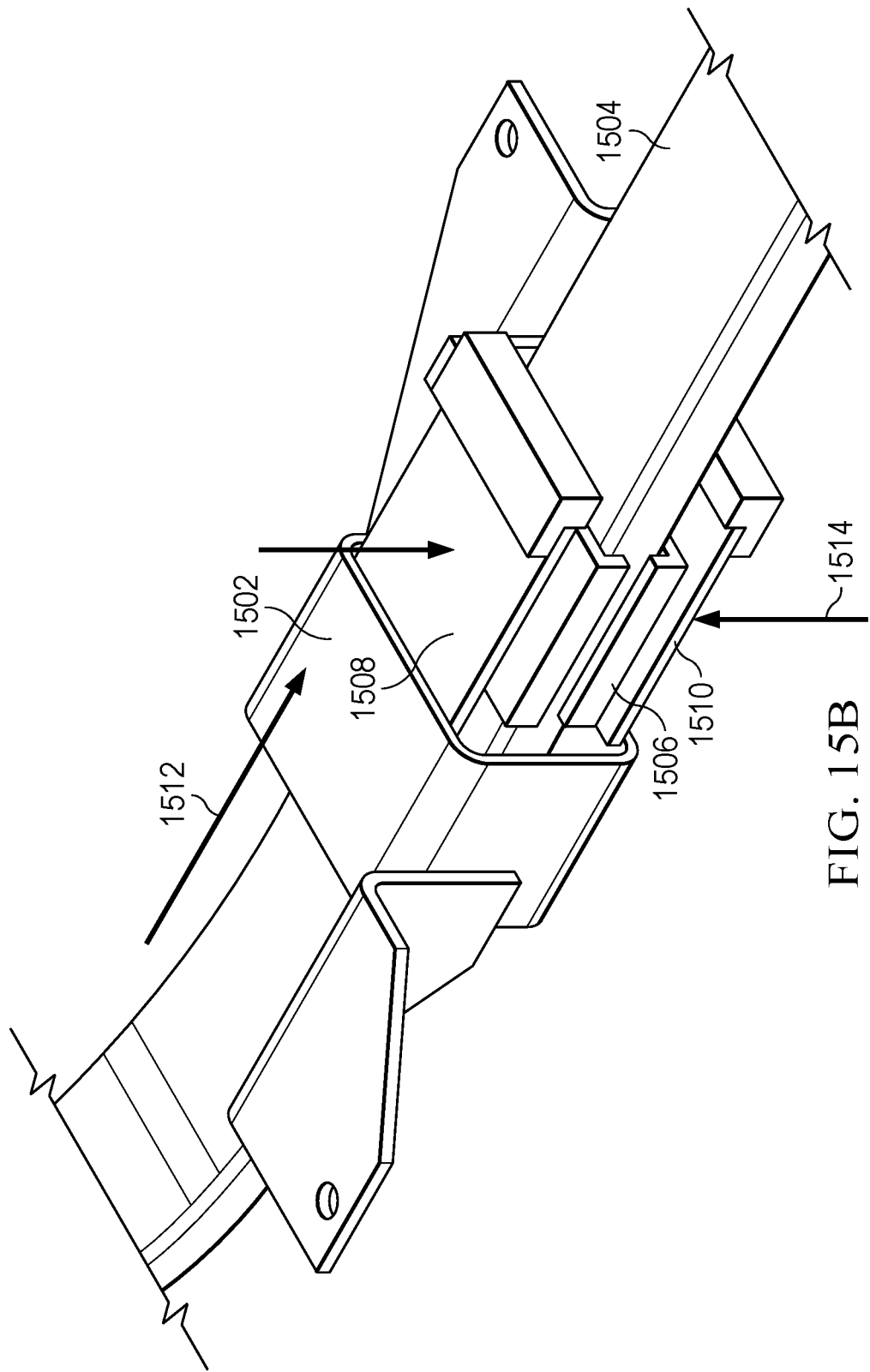
Figure 15C:
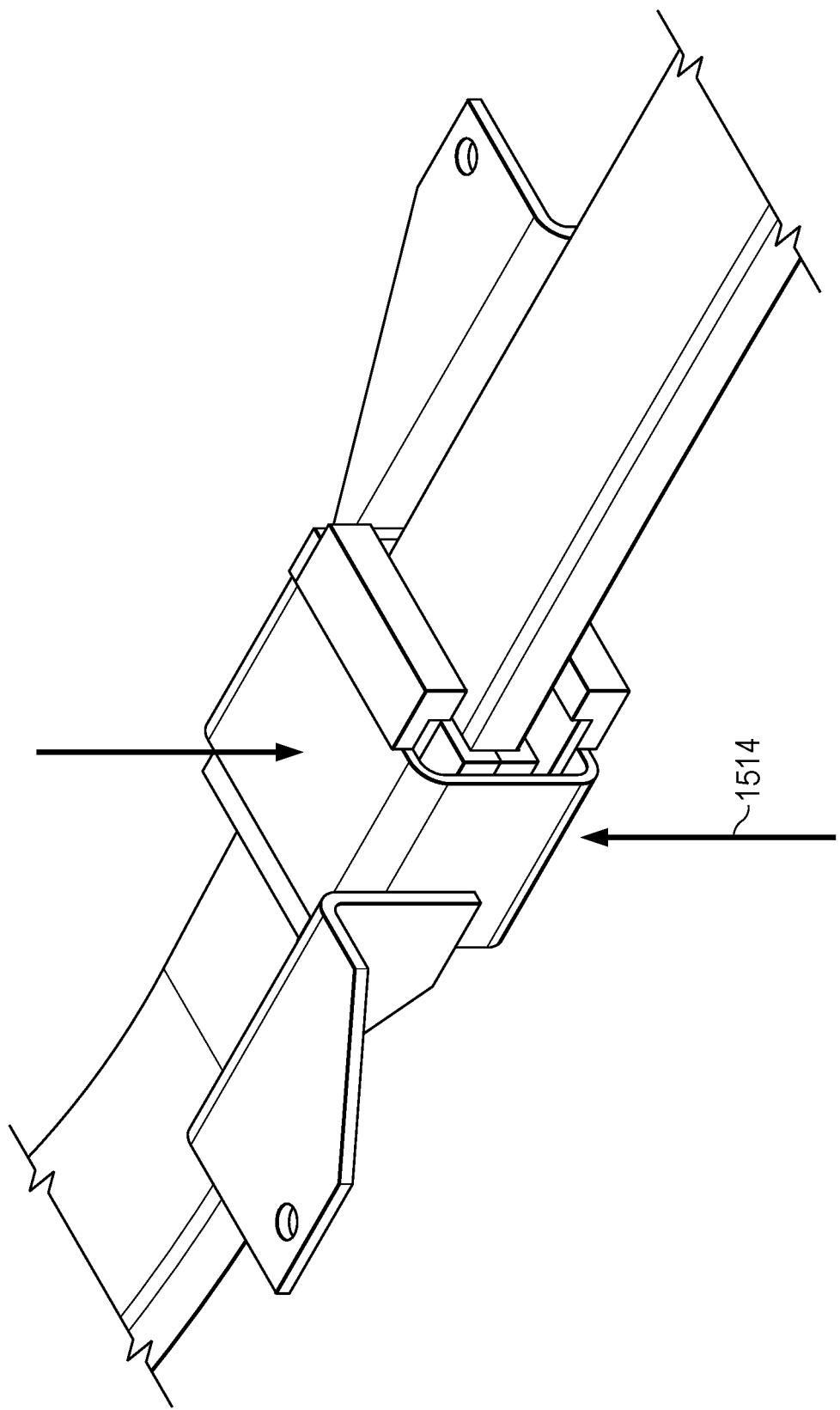
Figure 15D:
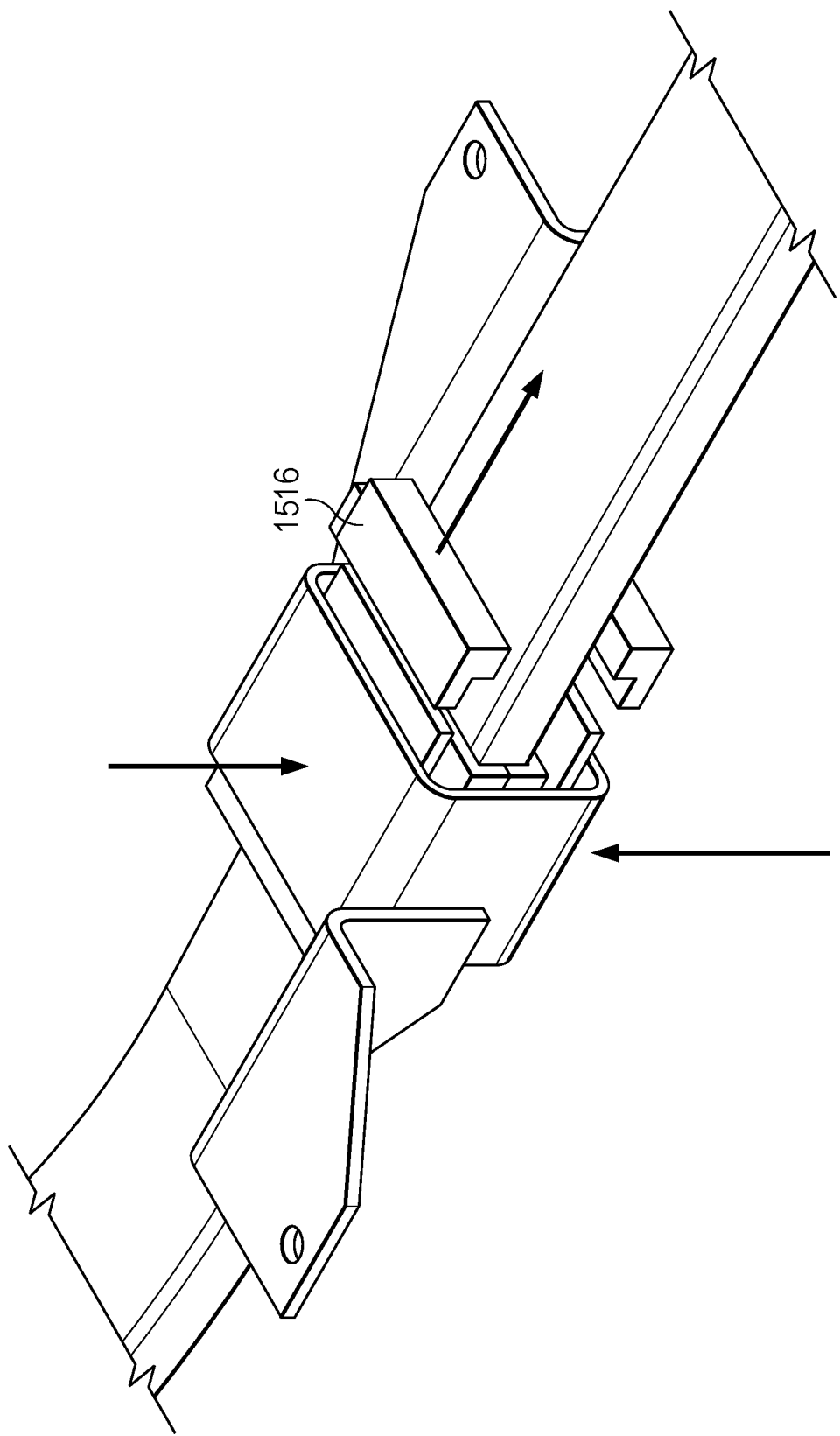

Turning now to FIGS. 15A to 15D additional embodiments of amounting housing 1502 and installation process are illustrated. Similar to the housing presented in FIGS. 14A and 14B, the housing shown in FIGS. 15A to 15D may be designed to provide an interference fit around the combined assembly of the leaf spring 1504, the mounting bushing (1506 and 1508), and any optimal spacers 1510. FIGS. 15B and 15C illustrate the motion of the mounting housing 1502 during an installation process in relation to the leaf spring 1504 and the assembly of mounting bushings by the directional arrow 1512 running parallel to the leaf spring. In such embodiments, the mounting housing 1502 moves along the length of the leaf spring 1504 and over the assembly of mounting bushings and optimal spacer(s) to apply a compacting force 1514 (FIG. 15C) on the mounting bushing assembly, thereby holding it in a fixed position on the leaf spring. The compacting force 1514 is indicated by the directional arrows running perpendicular to the longitudinal axis of the leaf spring 1504.

Additionally, as illustrated in FIGS. 15B and 15C, many embodiments may incorporate a securing mechanism 1516 that may be placed in a particular position on the leaf spring 1504 in relation to the bushing assembly (1506, 1508 and 1510) and is designed to hold or secure the mounting housing 1502 in place over the bushing assembly (1506, 1508 and 1510). In various embodiments, the use of a securing mechanism 1516 can be to apply a temporary compressive force on the bushing assembly (1506, 1508 and 1510) until the bushing housing 1502 is moved into position. The securing mechanism 1516 may be a single element in a fixed position that wraps around a portion of the leaf spring 1504 or may be multiple components that clamp around the leaf spring 1504. In numerous embodiments, the securing mechanism 1516 may be moveably connected to the leaf spring 1504 such that it can slide along the length of the leaf spring 1504 to engage or disengage with the bushing assembly (1506, 1508 and 1510). In other words, the securing mechanism 1516 can be installed and later removed after the mounting housing 1502 has been secured over the bushing assembly (1506, 1508 and 1510). Although a specific configuration is illustrated, it should be understood that any number of configurations may be used within the concept of securing or holding the bushing assembly (1506, 1508 and 1510) while the mounting housing 1502 is moved into a fixed position over the busing assembly (1506, 1508 and 1510).

Moreover, although many embodiments exhibit a process for installing various components of a suspension system including, but not limited to, leaf springs in association with vehicle suspension systems, it should be understood that any combination of the various structural and functional elements of such processes can be included and or omitted in any number of suspension systems.

Embodiments of a Method and Device for Pretensioning a Leaf Spring

Referring now to FIGS. 16 through 25 many embodiments of the transverse leaf spring may need to be pre-tensioned prior to being installed on to a vehicle. A transverse leaf spring used in an automotive suspension system offers the potential to produce the required ride and roll stiffness and therefor replace traditional road spring arrangements. However, such leaf springs can present different challenges in terms of vehicle assembly. Accordingly, many embodiments may require a spring to be in a pre-compressed or pre-tensioned state. The pre-tensioned state may be accomplished in a number of manners in accordance with embodiments of the invention. In some embodiments, the pretensioning may also include a sub-assembled spring with portions or components of the mounting system to aid in maintaining the tension while providing the essential mounting components for the vehicle.

Figure 16:
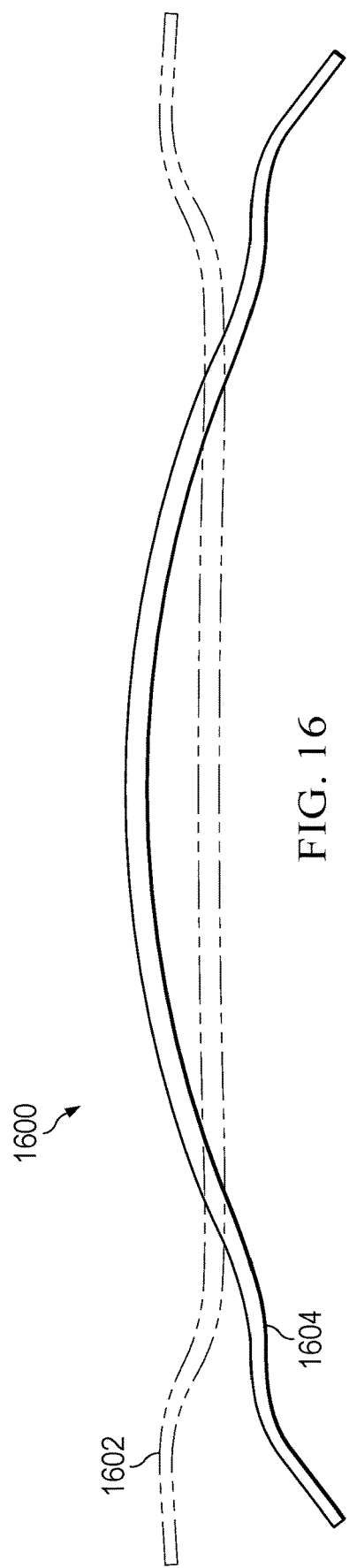
FIG. 16 illustrates a view of a leaf spring under tension and in free form position.

FIG. 16 illustrates a transverse leaf spring 1600, in accordance with many embodiments, as positioned in a free form 1604 and a pre-tensioned 1602 state. The free form 1604 state is the natural state of the leaf spring prior to tension being applied and subsequently being installed on a vehicle platform. Accordingly, many embodiments of leaf springs may be designed to have potential tension capabilities that will resolve when the spring is placed in a tensioned 1602 state.

Figure 17:
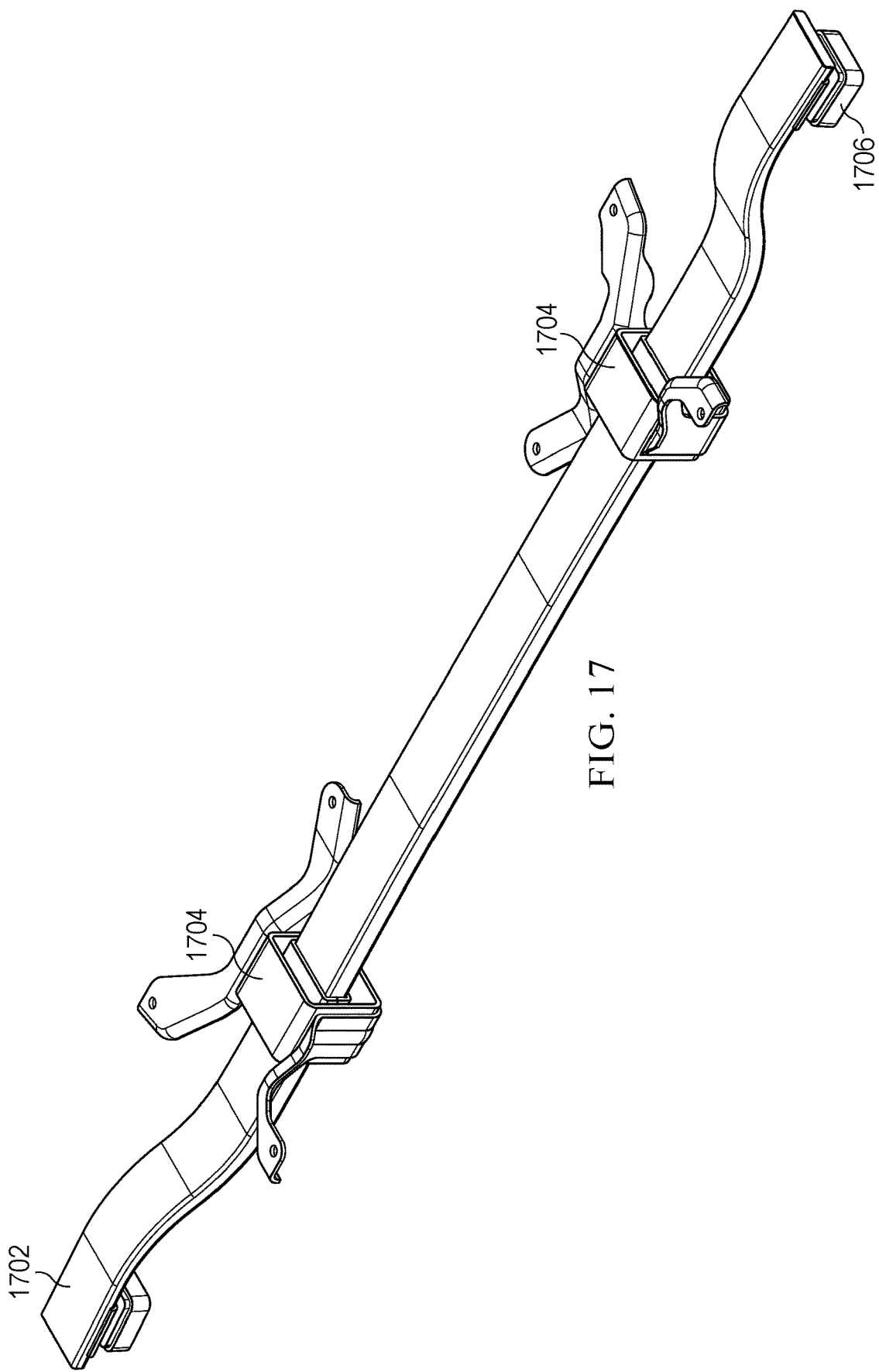
FIG. 17 illustrates an embodiment of a tensioned leaf spring in accordance with embodiments of the invention.

In accordance with many embodiments, the pre-tensioned spring as illustrated in FIG. 16 may require a variety of additional components to help keep the desired tension on the spring itself once it has been installed on a vehicle platform. For example, FIG. 17, illustrates an embodiment of a transverse leaf spring 1702 with the mounting brackets 1704 attached. In accordance with many embodiments, the mounting brackets 1704 connect the leaf spring 1702 to the sprung mass of a vehicle (e.g. the car body aka cabin). In some embodiments, additional mounts 1706 connect the spring 1702 to the unsprung mass on the vehicle (chassis control arms, knuckle, wheel etc.). In accordance with some embodiments, the additional mounts 1706 may include spacers that can be applied in order to adjust a vehicle of a specific weight to the required ride height. Likewise, the mounting brackets 1704 can be moved or adjusted, according to many embodiments, depending on the level of tension necessary for the overall vehicle configuration. The spacers 1706, in accordance with many embodiments, may be pre-mounted and may take on any number of sizes, as previously discussed, according to the overall desired vehicle suspension characteristics.

Figure 18A:
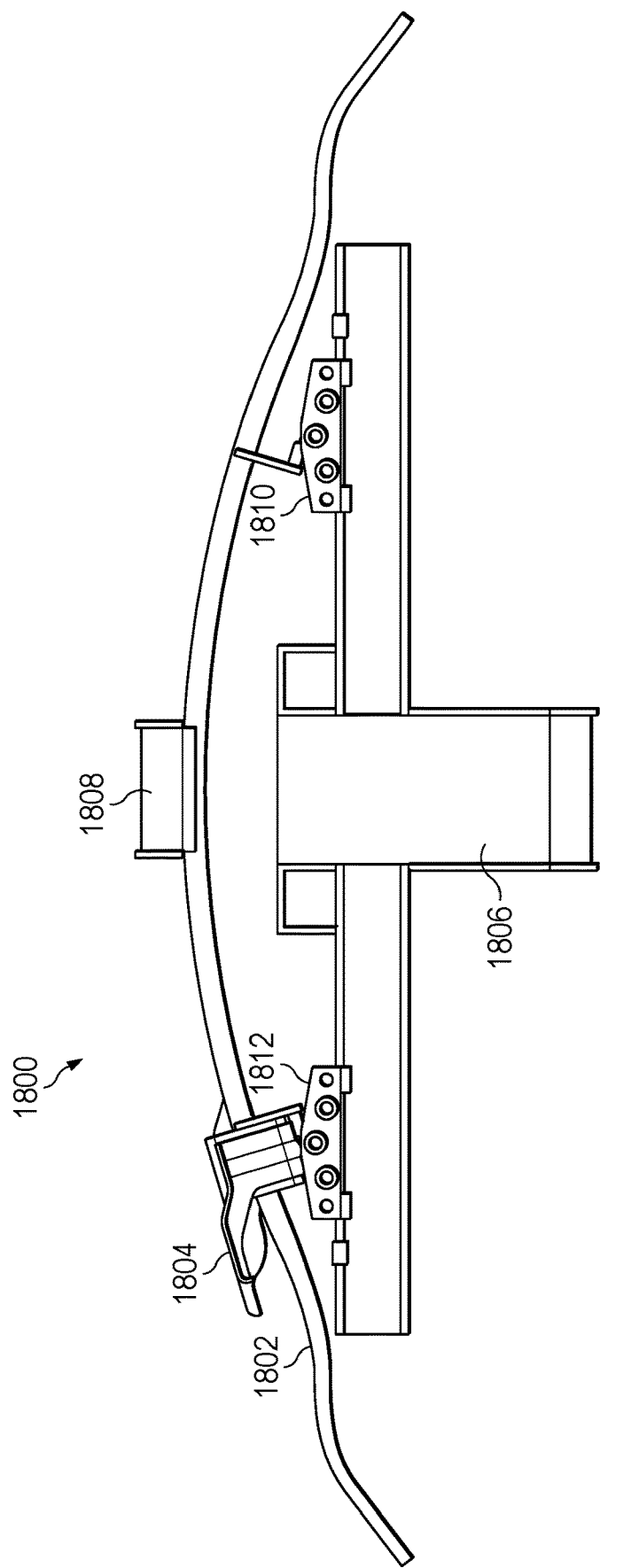
FIGS. 18A and 18B illustrate a leaf spring in a free form and a designed position in accordance with embodiments of the invention.
Figure 18B:
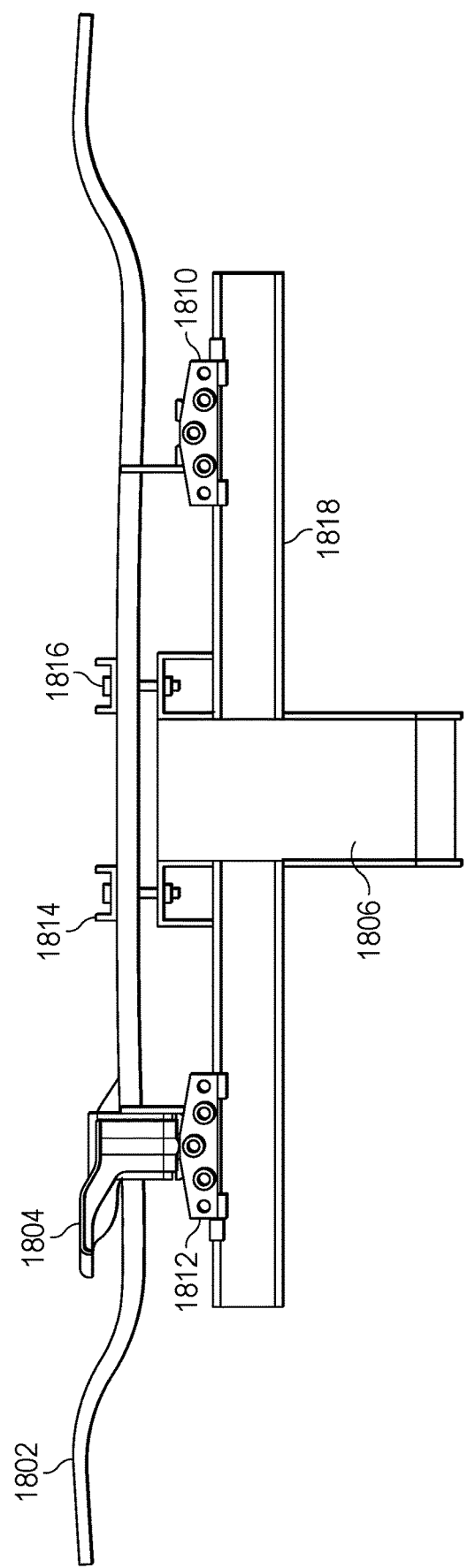

Turning now to FIGS. 18A through 25, many embodiments for applying the tension to the leaf spring are illustrated. For example, FIGS. 18A and 18B illustrate an embodiment of a tensioning device 1800 that is designed to hold the leaf spring 1802 in both its free form state (18A) and its tensioned state (18B). In some embodiments, the leaf spring 1802 may be sub-assembled or pre-assembled with one or more mounting brackets 1804. In accordance with many embodiments the tensioning device 1800 may have tension applicator 1806 configured to apply tension to the spring 1802. As such, the tension applicator 1806 may have a tension guard element 1808 that is temporarily attached to the leaf spring 1802 such that tension may be applied to the spring 1802 without negatively impacting the spring itself. In some embodiments the spring may be manufactured of a composite or even a metallic material and applying force directly to the spring could result in damage that could ultimately affect the function of the spring. As such many embodiments may use such guard elements 1808. Furthermore, the tensioning of the spring 1802 will cause the spring form factor to change from an arched to a more flat configuration. Accordingly, it can be important to secure the spring during the application of force but also allow movement in the spring itself to prevent undesired buckling or damage. FIGS. 18A and 18B illustrate one or more movement brackets (1810, 1812) that will allow for rotational 1812 and/or translational 1810 movement of the spring during the application of tension. Once tension is applied, many embodiments may utilize holding brackets 1814 and bolts 1816 to hold the spring in the tensioned state for installation on a vehicle platform. In accordance with many embodiments the various components of the tension device 1800 may be supported by an elongated support beam or support structure 1818. The support structure 1818 may support the movement brackets (1810, 1812) as well as the tension applicator 1806.

Figure 19A:
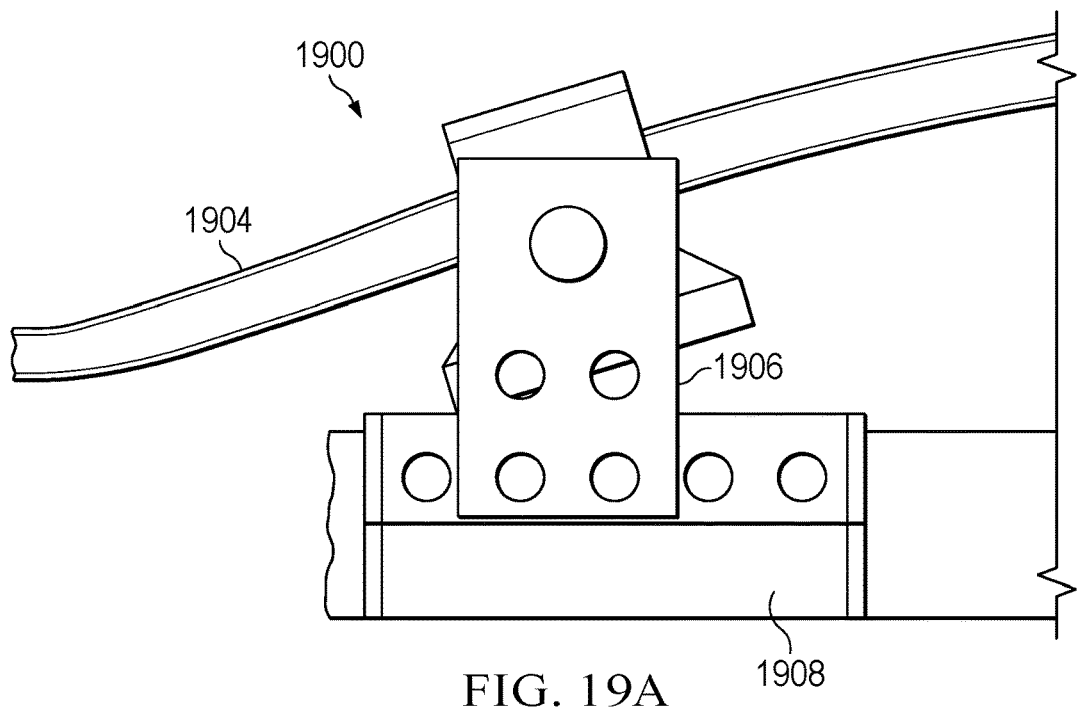
FIGS. 19A and 19B illustrate a leaf spring being tensioned in accordance with embodiments of the invention.
Figure 19B:
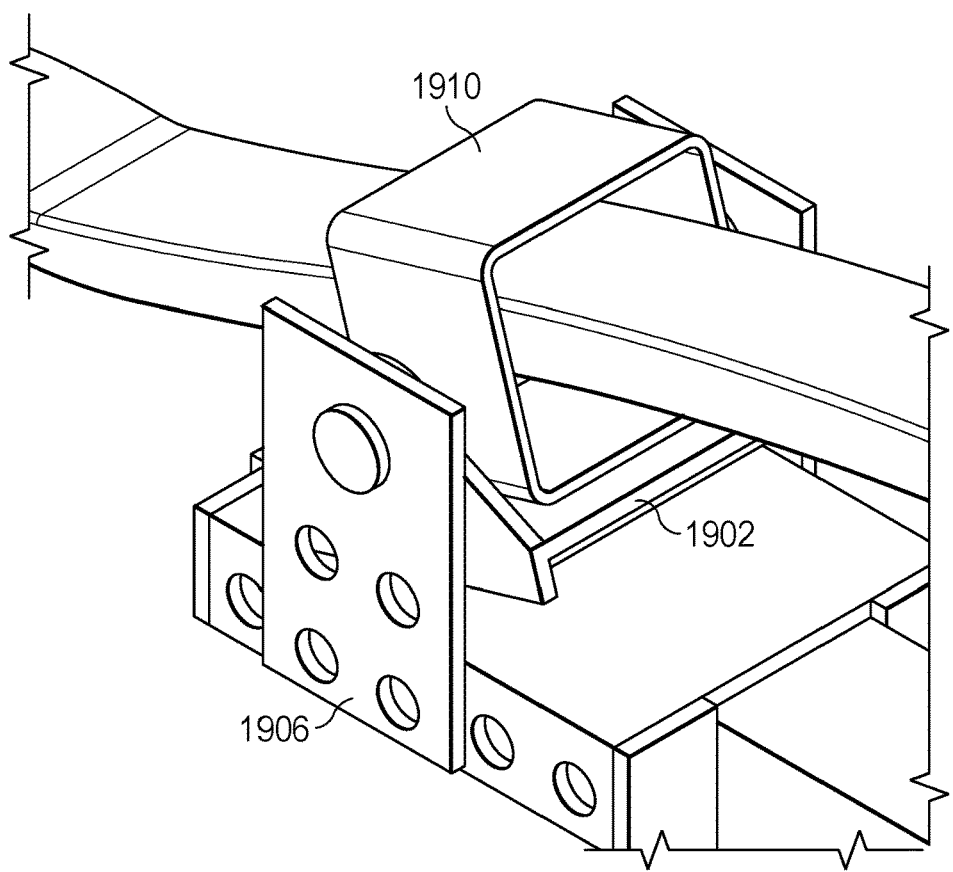

Since the tension applied can affect the configuration of the spring, it is important to address the manner in which the spring is allowed to move or translate during the tensioning process. FIGS. 19A through 22B illustrate various embodiments of the rotational and translational points on the tensioning device. For example, FIGS. 19A and 19B illustrate a rotational axis point 1900 where the rotational axis is positioned above a seat 1902. In accordance with many embodiments, the rotational axis point 1700 may have a variety of elements that are designed to hold the leaf spring 1904 while allowing it to rotate during tensioning. For example, some embodiments may have a rotational support bracket 1906 mounted to a support structure 1908 of a tensioning device. The rotational support bracket may be configured with a rotating seat 1902 that is designed to hold or secure the leaf spring at a desired location and allow for the rotational movement of the spring 1904 during the tensioning process. In many embodiments, the seat 1902 may attach to the spring 1904 at the position of the mounting bracket 1910, which may be pre-assembled.

Figure 20A:
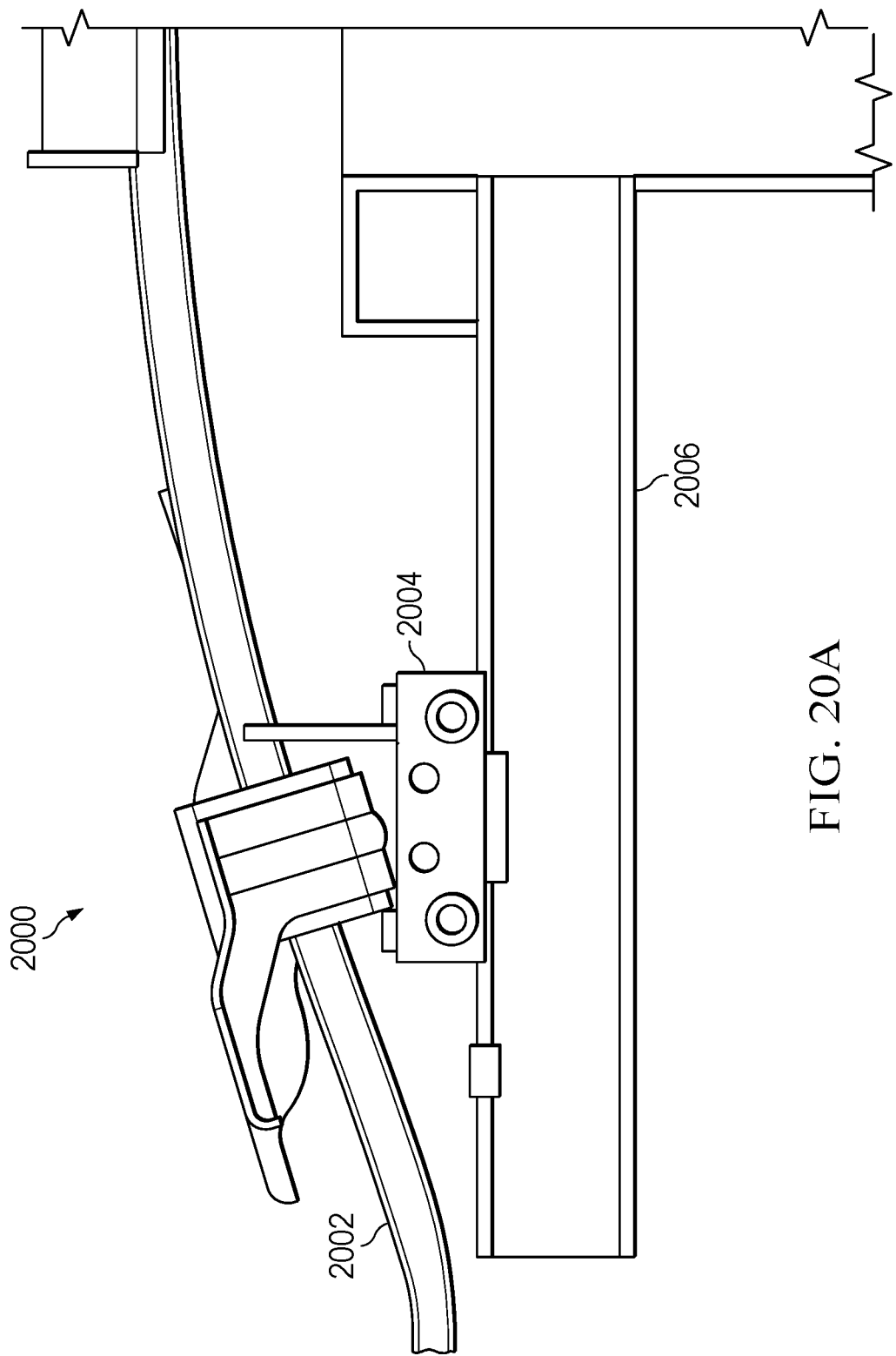
FIGS. 20A and 20B illustrate a rotational axis in accordance with embodiments of the invention.
Figure 20B:
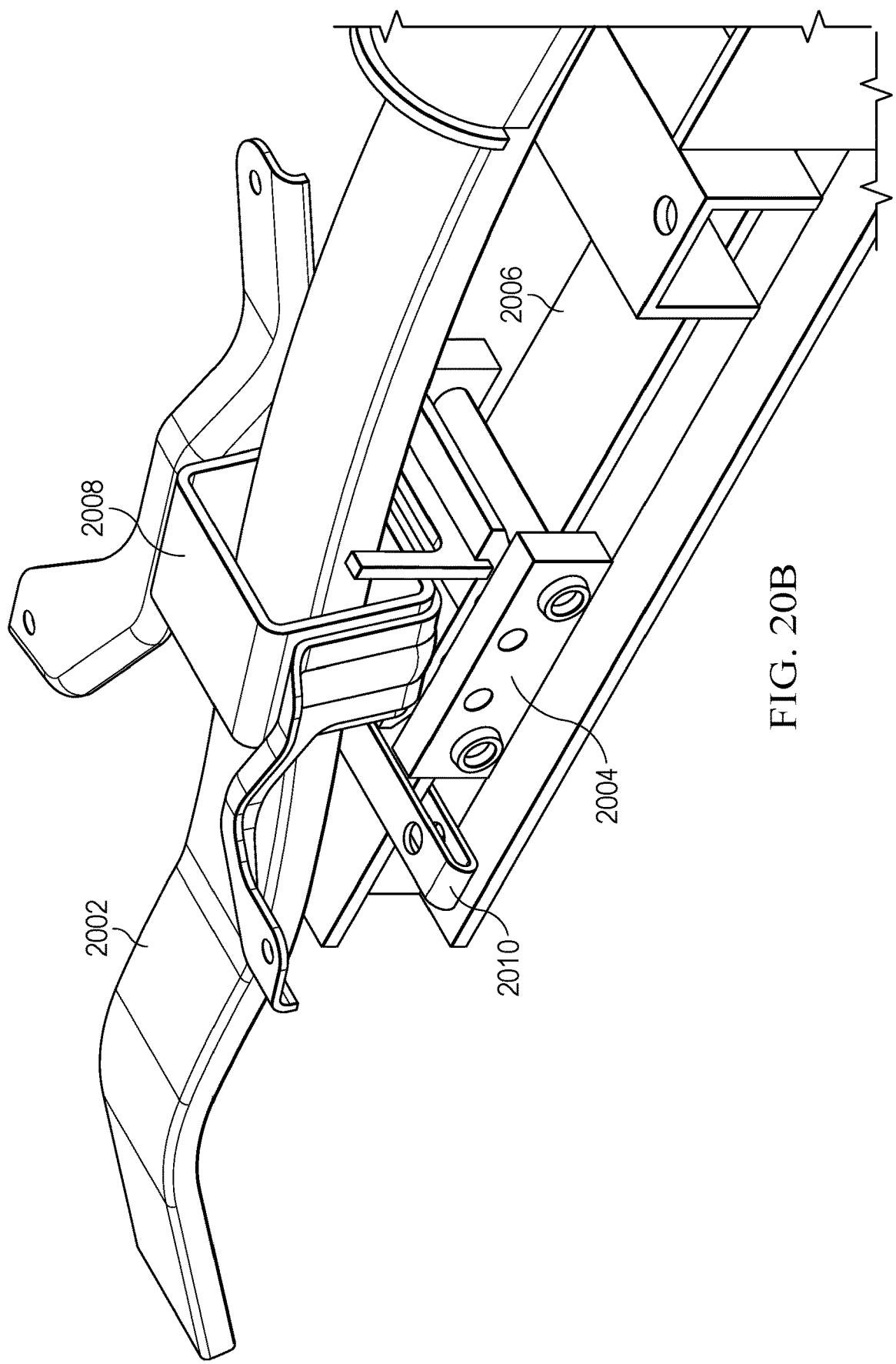

Spring movement is necessary during the application of tension to avoid unwanted buckling and damage to the spring. Many embodiments may also incorporate a translational movement system to allow a portion of the spring to move in a direction parallel to the longitudinal axis of the spring. For example, FIGS. 20A and 20B illustrate an embodiment of a translational movement system 2000 that may be used in a tensioning device. Embodiments of the translational movement system 2000 may have a variety of components that are designed to hold a leaf spring 2002 while allowing translational movement of the spring. Some embodiments may use a translational support bracket 2004 that may be positioned on a support element 2006 of a tensioning device. In many embodiments, the translational bracket 2004 may be configured to support the leaf spring 2002 and a mounting bracket 2008 in such a manner that movement would be allowed while tension is applied. The translational movement would come as tension is applied to a central point (not shown) on the spring thereby forcing the ends of the spring 2002 to move along an axis parallel to the longitudinal axis of the spring 2002. The translational bracket 2004 may be configured to slide or move along the support element as tension is applied, thereby relieving any unnecessary stress build up in the spring. Such build up would occur if the ends of the spring 2002 were fixed and not allowed any type of movement and would thereby cause undesired damage to the spring 2002. Additionally, many embodiments may incorporate a stop 2010 that is positioned along the support structure 2006 to limit the translational movement of the spring 2002. In many embodiments, the stop 2008 may act as a guide such that the translational movement directly correlates to the overall tension applied, thereby preventing the application of too much stress or too little.

Figure 21A:
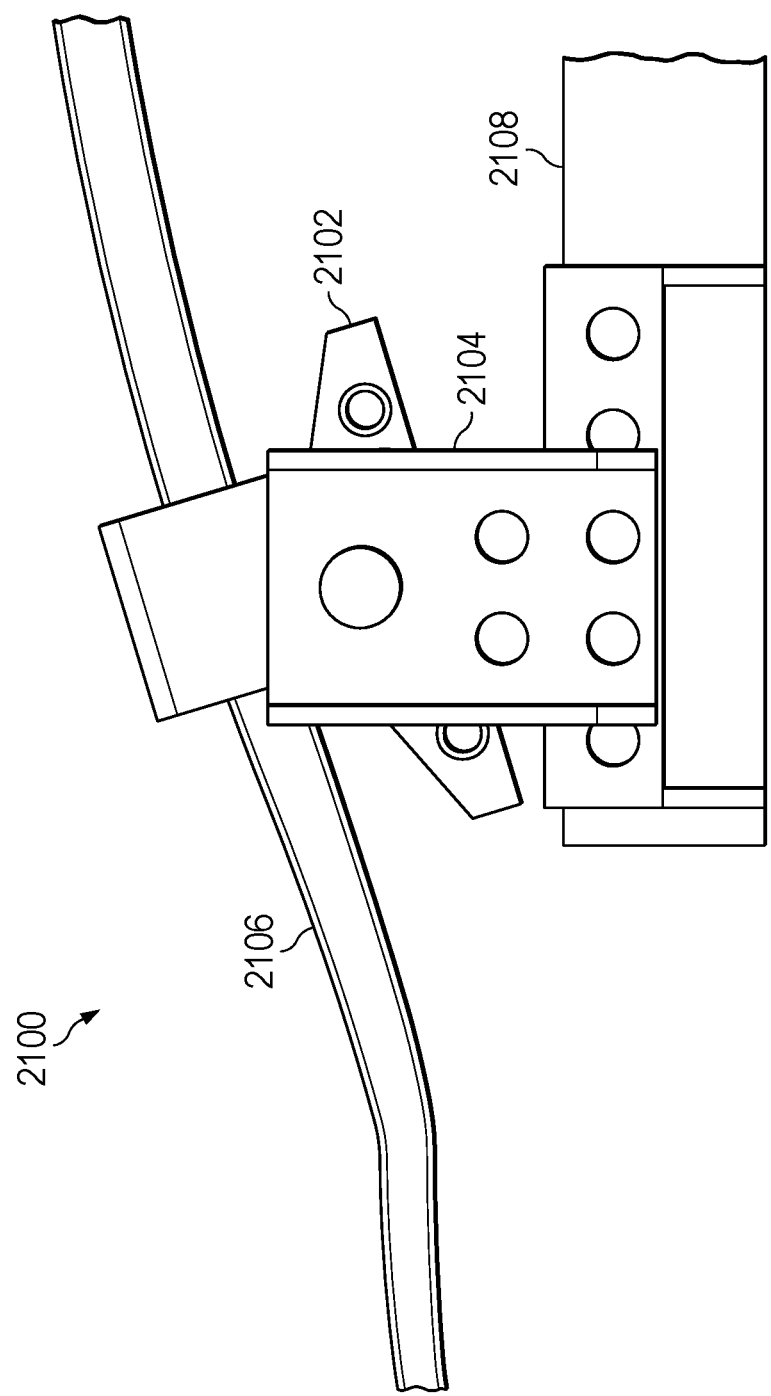
FIGS. 21A and 21B illustrate a translational axis with mounting brackets in accordance with embodiments of the invention.
Figure 21B:
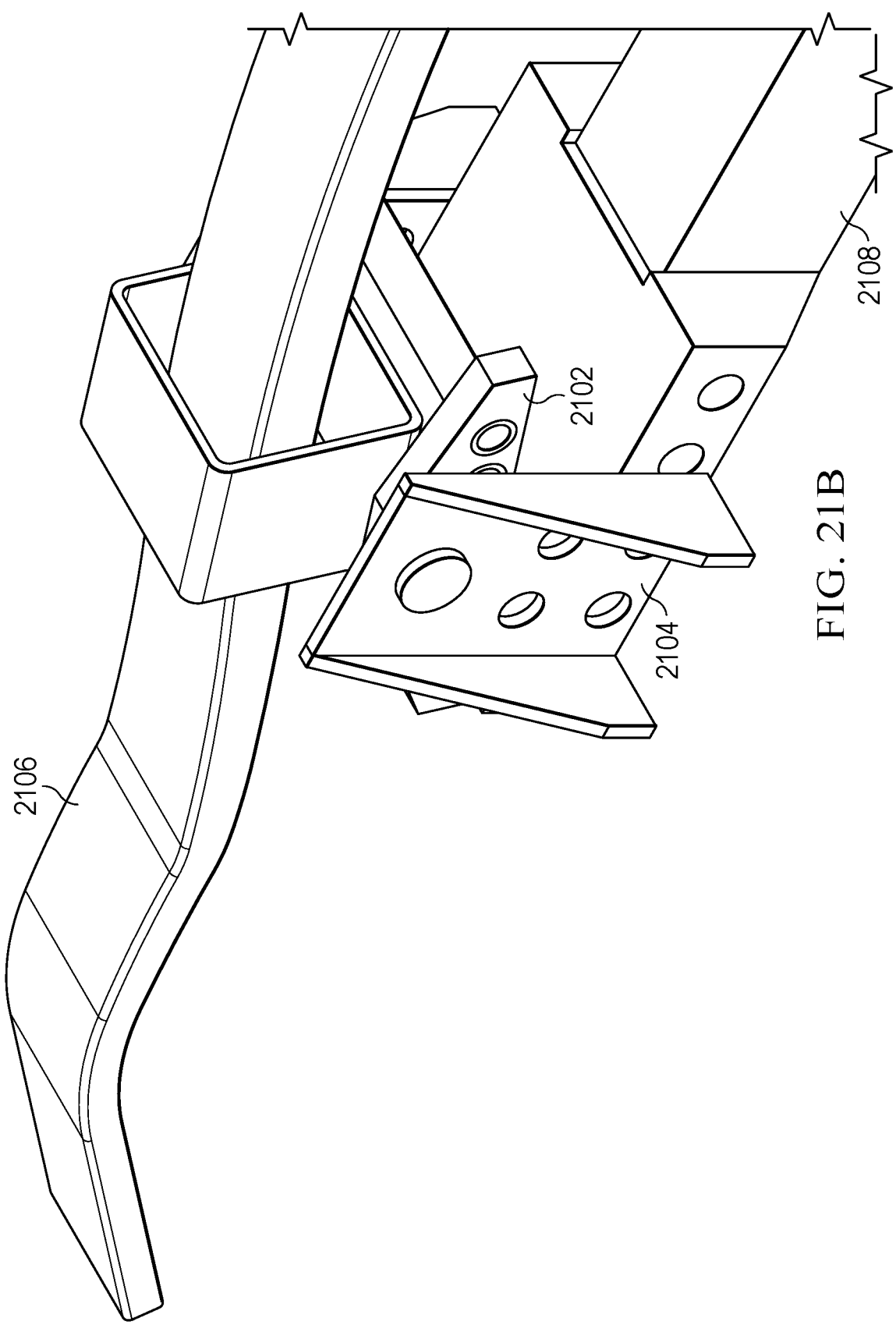

Turning now to FIGS. 21A through 22B, various embodiments may incorporate both translation and rotation elements in a single bracket or support element. For example, FIGS. 21A and 21B illustrate a Translational rotational system 2100 where the rotational axis is above the seat. The embodiment illustrated in FIGS. 21A and 21B shows a rotational seat 2102 that is rotationally mounted to a support bracket 2104 that has a dual function. The support bracket 2104 allows for the rotational movement of the spring 2106 by way of the seat 2102 and a translational movement along the support structure 2108 of the tensioning device.

Figure 22A:
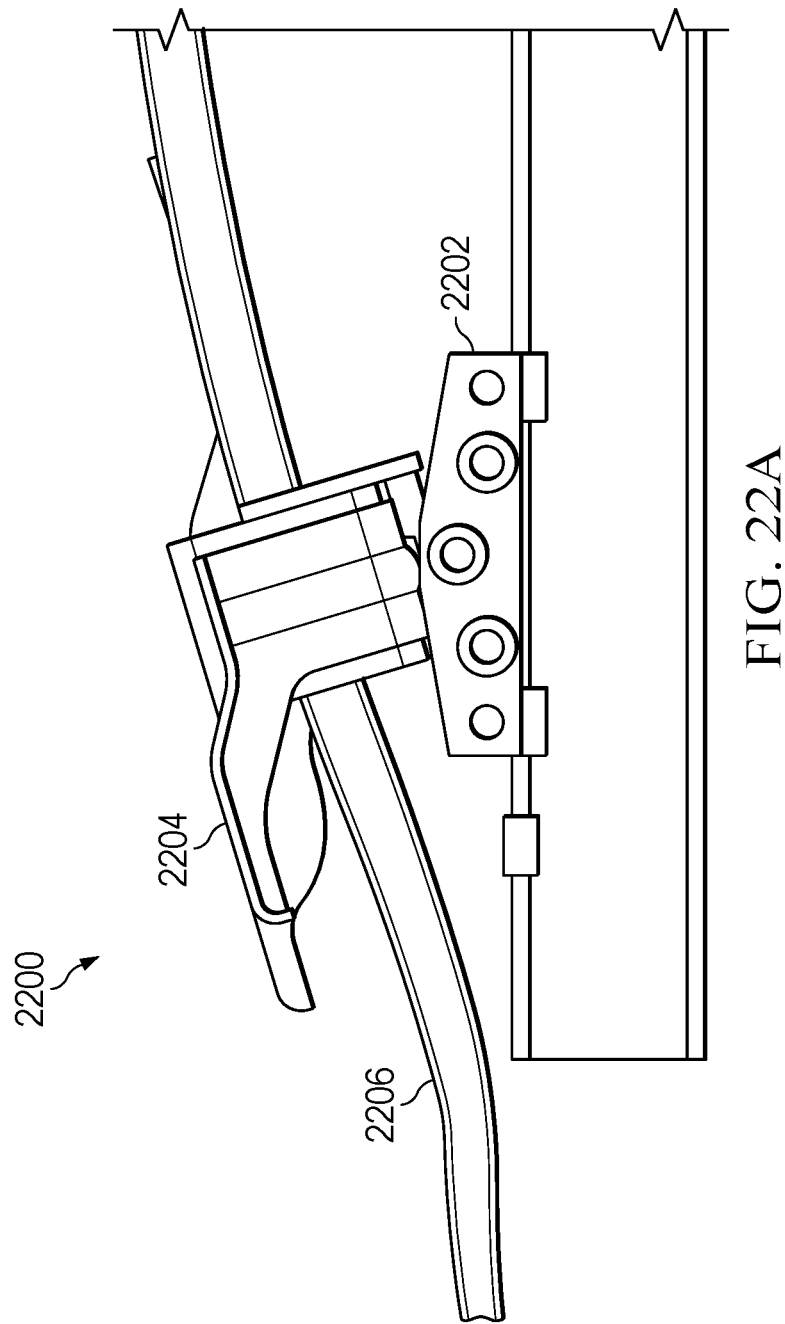
FIGS. 22A and 22B illustrate a rotational axis in accordance with embodiments of the invention.
Figure 22B:
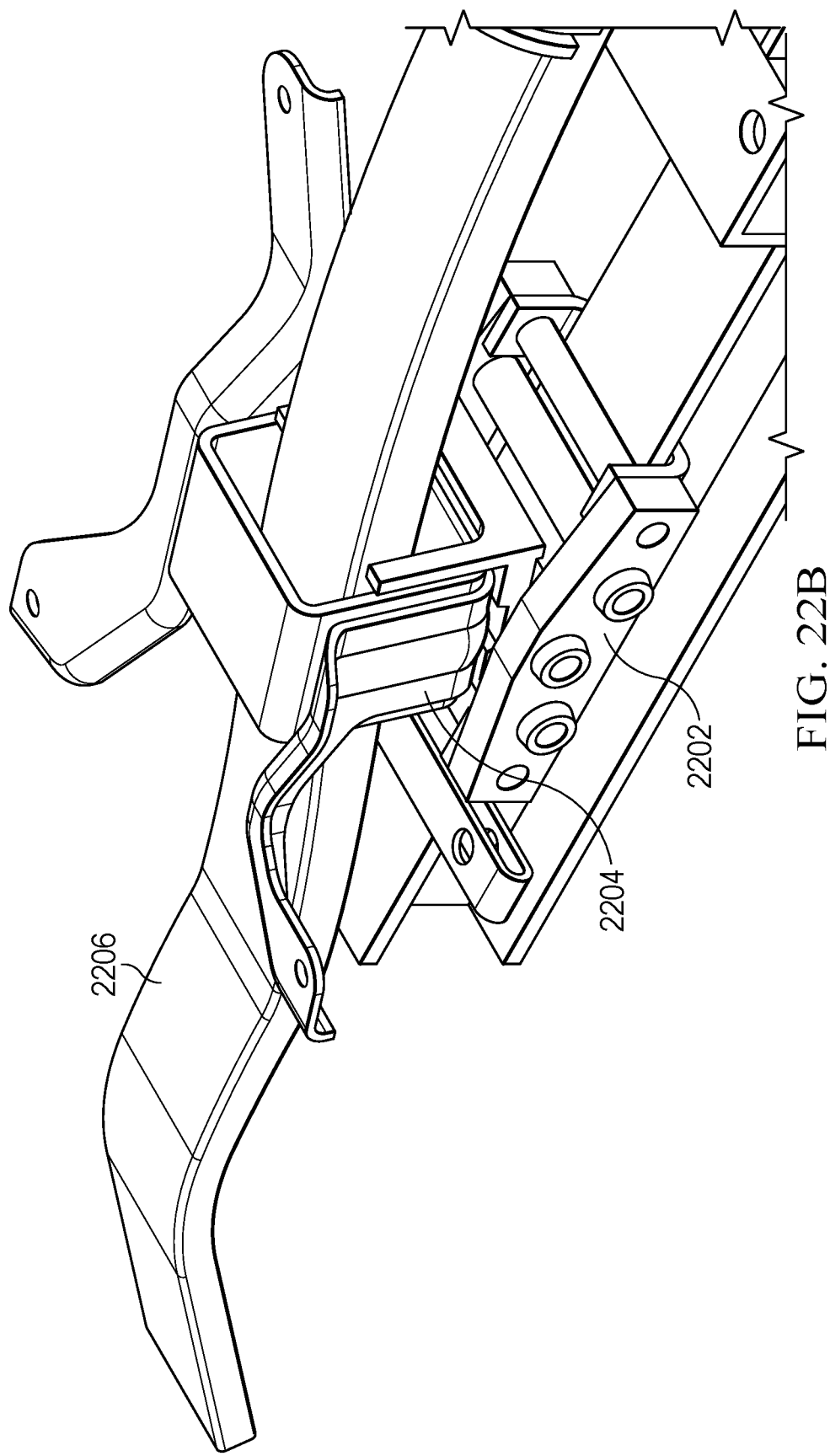

Similarly, FIGS. 22A and 22B illustrate another embodiment of a translational rotational system 2200 that allows for movement rotationally as well as translationally. However, the embodiment illustrated in FIGS. 22A and 22B is configured such that the rotational axis is below the seat rather than above. For example, in some embodiments a seat 2202 can be connected to a mounting bracket 2204 that holds a leaf spring 2206. The mounting bracket may be configured to rotate such that the rotational axis is below the seat 2202. Thus, according to FIGS. 21A through 22B it can be illustrated that embodiments of the tensioning system can have a variety of configurations to allow for proper movement of the spring during the application of tension. Likewise, it can be appreciated that numerous embodiments of a tensioning device may incorporate one or more movement systems where both systems may use one or both rotation and translation.

Figure 23A:
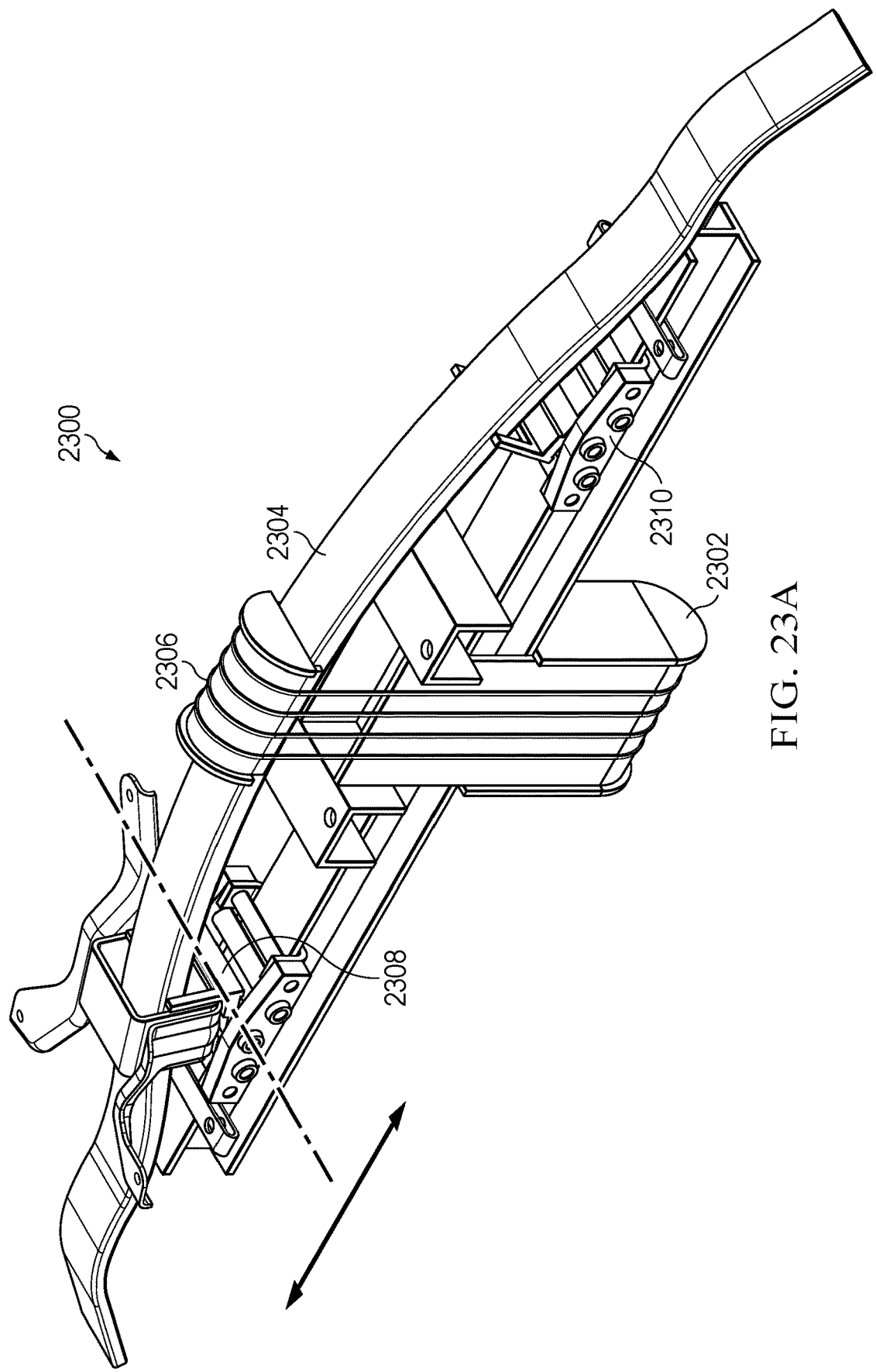
FIGS. 23A and 23B illustrate a rotational and translational configuration in accordance with embodiments of the invention.
Figure 23B:
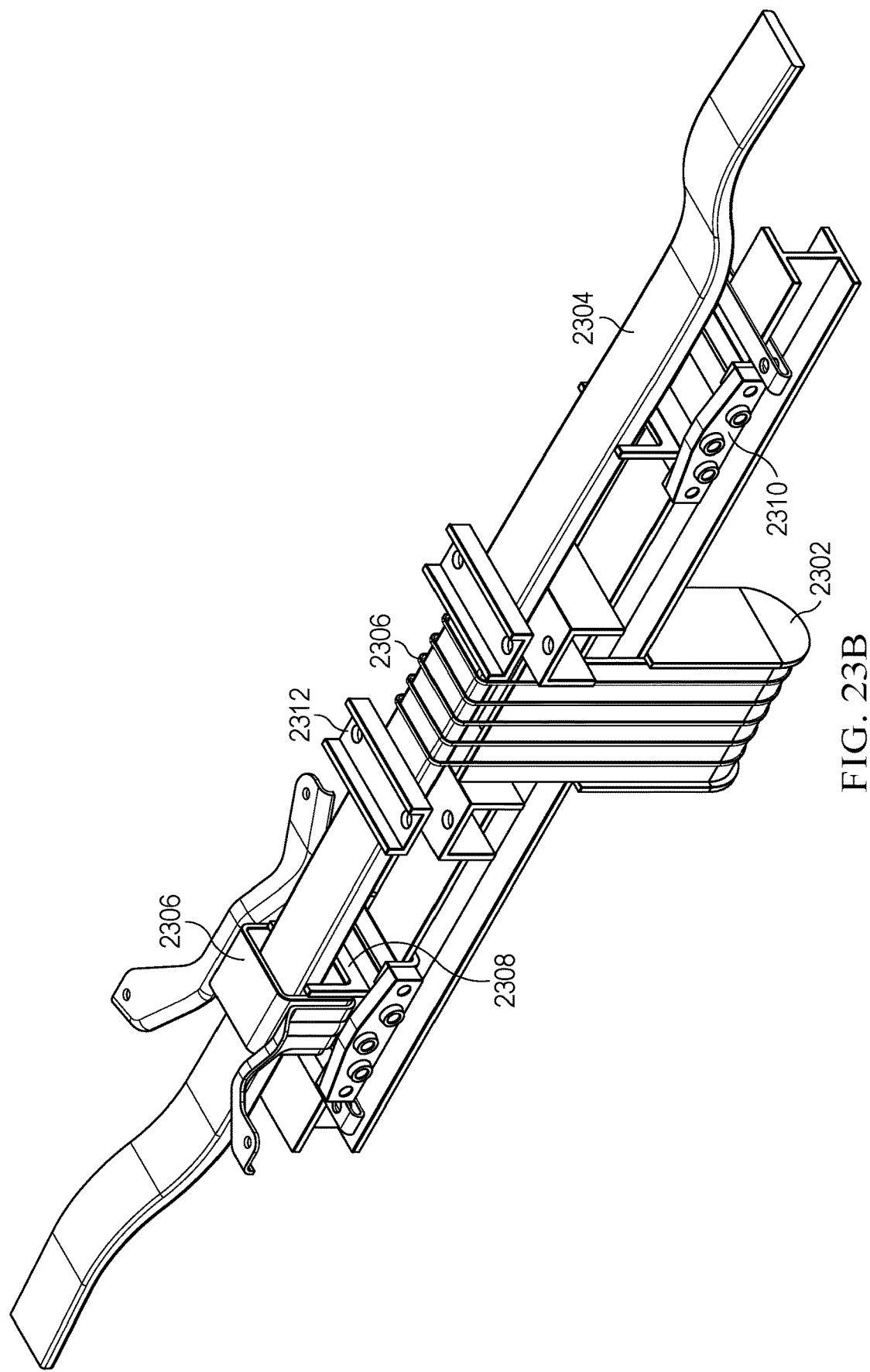

In accordance with many embodiments, tension may be applied in any number of ways. As illustrated in FIGS. 23A and 23B a tensioning system 2300 may incorporate a tensioner 2302 that is configured to apply tension or a perpendicular force to the longitudinal axis of a leaf spring 2304. The tensioner 2302 may apply the tension by a number of methods. For example, FIGS. 23A and 23B illustrate a tensioning system 2300 that uses a series of tensioning elements 2306 to directly apply the tension to the spring 2304. The tensioner 2302, according to many embodiments may act to tighten the tensioning elements 2306 such that the tightening forces the central point of the spring 2304 to move towards the tensioner 2302. Accordingly, many embodiments allow the spring 2304 to move, as the tension is applied, through a rotational bracket 2308. Other embodiments may include a translational bracket 2310 attached to a portion of the spring 2304. Additionally, securing brackets 2312 may be used to hold the tension on the spring 2304 until it can be mounted to the vehicle platform, thus, allowing the tensioner 2302 to remove the stress applied to the tensioning elements 2306. Although individual tensioner elements 2306 are illustrated, many embodiments may use one or more elements to apply the tension. Additionally, the movement of the tensioner 2302 may be performed by any number of means, such a ratchet and gear system, an electronically controlled drive system, and/or a hydraulic system.

Figure 24:
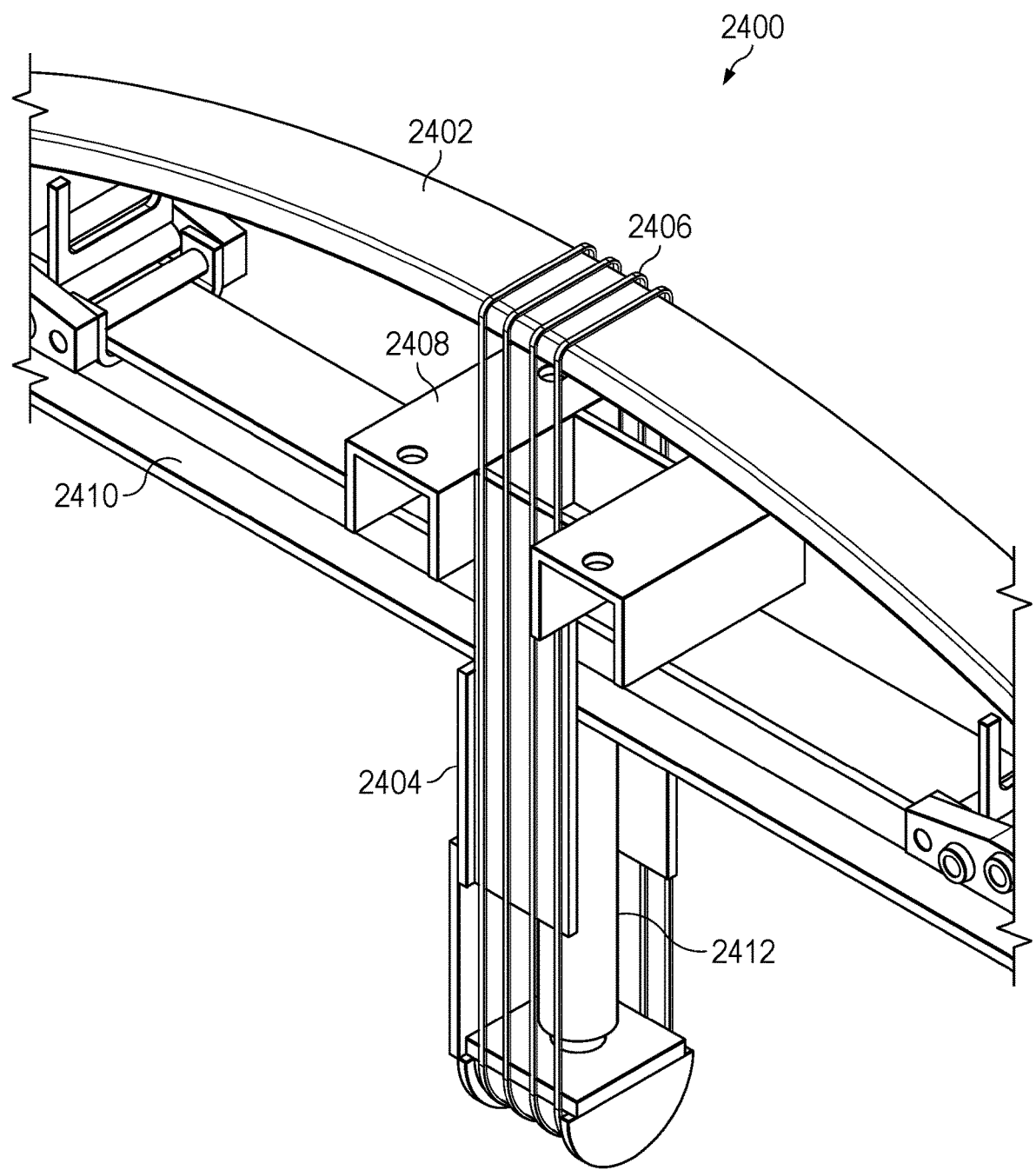
FIG. 24 illustrates the tensioning of a leaf spring in accordance with embodiments of the invention.

As described above, the tensioner may apply the tension in any number of ways. For example, FIG. 24 illustrates a tensioning system 2400 that applies a tensional force to a spring 2402 by extending a tensioner 2404 away from the spring 2404 such that the tensioning element 2406 is stressed and applies tension to the spring 2402. In accordance with many embodiments, the tensioning system 2400 may have additional tension stops 2408 that are attached to a support structure 2410 of the system to prevent the over tensioning of the spring 2402. Additionally, the tensioner 2404 may be configured with a drive system 2412. As described above the drive system 2410 may be mechanically actuated or may be electronic or even hydraulic.

Figure 25:
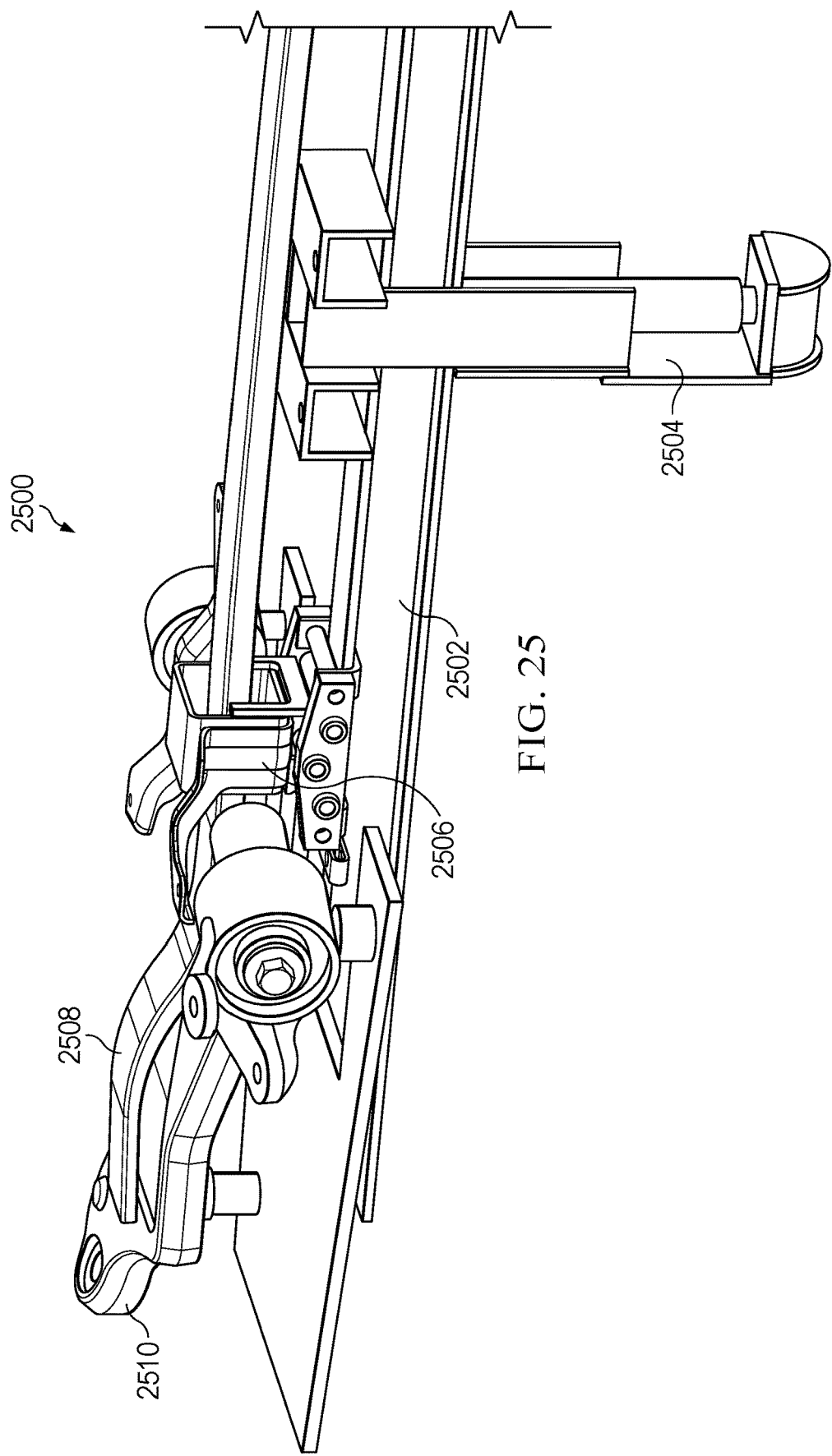
FIG. 25 illustrates a tensioned leaf spring in accordance with embodiments of the invention.

Turning now to FIG. 25 other embodiments of a tensioning system 2500 are illustrated. Many embodiments of a tensioning system 2500 may incorporate a structural support element 2502 that is attached to the tensioner 2504 as well as the movement elements 2506 of the system. In accordance with many embodiments, the structural support element 2502 may be configured to support more than just the leaf spring 2508, but may also extend to support other elements of the suspension system, including but not limited to the control arms 2510 or other mounting structures.

Moreover, although many embodiments exhibit a process for pretensioning various components of a suspension system including, but not limited to, leaf springs in association with vehicle suspension systems, it should be understood that any combination of the various structural and functional elements of such processes can be included and or omitted in any number of suspension systems.

Embodiments of a Suspension System with Respect to Motor Placement

Figure 26A:
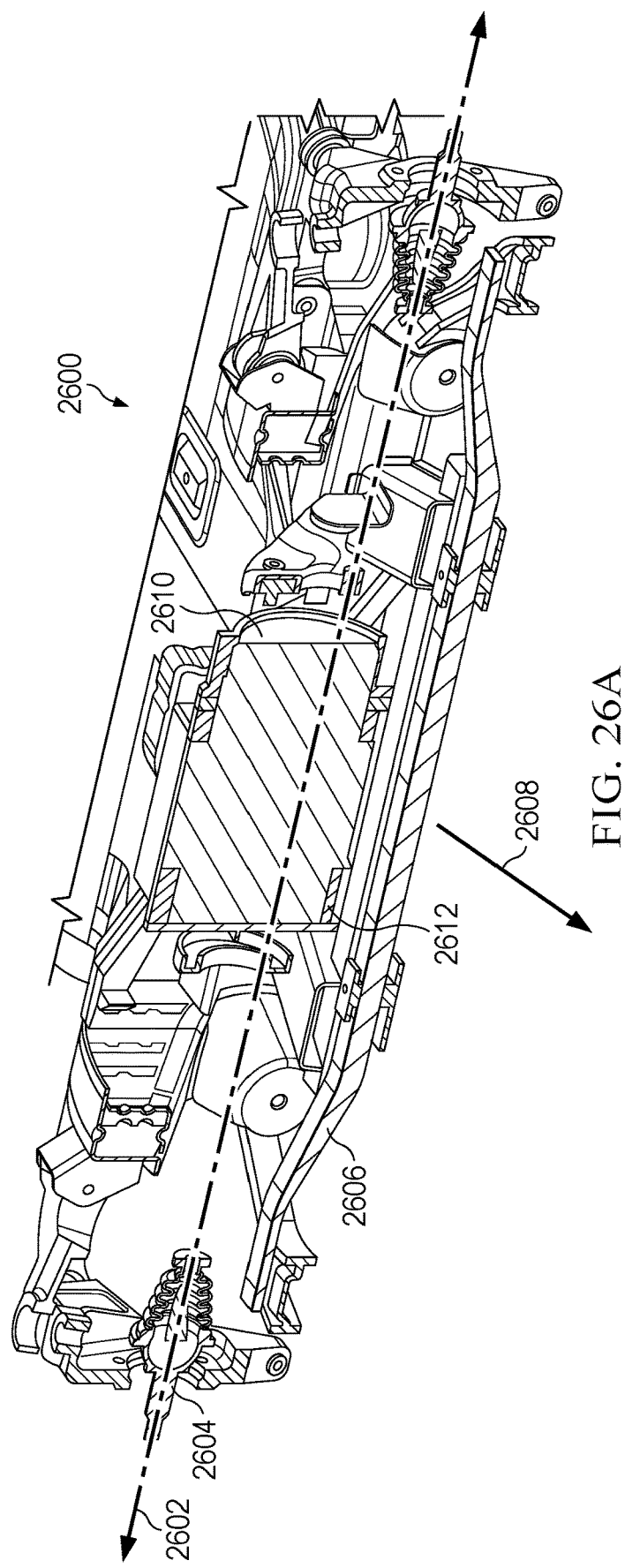
FIGS. 26A to 26C illustrate a vehicle platform suspension system in association with drive train components in accordance with embodiments of the invention.
Figure 26B:
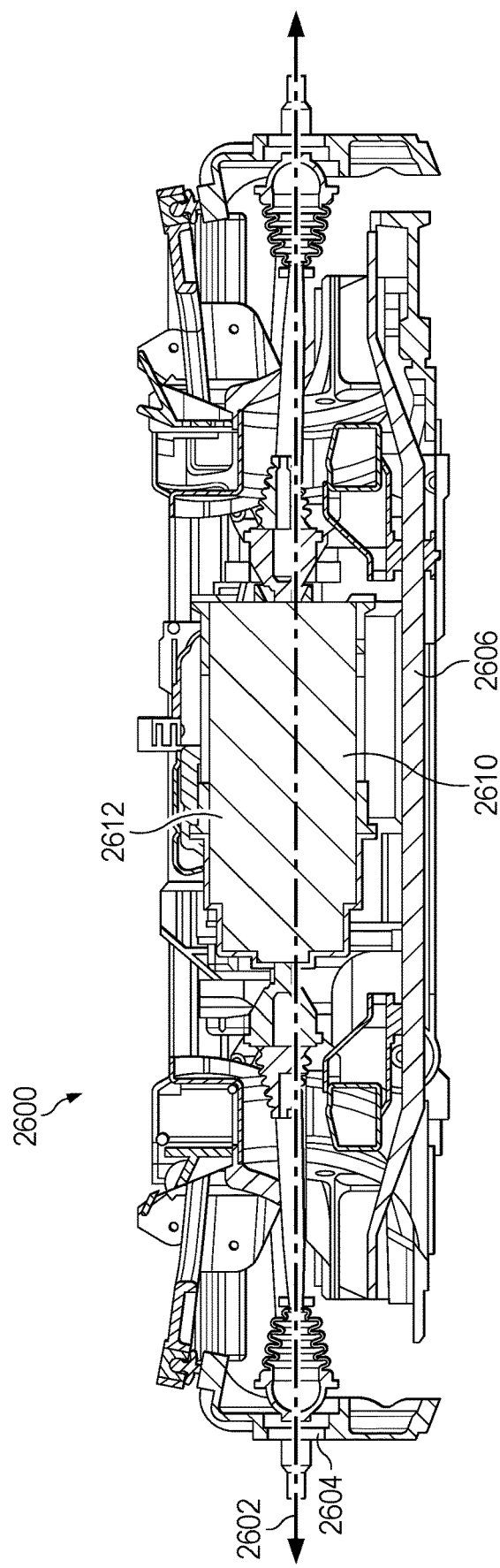

Despite the potential advantages of incorporating transverse leaf springs in vehicles with electric drives, a number of complications arise in implementing such suspension systems in vehicle platforms in accordance with embodiments. One is the spatial relationship between drive train elements (e.g., motor/transmission) and the leaf spring. As shown in FIG. 26A, in order to avoid expensive and heavy gear arrangements, embodiments of drive trains 2600 are configured such that the motor output axis 2602 is in line with the wheel centers 2604. Accordingly, many embodiments implement a co-axial drive train configuration. In implementing a transverse leaf spring 2606 suspension to maintain the flat packaging of the vehicle platform, as previously described, the leaf spring must be positioned as close to the wheel centers 2604 as possible to provide ride comfort and roll stability. Specifically, any longitudinal offset 2608 would result in a loss of efficiency and deterioration in ride and handling performance of the vehicle platform. In many embodiments, this positions the leaf spring 2606 directly beneath and in-line with numerous drive train elements including the motor 2610 and transmission components 2612.

Figure 26C:
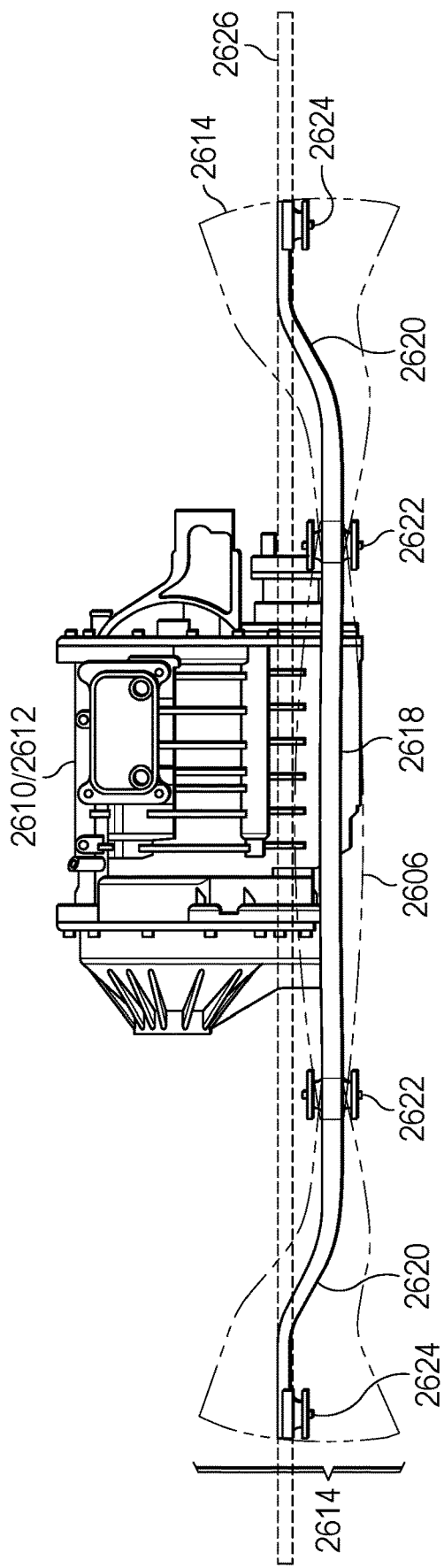

Conventional leaf springs are configured to be vertically planar. However, if a conventional leaf spring were to be implemented in the various embodiments of a vehicle platform described herein, the various drive train elements may require substantial vertical adjustment, pushing the drive train elements further into the cabin space. This solution would be unsuitable for the design goals of vehicle platforms according to embodiments, namely, to create maximum vehicle cabin space for passengers by designing a vehicle platform to be as flat as possible. Therefore, FIG. 26C illustrates an embodiment of a leaf spring and associated movement envelope 2614 as it relates to various drive train components 2610/2612. During operation, as shown by the movement envelope 2614, the leaf spring 2606 undergoes deflection further increasing the amount of clearance required between the leaf spring and the drive train elements 2610/2612.

As shown in FIG. 26C, the leaf spring 2606 may be described in relation to three different sections: a middle section 2618 disposed directly beneath the drive train elements 2610/2612, and left and right outer ends 2620 disposed outboard of the pivot points 2622 and terminating in lower support arm coupling 2624. As shown, in various embodiments the leaf spring 2606 deviates from a straight line to create additional clearance for the drive train elements and allow for deflection of the spring during wheel travel (see motion envelope 2614). More specifically, the outer ends 2620 between the lower support arm coupling 2624 and the pivot point 2622 are configured with a downward bend such that at least the middle section of the leaf spring is disposed vertically lower relative to the outer sections of the leaf spring. In various embodiments, the downward deflection from the straight line 2626, defined by the position of the outer ends 2424 of the leaf spring, is sufficient to provide a gap between the leaf spring and the drive train elements during a full rebound condition (e.g., when the vehicle platform is raised sufficiently above the ground to allow the wheel hang freely) where the center 2618 of the leaf spring 2606 come closest to the drive train elements 2610/2612.

Figure 27:
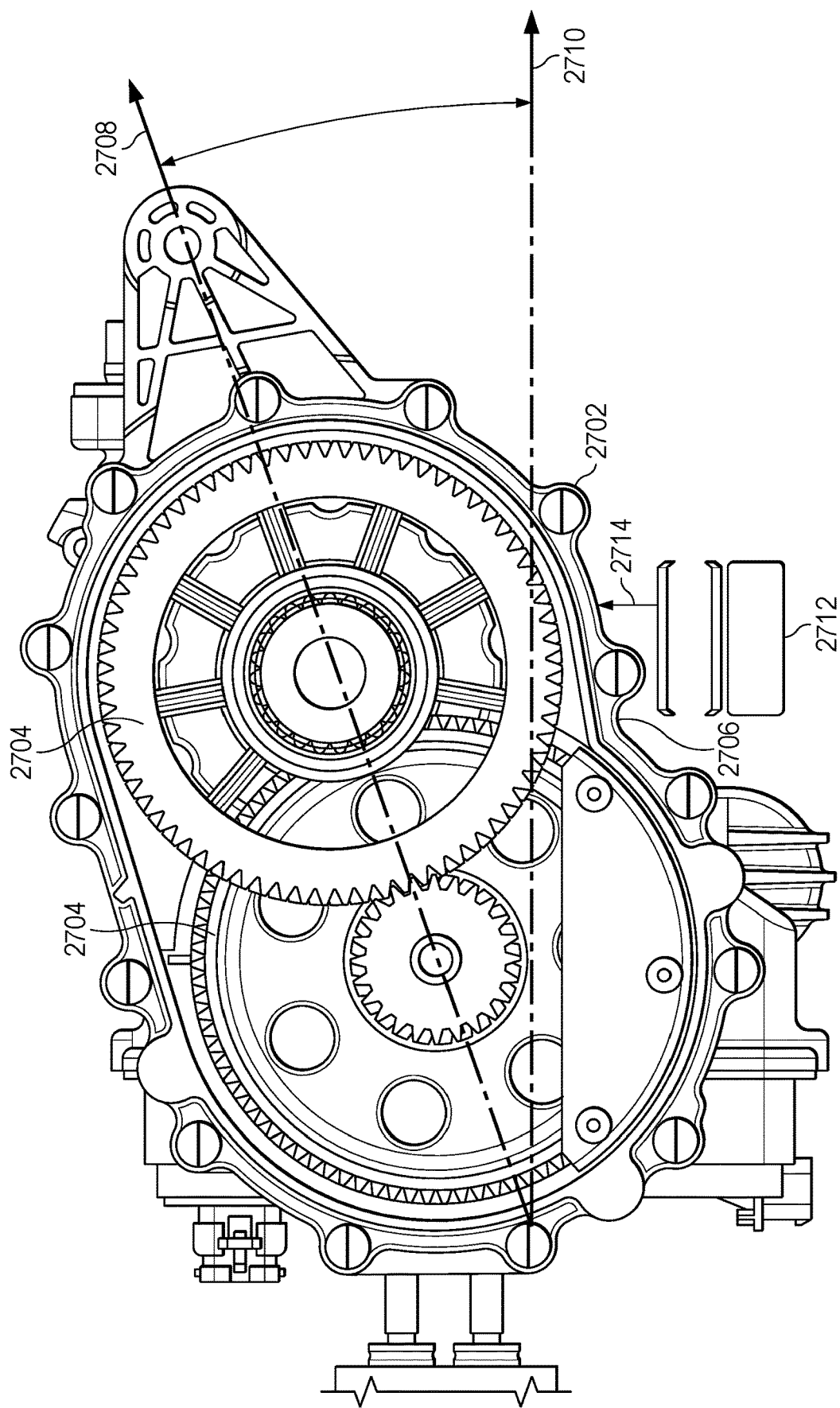
FIG. 27 illustrates a cross sectional view of a vehicle platform motor system in relation to various components of a suspension system in accordance with embodiments of the invention.

In various embodiments, the drive train elements are also configured such that additional clearance between leaf spring and motor/transmission components is created. In such embodiments, the configuration of the motor/transmission can be a function of the desired peak torque characteristics of the overall vehicle. FIG. 27 illustrates a cross sectional view of a positional arrangement between various motor components and suspension components. As shown in FIG. 27, the motor housing 2702 must conform to the size and shape of the gears 2704 of the transmission, which are determined by the desired driving characteristics of the vehicle (e.g., gear ratio is determined by vehicle requirements). As shown in the embodiment of FIG. 27, the combination of gears, 2704 required by the transmission creates a figure-eight shape. Embodiments of drive trains form motor housings having at least one side that conforms to the contours of the gears (e.g., the "figure eight" shape) creating a indented portion 2706 of the motor housing 2702. In various embodiments, the motor housing in configured such that a maximum clearance of from 3 to 7 mm is formed between the gears 2704 and the housing 2702. In accordance with many embodiments, a careful angular positioning of the motor housing (e.g., tiling the motor housing such that the elongated axis 2708 of the figure eight is elevated relative to a horizontal axis 2710) can allow for positioning a leaf spring 2712 beneath the casing 2702 while achieving a maximum clearance 2714 between the leaf spring 2712 and the motor housing 2702 during spring movement. Accordingly, the leaf spring 2712 does not contact the motor housing throughout its entire range of motion. In addition, as the maximum deflection of the leaf spring 2712 occurs in the center of the spring under full rebound condition. Many embodiments position the motor housing 2702 such that the lowest point is spatially separated from this center portion of the spring 2712. In various embodiments, the spatial separation of the motor housing from the center plane of the leaf spring is greater than 100 mm. In other embodiments, the spatial separation may be as small as 50 mm. In some embodiments, the center plane of the leaf spring is identical to that of the vehicle.

Figure 28A:
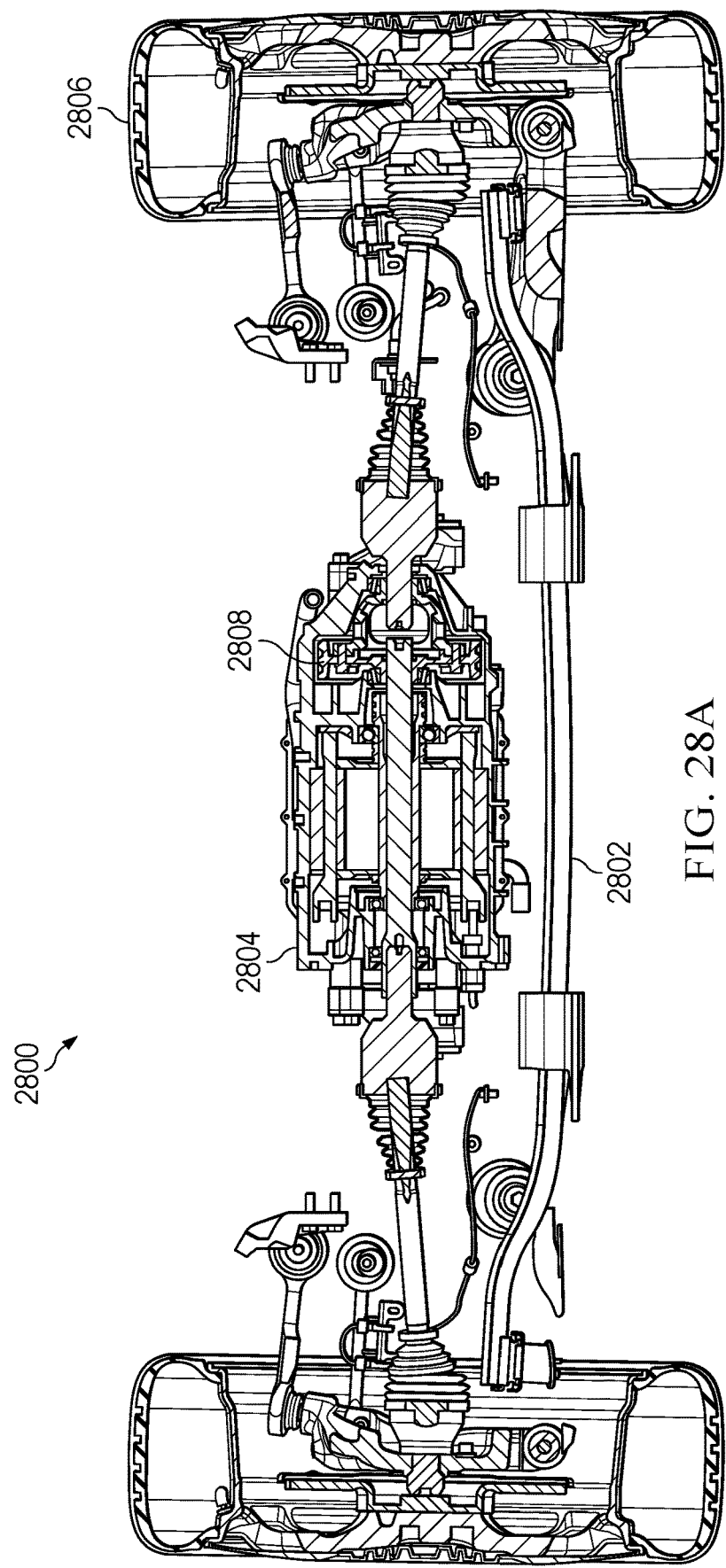
FIGS. 28A through 28C illustrate various views of a vehicle platform drive system in relation to a suspension system in accordance with embodiments of the invention.
Figure 28B:
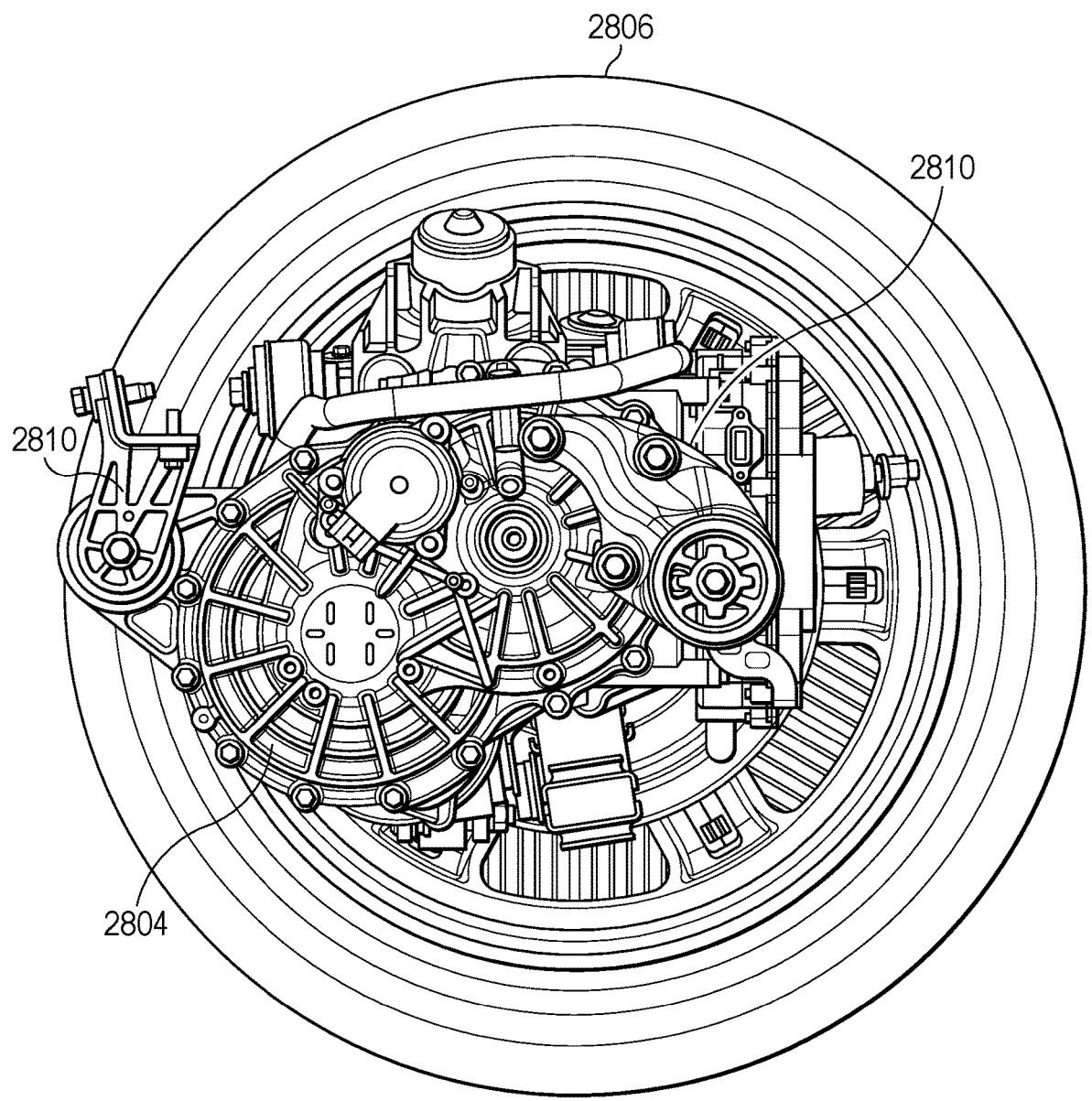
Figure 28C:
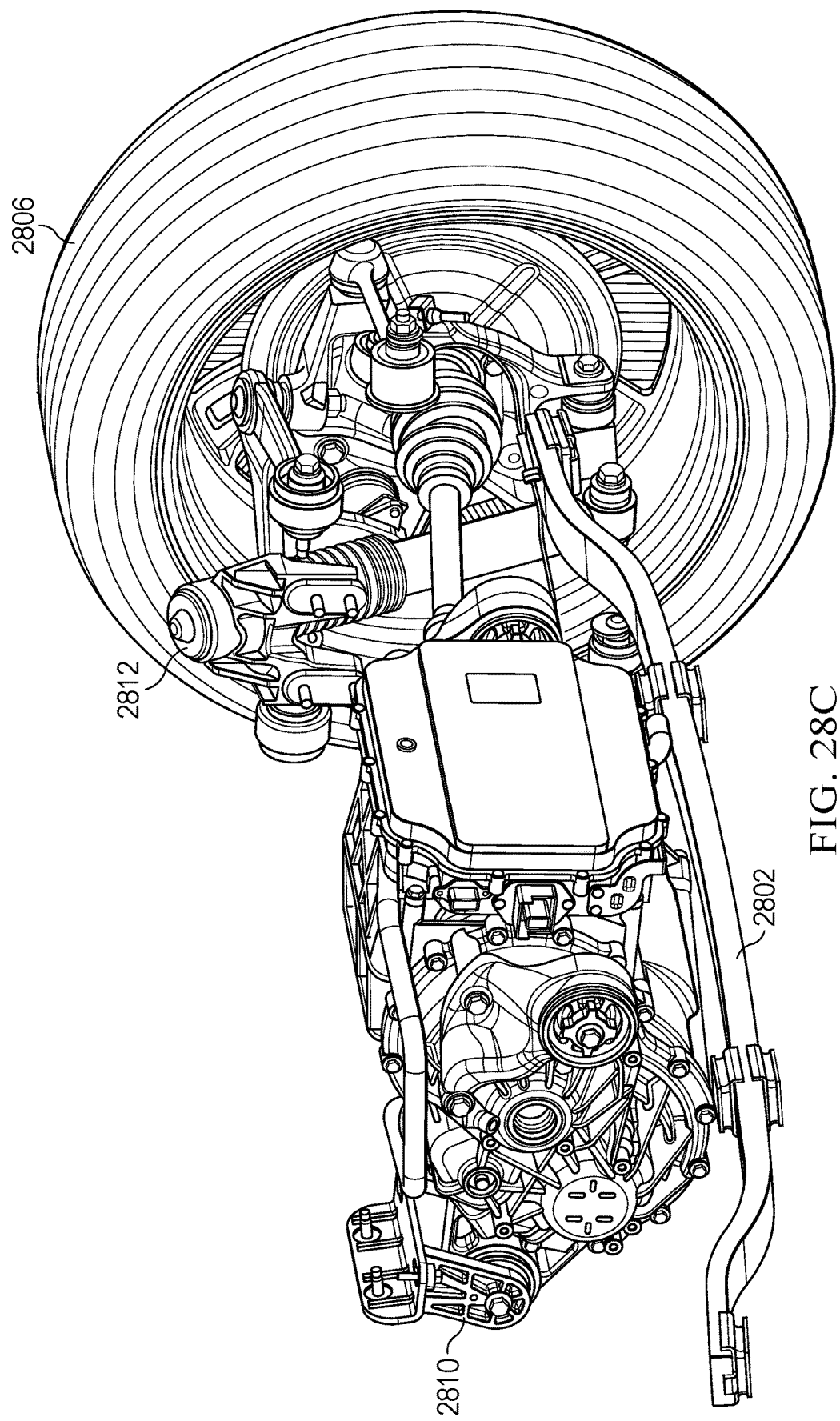

FIGS. 28A through 28C further illustrate embodiments of the placement of various drive train elements and configurations of the gears in relation to the suspension system. For example, FIG. 28A illustrates a cross sectional view of a wheel base portion 2800 of a vehicle platform. It can be appreciated that such embodiments can be implemented in either a front or rear or both front and rear portions of a vehicle platform. In many embodiments a leaf spring, 2802 is positioned to transverse the underside of the motor 2804 and other drive train elements and interconnect the wheels 2806. Additionally, some embodiments utilize a motor system 2804 with gears 2808 where the motor and output rings are of an equivalent diameter to fit within the motor housing. Such embodiments can enable motor systems 2804 to be easily adaptable within the many embodiments of a planar vehicle platform. Additionally, they can allow for adequate clearance between the motor 2804 and the leaf spring suspension 2802 during movement of the spring.

A cross section of a wheelbase 2800 looking down the longitudinal axis of the leaf spring 2802 can be illustrated in FIG. 28B. Here it can be appreciated that the motor system 2804 is configured to sit directly above the leaf spring 2802. In accordance with various embodiments, the motor systems 2804 can be outfitted with one or more mounting brackets 2810 that can allow the motor to be mounted to one or more locations on the vehicle platform framework (not shown). Similar mounting brackets 2810 can be seen in FIG. 28C in further relation to the wheels 2806 as well as other suspension components 2812.

Moreover, although many embodiments exhibit various components of a suspension system including, but not limited to, leaf springs in association with vehicle drive systems, it should be understood that any combination of the various structural and functional elements of such embodiments can be included and or omitted in any number of suspension systems and drive systems.

DOCTRINE OF EQUIVALENTS

As can be inferred from the above discussion, the above-mentioned concepts can be implemented in a variety of arrangements in accordance with embodiments of the invention. Specifically, suspension systems for electric vehicles in accordance with embodiments are based on the idea of separating the lower structure of the vehicle (e.g., vehicle platform or skateboard) from the vehicle body (e.g., passenger cabin) to create a modular vehicle platform. The separation of vehicle platform and body allows multiple vehicle types to be derived from a single vehicle platform. Accordingly, the vehicle body can be varied from vehicle to vehicle, whereas the vehicle platform stays mostly common over all vehicle derivatives. Therefore, the suspension system of the vehicle platform is adaptable to accommodate the varying weights and/or loads of the vehicle derivatives such that the ride and roll stiffness is maintained. Thus, the overall comfort and stability of the ride is not effected between the vehicle derivatives. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A vehicle suspension system comprising:
   left and right control arm assemblies each comprising: a wheel mount structure; and
   an upper control arm and a lower control arm each comprising (i) a first end configured to be pivotably connected to a frame structure of a vehicle and (ii) a second end rotatably connected to the wheel mount structure; and
   a transverse leaf spring comprising:
     an elongated body extending between the left and right control arm assemblies;
     outer mounting brackets respectively connecting left and right ends of the elongated body to the left and right control arm assemblies; and
     one or more inner mounting brackets located between the outer mounting brackets;
   wherein the transverse leaf spring is contoured such that a contoured portion of the elongated body deviates in a downward direction to extend below an electric drive system disposed within an internal space between rails of the frame structure; and
   wherein a center portion of the transverse leaf spring comprises two narrower portions surrounding a wider portion, and wherein the two narrower portions are thicker than the wider portion.

2. The vehicle suspension system of claim 1, wherein:
   the left and right control arm assemblies comprise a front left control arm assembly and a front right control arm assembly;
   the transverse leaf spring comprises a front transverse leaf spring and extends between the front left and front right control arm assemblies; and
   the vehicle suspension system further comprises:
     a rear left control arm assembly and a rear right control arm assembly; and
     a rear transverse leaf spring that extends between the rear left and rear right control arm assemblies.

3. The vehicle suspension system of claim 1, further comprising:
   at least one mounting bracket cover, each mounting bracket cover having a contoured body that is contoured to cover one of the one or more inner mounting brackets and is configured to be connected to the frame structure.

4. The vehicle suspension system of claim 1, wherein the first end of each upper control arm comprises a forward attachment point and a rearward attachment point, the forward and rearward attachment points configured to be connected to the rails of the frame structure via openings in the rails of the frame structure such that at least portions of the forward and rearward attachment points sit within the rails of the frame structure.

5. The vehicle suspension system of claim 1, wherein each control arm assembly further comprises a second upper control arm configured to be pivotably connected to the rails of the frame structure and rotatably connected to the wheel mount structure.

6. The vehicle suspension system of claim 1, wherein the one or more inner mounting brackets are configured to be mounted at multiple positions along the transverse leaf spring to support multiple vehicle configurations using the vehicle suspension system.

7. The vehicle suspension system of claim 1, wherein the transverse leaf spring is configured such that:
when the one or more inner mounting brackets are mounted closer to a center of the transverse leaf spring, a movement envelope of the transverse leaf spring is increased; and
when the one or more inner mounting brackets are mounted farther from the center of the transverse leaf spring, the movement envelope of the transverse leaf spring is decreased.

8. The vehicle suspension system of claim 1, wherein each inner mounting bracket fixedly contacts a top side and a bottom side of the transverse leaf spring.

9. The vehicle suspension system claim 1, wherein
the one or more inner mounting brackets comprise two inner mounting brackets mounted on the narrower portions.

10. The vehicle suspension system of claim 1, wherein the transverse leaf spring has a substantially rectangular cross section throughout the elongated body.

11. The vehicle suspension system of claim 10, wherein a width of the center portion of the transverse leaf spring is larger than a width of outer portions of the transverse leaf spring.

12. The vehicle suspension system of claim 10, wherein a height of outer portions of the transverse leaf spring is larger than a height of the center portion of the transverse leaf spring.

13. The vehicle suspension system of claim 12, wherein the height of the outer portions of the transverse leaf spring is at least 1.5 times greater than the height of the center portion of the transverse leaf spring.

14. The vehicle suspension system of claim 1, further comprising:
body spacers disposed beneath the left and right ends of the transverse leaf spring such that the body spacers are positioned between transverse leaf spring mounting points and the lower control arms.

15. The vehicle suspension system of claim 1, wherein the left and right control arm assemblies and the transverse leaf spring are connected to each other and to the frame structure.

16. A vehicle comprising:
a frame structure comprising rails; and
a vehicle suspension system comprising:
left and right control arm assemblies each comprising:
a wheel mount structure; and
an upper control arm and a lower control arm each comprising (i) a first end pivotably connected to the frame structure and (ii) a second end rotatably connected to the wheel mount structure; and
a transverse leaf spring comprising:
an elongated body extending between the left and right control arm assemblies;
outer mounting brackets respectively connecting left and right ends of the elongated body to the left and right control arm assemblies; and
one or more inner mounting brackets located between the outer mounting brackets;
wherein the transverse leaf spring is contoured such that a contoured portion of the elongated body deviates in a downward direction to extend below an electric drive system disposed within an internal space between the rails of the frame structure; and
wherein a center portion of the transverse leaf spring comprises two narrower portions surrounding a wider portion, and wherein the two narrower portions are thicker than the wider portion.

17. The vehicle of claim 16, wherein the first end of each upper control arm comprises a forward attachment point and a rearward attachment point, the forward and rearward attachment points connected to the rails of the frame structure via openings in the rails of the frame structure such that at least portions of the forward and rearward attachment points sit within the rails of the frame structure.

18. The vehicle of claim 16, wherein:
the one or more inner mounting brackets are configured to be mounted at multiple positions along the transverse leaf spring to support multiple vehicle configurations using the vehicle suspension system; and
the transverse leaf spring is configured such that:
when the one or more inner mounting brackets are mounted closer to a center of the transverse leaf spring, a movement envelope of the transverse leaf spring is increased; and
when the one or more inner mounting brackets are mounted farther from the center of the transverse leaf spring, the movement envelope of the transverse leaf spring is decreased.

19. The vehicle of claim 16, wherein:
the transverse leaf spring has a substantially rectangular cross section throughout the elongated body;
a width of the center portion of the transverse leaf spring is larger than a width of outer portions of the transverse leaf spring; and
a height of the outer portions of the transverse leaf spring is larger than a height of the center portion of the transverse leaf spring.

20. The vehicle of claim 16, further comprising:
body spacers disposed beneath the left and right ends of the transverse leaf spring such that the body spacers are positioned between transverse leaf spring mounting points and the lower control arms.

\* \* \* \* \*